(12) United States Patent
Tsukuba et al.

(10) Patent No.: US 11,683,508 B2
(45) Date of Patent: Jun. 20, 2023

(54) IMAGE DECODING APPARATUS

(71) Applicant: Huawei Technologies Co., Ltd., Shenzhen (CN)

(72) Inventors: Takeshi Tsukuba, Osaka (JP); Tomohiro Ikai, Osaka (JP); Tomoyuki Yamamoto, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/752,549

(22) Filed: May 24, 2022

(65) Prior Publication Data
US 2022/0286693 A1    Sep. 8, 2022

Related U.S. Application Data

(63) Continuation of application No. 15/264,366, filed on Sep. 13, 2016, now Pat. No. 11,356,682, which is a
(Continued)

(30) Foreign Application Priority Data

Mar. 14, 2014 (JP) ................................. 2014-051851

(51) Int. Cl.
*H04N 19/31* (2014.01)
*H04N 19/33* (2014.01)
(Continued)

(52) U.S. Cl.
CPC ............. *H04N 19/31* (2014.11); *H04N 19/17* (2014.11); *H04N 19/33* (2014.11); *H04N 19/36* (2014.11); *H04N 19/44* (2014.11); *H04N 19/70* (2014.11)

(58) Field of Classification Search
CPC ........ H04N 19/31; H04N 19/17; H04N 19/33; H04N 19/36; H04N 19/44; H04N 19/70; H04N 19/172; H04N 19/187; H04N 19/46
(Continued)

(56) References Cited

U.S. PATENT DOCUMENTS 9,270,989 B2   2/2016  Hannuksela
9,591,321 B2 * 3/2017  Deshpande .......... H04N 19/177
(Continued)

FOREIGN PATENT DOCUMENTS

CN           102428693 A      4/2012

OTHER PUBLICATIONS

"Series H: Audiovisual and Multimedia Systems; Infrastructure of audiovisual services—Coding of moving video; Advanced video coding for generic audiovisual services," ITU-T H.264, ITU-Telecommunication Standardization Sector of ITU, Geneva, Switzerland (Feb. 2014).
(Continued)

*Primary Examiner* — Susan E. Torgerson
(74) *Attorney, Agent, or Firm* — Leydig, Voit & Mayer, Ltd.

(57) ABSTRACT

In a conventional art, an output layer set having no output layer is sometimes defined. Consequently, even if the decoder decodes a bit stream to obtain each layer in the output layer set without the output layer, there is no picture to be outputted. There is a possibility that such coded data causes the decoder expecting an output to operate unexpectedly. Output layer sets having the same configuration may be defined. Consequently, the amount of code pertaining to the output layer sets defined in an overlapping manner is redundant. According to an aspect of the present disclosure, a specification of a bit stream conformance pertaining to the
(Continued)

output layer set prevents occurrence of an output layer set without an output layer and a redundant output layer set.

12 Claims, 24 Drawing Sheets

Related U.S. Application Data continuation of application No. PCT/JP2015/056552, filed on Mar. 5, 2015.

(51) Int. Cl.
  *H04N 19/36* (2014.01)
  *H04N 19/17* (2014.01)
  *H04N 19/70* (2014.01)
  *H04N 19/44* (2014.01)

(58) Field of Classification Search
  USPC .................................................. 375/240, 211
  See application file for complete search history.

(56) References Cited

U.S. PATENT DOCUMENTS

| | | | |
|---|---|---|---|
| 9,936,196 B2* | 4/2018 | Chen | ...................... H04N 19/70 |
| 2013/0330002 A1 | 12/2013 | Christiansen | |
| 2013/0339482 A1 | 12/2013 | Yoshimoto | |
| 2014/0119437 A1 | 5/2014 | Chen et al. | |
| 2015/0281713 A1 | 10/2015 | Suzuki et al. | |

OTHER PUBLICATIONS

Ugur et al., "MV-HEVC/SHVC HLS: On default output layer sets," 16th Meeting, Joint Collaborative Team on Video Coding (JCT-VC) of ITU-T SG 16 WP3 and ISO/IEC JTC 1/SC 29/WG 11, JCTVC-P0110, Telecommunications Standardization Sector of ITU (Jan. 9-17, 2014).

Ramasubramonian et al., "On alt_output_layer_flag," 7th Meeting, Joint Collaborative Team on 3D Video Coding Extensions of ITU-T SG 16 WP3 and ISO/IEC JTC 1/SC 29/ WG 11, JCT3V-G0133, Telecommunications Standardization Sector of ITU (Jan. 11-17, 2014).

Cho et al., "MV-HEVC/SHVC HLS: On picture output marking process," 15th meeting, Joint Collaborative Team on Video Coding (JCT-VC) of ITU-T SG16 WP3 and ISO/IEC JTC 1/SC29/WG11, JCTVC-O0110, Telecommunications Standardization Sector of ITU, Geneva, Switzerland (Oct. 23-Nov. 1, 2013).

Lee et al., "MV-HEVC/ SHVC HLS: On output_layer_flag," 16th meeting, Joint Collaborative Team on Video Coding (JCT-VC) of ITU-T SG16 WP3 and ISO/IEC JTC1/SC29/WG11, JCTVC-P0078, Telecommunications Standardization Sector of ITU (Jan. 9-17, 2014).

Ugur et al., "MV-HEVC/SHVC HLS: On default output layer sets," 7th meeting, Joint Collaborative Team on 3D Video Coding Extensions of ITU-T SG16 WP3 and ISO/IEC JTC 1/SC29/WG11, JCT3V-G0116v2, JCTVC-P0110v2, Telecommunications Standardization Sector of ITU (Jan. 11-17, 2014).

Deshpande, "On DPB Parameters in VPS," 7th and 16th meeting Joint Collaborative Team on Video Coding (JCT-VC) of ITU-T SG 16 WP3 and ISO/IEC JTC 1/SC29WG11, JCTVC-P0156, JCT3V-G0145, Telecommunications Standardization Sector of ITU (Jan. 9-17, 2014).

Tsukuba et al., "MV-HEVC/SHVC HLS: Clean up for output layer set," 8th and 17th meeting Joint Collaborative Team on Video Coding (JCT-VC) of ITU-T SG16 WP3 and ISO/IEC JTC 1/SC 29/WG11, JCTVC-Q0165, JCT3V-H0053, Telecommunications Standardization Sector of ITU (Mar. 27-Apr. 4, 2014).

Ikai et al., "MV-HEVC/SHVC HLS: On layer set definition," Joint Collaborative Team on Video Coding (JCT-VC) of ITU-T SG 16 WP 3 and ISO/IEC JTC 1/SC 29/WG 11, 16th Meeting: San José, US, JCTVC-P0045, International Telecommunications Union, Geneva, Switzerland (Jan. 9-17, 2014).

U.S. Appl. No. 15/264,366, filed Sep. 13, 2016.

* cited by examiner

| nal_unit( NumBytesInNALunit ) { | Descriptor |
|---|---|
|   nal_unit_header( ) | |
|   NumBytesInRBSP = 0 | |
|   for( i = 2; i < NumBytesInNALunit; i++ ) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

FIG. 5(a)

| nal_unit_header( ) { | Descriptor |
|---|---|
|   forbidden_zero_bit | f(1) |
|   nal_unit_type | u(6) |
|   nuh_layer_id | u(6) |
|   nuh_temporal_id_plus1 | u(3) |
| } | |

FIG. 5(b)

| nal_unit_type | Name of nal_unit_type | Content of NAL unit and RBSP syntax structure | NAL unit type class |
|---|---|---|---|
| 0, 1 | TRAIL_N, TRAIL_R | Coded slice segment of a non-TSA, non-STSA trailing picture slice_segment_layer_rbsp( ) | VCL |
| 2, 3 | TSA_N, TSA_R | Coded slice segment of a TSA picture slice_segment_layer_rbsp( ) | VCL |
| 4, 5 | STSA_N, STSA_R | Coded slice segment of an STSA picture slice_layer_rbsp( ) | VCL |
| 6, 7 | RADL_N, RADL_R | Coded slice segment of a RADL picture slice_layer_rbsp( ) | VCL |
| 8, 9 | RASL_N, RASL_R | Coded slice segment of a RASL picture slice_layer_rbsp( ) | VCL |
| 10, 12, 14 | RSV_VCL_N10 RSV_VCL_N12 RSV_VCL_N14 | Reserved // reserved non-RAP non-reference VCL NAL unit types | VCL |
| 11, 13, 15 | RSV_VCL_R11 RSV_VCL_R13 RSV_VCL_R15 | Reserved // reserved non-RAP reference VCL NAL unit types | VCL |
| 16, 17, 18 | BLA_W_LP BLA_W_DLP BLA_N_LP | Coded slice segment of a BLA picture slice_segment_layer_rbsp( ) | VCL |
| 19, 20 | IDR_W_DLP IDR_N_LP | Coded slice segment of an IDR picture slice_segment_layer_rbsp( ) | VCL |
| 21 | CRA_NUT | Coded slice segment of a CRA picture slice_segment_layer_rbsp( ) | VCL |
| 22, 23 | RSV_RAP_VCL22.. RSV_RAP_VCL23 | Reserved // reserved RAP VCL NAL unit types | VCL |
| 24..31 | RSV_VCL24.. RSV_VCL31 | Reserved // reserved non-RAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39, 40 | PREFIX_SEI_NUT SUFFIX_SEI_NUT | Supplemental enhancement information (SEI) sei_rbsp( ) | non-VCL |
| 41..47 | RSV_NVCL41.. RSV_NVCL47 | Reserved | non-VCL |
| 48..63 | UNSPEC48.. UNSPEC63 | Unspecified | non-VCL |

Groupings: rows 0–15 → SYNA101; rows 16–23 → SYNA102; rows 32–34 → SYNA103.

FIG. 6

Video parameter set RBSP syntax

| video_parameter_set_rbsp( ) { | Descriptor | |
|---|---|---|
| vps_video_parameter_set_id | u(4) | SYNVPS01 |
| vps_reserved_three_2bits | u(2) | |
| vps_max_layers_minus1 | u(6) | SYNVPS02 |
| vps_max_sub_layers_minus1 | u(3) | SYNVPS03 |
| vps_temporal_id_nesting_flag | u(1) | |
| vps_reserved_0xffff_16bits | u(16) | |
| profile_tier_level( 1, vps_max_sub_layers_minus1 ) | | SYNVPS04 |
| ...OMITTED... | | |
| vps_max_layer_id | u(6) | SYNVPS05 |
| vps_num_layer_sets_minus1 | ue(v) | SYNVPS06 |
| for( i = 1; i <= vps_num_layer_sets_minus1; i++ ) | | |
|   for( j = 0; j <= vps_max_layer_id; j++ ) | | |
|     layer_id_included_flag[ i ][ j ] | | SYNVPS07 |
| ...OMITTED... | | |
| vps_timing_info_present_flag | u(1) | SYNVPS08 |
| if( vps_timing_info_present_flag ) { | | |
|   vps_num_units_in_tick | u(32) | SYNVPS09 |
|   vps_time_scale | u(32) | SYNVPS10 |
|   vps_poc_proportional_to_timing_flag | u(1) | SYNVPS11 |
|   if( vps_poc_proportional_to_timing_flag ) | | |
|     vps_num_ticks_poc_diff_one_minus1 | ue(v) | SYNVPS12 |
|   vps_num_hrd_parameters | ue(v) | SYNVPS13 |
|   for( i=0; i< vps_num_hrd_parameters; i++){ | | |
|     hrd_layer_set_idx[ i ] | ue(v) | SYNVPS14 |
|     if( i > 0 ) | | |
|       cprms_present_flag[ i ] | ue(v) | SYNVPS15 |
|       hrd_parameters( cprms_present_flag[i], vps_max_sub_layers_minus1) | | SYNVPS16 |
|   } | | |
| } | | |
| vps_extension_flag | u(1) | SYNVPS17 |
| if( vps_extension_flag ) { | | |
|   while(!byte_aligned( )) | | SYNVPS18 |
|     vps_extension_alignment_bit_equal_to_one | u(1) | |
|   vps_extension( ) | | SYNVPS19 |
|   vps_extension2_flag | u(1) | |
|   if( vps_extension2_flag) | | SYNVPS20 |
|     while( more_rbsp_data( ) ) | | |
|       vps_extension_data_flag | | |
| } | | |
| rbsp_trailing_bits( ) | | SYNVPS21 |
| } | | |

Video parameter set extension syntax

| vps_extension( ) { | Descriptor | |
|---|---|---|
| ... | | |
| vps_nuh_layer_id_present_flag | u(1) | — SYNVPS0A |
| for( i=1; i<= MaxLayersMinus1; i++) | | |
|   if( vps_nuh_layer_id_present_flag ) | | |
|     layer_id_in_nuh[ i ] | u(6) | — SYNVPS0B |
| ... | | |
| for( i = 1; i <= MaxLayersMinus1; i++ ) | | |
|   for( j = 0; j < i; j++ ) | | |
|     direct_dependency_flag[ i ][ j ] | u(1) | — SYNVPS0C |
| vps_num_profile_tier_level_minus1 | u(6) | — SYNVPS0D |
| for( i = 1; i <= vps_num_profile_tier_level_minus1; i++) { | | |
|   vps_profile_present_flag[ i ] | u(1) | — SYNVPS0E |
|   profile_tier_level( vps_profile_present_flag[ i ], | | — SYNVPS0F |
|     vps_max_sub_layers_minus1 ) | | |
| } | | |
| ... | | |
| if ( vps_num_layer_set_minus1>0 ) | | |
| { | | |
|   num_add_output_layer_sets | ue(v) | — SYNVPS0G |
|   default_target_output_layer_idc | u(2) | — SYNVPS0H |
| } | | |
| ... | | |
| NumOutputLayerSets = num_add_output_layer_sets + vps_num_layer_sets_minus1 + 1 | | |
| for( i = 1; i < NumOutputLayerSets; i++ ) { | | |
|   if( i > vps_num_layer_sets_minus1 ) | | |
|     output_layer_set_idx_minus1[ i ] | u(v) | — SYNVPS0I |
|   if( i > vps_num_layer_sets_minus1 \|\| default_target_output_layer_idc == 2 ) | | |
|     for( j = 0; j < NumLayersInIdList[ LayerSetIdxForOutputLayerSet[ i ] ]; j++) | | |
|       output_layer_flag[ i ][ j ] | u(1) | — SYNVPS0J |
|   profile_level_tier_idx[ i ] | u(v) | — SYNVPS0K |
| } | | |
| ... | | |
| dpb_size( ) | | — SYNVPS0L |
| ... | | |
| } | | |

FIG. 12(b)

Video parameter set extension syntax

| vps_extension( ) { | Descriptor | |
|---|---|---|
| ... | | |
| num_add_output_layer_sets | ue(v) | — SYNVPS0Ga |
| if(NumOutputLayerSets > 1) | | |
|   default_target_output_layer_idc | u(2) | — SYNVPS0a |
| ... | | |
| } | | |

Profile, tier, and level syntax

| profile_tier_level( profilePresentFlag, maxNumSubLayersMinus1 ) { | Descriptor | |
|---|---|---|
| if( profilePresentFlag ) { | | |
|   general_profile_space | u(2) | ⎫ |
|   general_tier_flag | u(1) | ⎪ |
|   general_profile_idc | u(5) | ⎪ |
|   for( i = 0; i < 32; i++ ) | | ⎪ |
|     general_profile_compatibility_flag[ i ] | u(1) | ⎬ SYNPTL01 |
|   general_progressive_source_flag | u(1) | ⎪ |
|   general_interlaced_source_flag | u(1) | ⎪ |
|   general_non_packed_constraint_flag | u(1) | ⎪ |
|   general_frame_only_constraint_flag | u(1) | ⎪ |
|   general_reserved_zero_44bits | u(44) | ⎭ |
| } | | |
| general_level_idc | u(8) | — SYNPTL02 |
| for( i = 0; i < MaxNumSubLayersMinus1; i++ ) { | | |
|   sub_layer_profile_present_flag[ i ] | u(1) | ⎫ SYNPTL03 |
|   sub_layer_level_present_flag[ i ] | u(1) | ⎭ |
| } | | |
| if( maxNumSubLayersMinus1 > 0 ) | | ⎫ |
|   for( i = maxNumSubLayersMinus1; i < 8; i++ ) | | ⎬ SYNPTL04 |
|     reserved_zero_2bits[ i ] | u(2) | ⎭ |
| for( i = 0; i < maxNumSubLayersMinus1; i++ ) { | | |
|   if( sub_layer_profile_present_flag[ i ] ) { | | ⎫ |
|     sub_layer_profile_space[ i ] | u(2) | ⎪ |
|     sub_layer_tier_flag[ i ] | u(1) | ⎪ |
|     sub_layer_profile_idc[ i ] | u(5) | ⎪ |
|     for( j = 0; j < 32; j++ ) | | ⎪ |
|       sub_layer_profile_compatibility_flag[ i ][ j ] | u(1) | ⎬ SYNPTL05 |
|     sub_layer_progressive_source_flag[ i ] | u(1) | ⎪ |
|     sub_layer_interlaced_source_flag[ i ] | u(1) | ⎪ |
|     sub_layer_non_packed_constraint_flag[ i ] | u(1) | ⎪ |
|     sub_layer_frame_only_constraint_flag[ i ] | u(1) | ⎪ |
|     sub_layer_reserved_zero_44bits[ i ] | u(44) | ⎭ |
|   } | | |
|   if( sub_layer_level_present_flag[ i ] ) | | ⎫ SYNPTL06 |
|     sub_layer_level_idc[ i ] | u(8) | ⎭ |
| } | | |
| } | | |

FIG. 13

Mapping of ScalabiltyId to scalability dimensions

| scalability mask index | Scalability dimension (dimension_id) | ScalabilityId mapping |
|---|---|---|
| 0 | Reserved | - |
| 1 | Multiview | View Order Index |
| 2 | Spatial/Quality (SNR) | DependencyId |
| 3 | Auxiliary | AuxId |
| 4-15 | Reserved | - |

Sequence parameter set RBSP syntax

| seq_parameter_set_rbsp( ) { | Descriptor | |
|---|---|---|
| sps_video_parameter_set_id | u(4) | ⎬ SYNSPS01 |
| if( nuh_layer_id == 0 ) { | | |
| sps_max_sub_layers_minus1 | u(3) | |
| sps_temporal_id_nesting_flag | u(1) | |
| profile_tier_level( 1, sps_max_sub_layers_minus1 ) | | |
| } | | |
| sps_seq_parameter_set_id | ue(v) | ⎬ SYNSPS02 |
| ... | | |
| } | | |

FIG. 15(b)

Picture parameter set RBSP syntax

| pic_parameter_set_rbsp( ) { | Descriptor | |
|---|---|---|
| pps_pic_parameter_set_id | ue(v) | ⎬ SYNPPS01 |
| pps_seq_parameter_set_id | ue(v) | ⎬ SYNPPS02 |
| ... | | |
| } | | |

FIG. 15(c)

Slice segment layer RBSP syntax

| slice_segment_layer_rbsp( ) { | Descriptor | |
|---|---|---|
| slice_segment_header( ) | | ⎬ SYNSL01 |
| slice_segment_data( ) | | ⎬ SYNSL02 |
| rbsp_slice_segment_trailing_bits( ) | | |
| } | | |

FIG. 15(d)

Slice segment header syntax

| slice_segment_header( ) { | Descriptor | |
|---|---|---|
| first_slice_segment_in_pic_flag | u(1) | ⎬ SYNSH01 |
| ... | | |
| slice_pic_parameter_set_id | ue(v) | ⎬ SYNSH02 |
| if( !first_slice_segment_in_pic_flag ) { | | |
| ... | | |
| slice_segment_address | u(v) | ⎬ SYNSH03 |
| } | | |
| ... | | |
| } | | |

FIG. 15(e)

Slice segment data syntax

| slice_segment_data( ) { | Descriptor | |
|---|---|---|
| do { | | |
| coding_tree_unit( ) | | ⎬ SYNSD01 |
| end_of_slice_segment_flag | ae(v) | ⎬ SYNSD02 |
| CtbAddrInTs++ | | |
| CtbAddrInRs = CtbAddrTsToRs[ CtbAddrInTs ] | | |
| ... | | |
| } while( !end_of_slice_segment_flag ) | | |
| } | | |

IMAGE DECODING APPARATUS

CROSS-REFERENCE TO RELATED APPLICATIONS

This application is a continuation of U.S. patent application Ser. No. 15/264,366, filed on Sep. 13, 2016, which is a continuation of International Application No. PCT/JP2015/056552, filed on Mar. 5, 2015. The International Application claims priority to Japanese Patent Application No. JP2014-051851, filed on Mar. 14, 2014. All of the aforementioned patent applications are hereby incorporated by reference in their entireties.

TECHNICAL FIELD

Embodiments of the present invention relate to an image decoding apparatus that decodes hierarchically coded data where images are hierarchically coded, and to an image coding apparatus that generates hierarchically coded data by hierarchically coding images.

BACKGROUND

Information transmitted by a communication system or information recorded in a storage apparatus include images or video. Conventionally, techniques for coding images (including video, hereinafter) in order to transmit and store these images have been known.

Video coding schemes, such as AVC (H.264/MPEG-4 Advanced Video Coding) and its succeeding codec HEVC (High-Efficiency Video Coding) (see Non-Patent Literature 1 on page 3 of this application), have been known.

According to these video coding schemes, typically, a predictive image is generated on the basis of a local decoded image obtained by coding/decoding an input image, and a predictive residue (referred to as a "difference image" or a "residual image"), which is obtained by subtracting the predictive image from the input image (original image), is coded. Methods of generating a predictive image include inter-screen prediction (inter prediction), and intra-screen prediction (intra prediction).

In recent years, a scalable coding technique or a hierarchical coding technique, that hierarchically codes images according to a required data rate, has been proposed. SHVC (Scalable HEVC) and MV-HEVC (MultiView HEVC) have been known as typical scalable coding schemes (hierarchical coding methods).

SHVC supports spatial scalability, temporal scalability, and SNR scalability. For example, in the case of the spatial scalability, an image down sampled from an original image to have a desired resolution is coded as a lower layer. Next, on a higher layer, inter-layer prediction is performed in order to remove inter-layer redundancy (see Non-Patent Literature 2 on page 3 of this application).

MV-HEVC supports viewpoint scalability (view scalability). For example, in the case of coding three viewpoint images that are a viewpoint image 0 (layer 0), a viewpoint image 1 (layer 1) and a viewpoint image 2 (layer 2), inter-layer redundancy can be removed by predicting the viewpoint images 1 and 2 on higher layers from the viewpoint image 0 on a lower layer (layer 0) through inter-layer prediction (see Non-Patent Literature 3 on page 3 of this application).

SHVC and MV-HEVC decode inputted hierarchically coded data to obtain each layer belonging to the designated target output layer set, and outputs a decoded picture on the layer designated as an output layer. What is decoded and coded as information related to the output layer set includes a layer set that represents a set of layers, an output layer flag that designates a layer as the output layer in the layer set, profile/level information (hereinafter, PTL information) corresponding to each layer set, HRD information, and DPB information.

In the conventional art, the output layer sets OLS #0 to OLS # (VpsNumLayerSets−1) are associated with layer sets LS #0 to LS #(VpsNumLayerSets−1) corresponding to the respective subscripts (also called output layer set identifier) of the output layer sets, and the output layer of each output layer set is determined by the value of the default output layer identifier (default_target_ouput_layer_idc). For example, when the value of the default output layer identifier is zero, all the layers in the output layer set are output layers. When the value of the default output layer identifier is one, the primary layer having the highest layer ID in the output layer set is the output layer. When the value of the default output layer identifier is two, the output layers in each layer set OLS #i (i=1 ... (VpsNumLayerSets−1)) is designated by the output layer flag (output_layer_flag) on which notification is explicitly issued.

When the additional output layer set is defined (the number of additional output layer sets (num_add_output_layer_sets) is at least zero), the output layer sets OLS #i (i=VpsNumLayerSets ... NumOuputLayerSets−1, the number of output layer sets NumOutputLayerSets=VpsNumlayerSets+num_add_output_layer_sets)) are associated with the layer sets LS #(LayerSetIdx[i]) designated by the layer set identifiers (LayerSetIdx[i]=output layer_set_idx_minus1[i]) on which notification is explicitly issued, and the output layer is designated by the output layer flag (output layer flag) on which notification is explicitly issued.

CITATION LIST

Non-Patent Literature

Non-Patent Literature 1: "Recommendation H.265 (April 13)", ITU-T (published on Jun. 7, 2013)

Non-Patent Literature 2: JCTVC-P1008_v4 "High efficiency video coding (HEVC) scalable extensions Draft 5", Joint Collaborative Team on Video Coding (JCT-VC) of ITU-T SG 16 WP 3 and ISO/IEC JTC 1/SC 29/WG 11 16th Meeting: San Jose, US, 9-17 Jan. 2014 (published on Jan. 22, 2014)

Non-Patent Literature 3: JCT3V-G1004_v6 "MV-HEVC Draft Text 7", Joint Collaborative Team on 3D Video Coding Extension Development of ITU-T SG 16 WP 3 and ISO/IEC JTC 1/SC 29/WG 11 7th Meeting: San Jose, US, 11-17 Jan. 2014. (published on Jan. 24, 2014)

SUMMARY

Problem to be Solved

Unfortunately, there are following problems on the output layer set.

In some cases, an output layer set without an output layer as shown in the output layer set OLS #4 in FIG. 1 may be defined. Consequently, even when a decoder decodes a bit stream to obtain each layer in the output layer set without the output layer, there is no picture to be outputted. There is a possibility that such coded data causes the decoder expecting an output to operate unexpectedly.

When the output layer is designated by explicit notification on the output layer flag, a problem occurs in that output layer sets having the same configuration as with the output layer sets OLS #1 and OLS #5 in FIG. 1 are defined. In this case, the amount of code pertaining to the output layer set overlappingly defined is redundant.

In the case where the number of layer sets (VpsNumLayerSets) is one, that is, in the case only with the layer set LS #0, the layer set LS #0 is made up only of the base layer (L #0). Consequently, the output layer is self-evidently L #0. In this case, there is a problem in that the amount of code pertaining to the default output layer identifier is redundant.

The present invention is made in view of the above problems, and has an object to achieve an image decoding apparatus and an image coding apparatus that specify a bit stream conformance pertaining to the output layer set, prevent occurrence of an output layer set without an output layer and a redundant output layer set, and improve a method of signaling information pertaining to the output layer set, thereby allowing information pertaining to the output layer set to be coded/decoded with a smaller amount of code.

Solution to Problem

To solve the above problems, an image decoding apparatus according to an aspect 1 of the present invention is an image decoding apparatus that decodes hierarchical image coded data including one or more layers, including: a layer set information decoding unit that decodes layer set information representing a layer configuration of a layer set; an output layer set information decoding unit that decodes a layer set identifier for identifying the layer set, and an output layer flag OutputLayerFlag for designating whether the layer included in the layer set is an output layer or not, and derives an output layer set; and a picture decoding unit that decodes a picture on the output layer included in the output layer set, wherein the output layer set includes at least one output layer.

Advantageous Effects of Invention

According to an aspect of the present invention, specification of the bit stream conformance pertaining to the output layer set can prevent occurrence of an output layer set without an output layer and a redundant output layer set.

BRIEF DESCRIPTION OF DRAWINGS

FIG. 2(a) shows a hierarchical video coding apparatus side, and FIG. 2(b) shows a hierarchical video decoding apparatus side;

FIG. 5(a) and FIG. 5(b) are a diagram showing an example of a syntax included in the NAL unit layer, FIG. 5(a) shows an example of the syntax configuring the NAL unit layer, and FIG. 5(b) shows an example of the syntax of an NAL unit header;

FIG. 6 is a diagram showing the relationship of a value of the NAL unit type and the kind of the NAL unit according to the embodiment of the present invention;

FIG. 8(a) is a diagram showing a sequence layer defining a sequence SEQ, FIG. 8(f) is a diagram showing a coding unit layer defining a coding unit (Coding Unit; CU) included in the coding tree;

FIG. 10(a) is a diagram schematically showing examples of the reference picture lists, and FIG. 10(b) is a diagram schematically showing examples of reference pictures;

FIG. 11 shows an example of a VPS syntax table according to the embodiment of the present invention;

FIG. 12(a) and FIG. 12(b) are shows an example of a VPS extension data syntax table, FIG. 12(a) shows an example of a VPS extension data syntax table according to the embodiment of the present invention, and FIG. 12(b) shows an example of a VPS extension data syntax table in a conventional art;

FIG. 13 shows an example of a syntax table of PTL information according to this embodiment;

FIG. 14 is a diagram showing a table of correspondence between scalability IDs and scalability types;

FIG. 15(a) and FIG. 15(e) shows an example of an SPS/PPS/slice layer syntax table according to the embodiment of the present invention, FIG. 15(a) shows an example of a syntax table of SPS, FIG. 15(b) shows an example of a syntax table of PPS, FIG. 15(c) shows an example of a syntax table of the slice header and the slice data included in the slice layer, FIG. 15(d) shows an example of a syntax table of the slice header, and FIG. 15(e) shows an example of a syntax table of the slice data;

FIG. 23(a) shows the transmitting apparatus mounted with the hierarchical video coding apparatus, and FIG. 23(b) shows the receiving apparatus mounted with the hierarchical video decoding apparatus; FIG. 24(a) shows the recording apparatus mounted with the hierarchical video coding apparatus, and FIG. 24(b) shows the reproducing apparatus mounted with the hierarchical video decoding apparatus.

DESCRIPTION OF EMBODIMENTS

Figure 1:
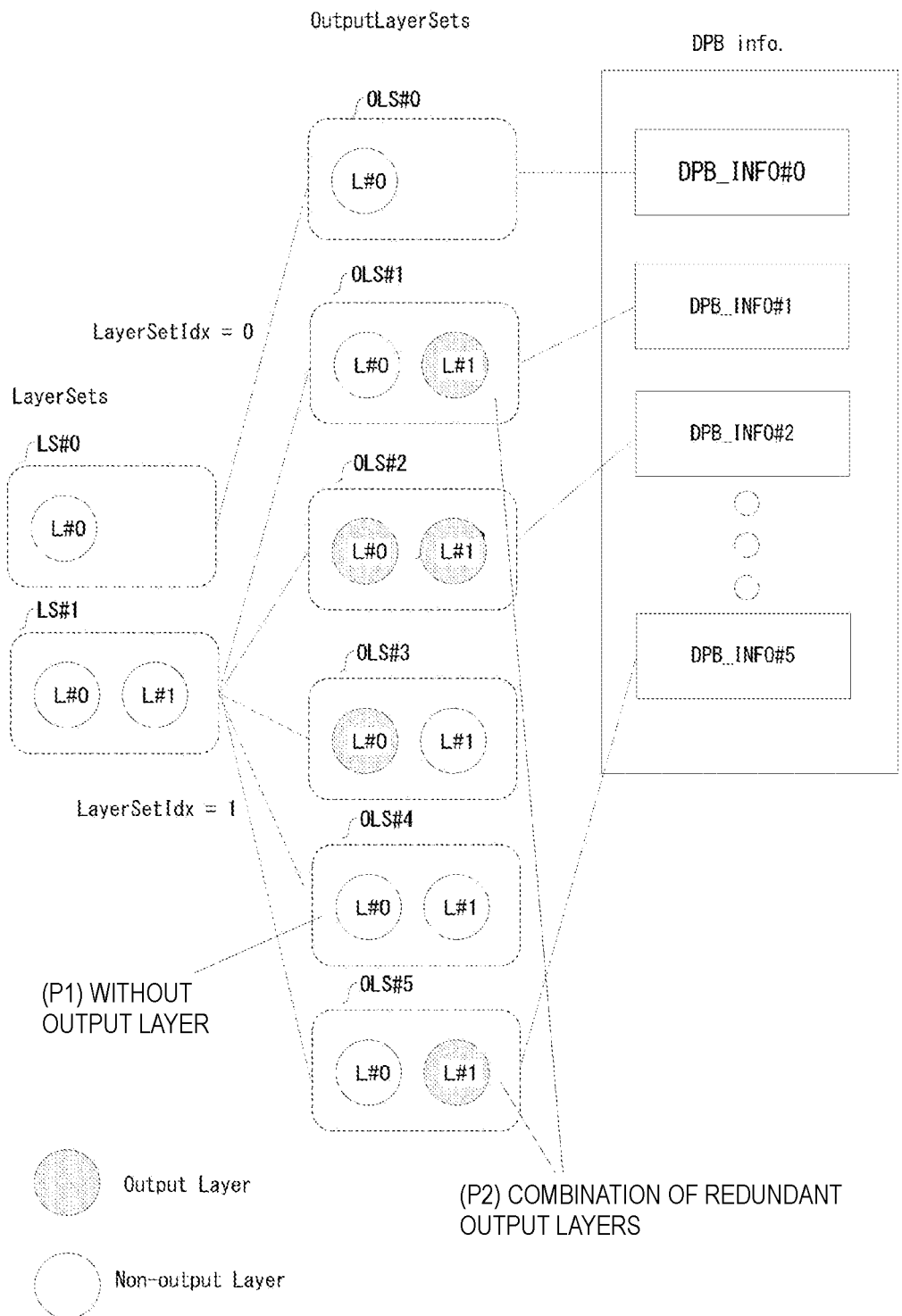
FIG. 1 is a diagram for illustrating problems pertaining to an output layer set in the conventional art, and exemplifying an example of an output layer set without an output layer and a redundant output layer set where the combination of output layers is the same.

Referring to FIGS. 2 to 24, a hierarchical video decoding apparatus 1 and a hierarchical video coding apparatus 2 according to an embodiment of the present invention are described as follows.

[Overview]

The hierarchical video decoding apparatus (image decoding apparatus) 1 according to this embodiment decodes coded data hierarchically coded by the hierarchical video coding apparatus (image coding apparatus) 2. The hierarchical coding is a coding scheme that codes video hierarchically from a low-quality component to a high-quality component. The hierarchical coding is standardized in, for example, SVC and SHVC. Here, the quality of video broadly means elements that have effects on the appearance of video in subjective and objective viewpoints. The quality of video includes, for example, "resolution", "frame rate", "image quality", and "pixel representation accuracy". Consequently, difference in video quality hereinafter indicates difference in "resolution" etc. in an exemplary manner. However, the difference is not limited thereto. For example, also in the case of that video is quantized in different quantization steps (i.e., the case that video is coded with different coding noise), the video quality can be regarded to be different from each other.

The hierarchical coding technique may be classified into (1) spatial scalability (2) temporal scalability (3) SNR (Signal to Noise Ratio) scalability, and (4) view scalability, in view of types of hierarchized information. The spatial scalability is a technique of hierarchization according to the resolution and the size of an image. The temporal scalability is a technique of hierarchization according to a frame rate (the number of frames per unit time). The SNR scalability is a technique of hierarchization according to coding noise. The view scalability is a technique of hierarchization according to viewpoint positions associated with respective images.

Prior to detailed description on the hierarchical video coding apparatus 2 and the hierarchical video decoding apparatus 1 according to this embodiment, (1) the layer structure of hierarchically coded data generated by the hierarchical video coding apparatus 2 and decoded by the hierarchical video decoding apparatus 1 is described, and subsequently (2) a specific example of data structures that can be adopted in respective layers is described.

[Layer Structure of Hierarchically Coded Data]

Figure 2A:
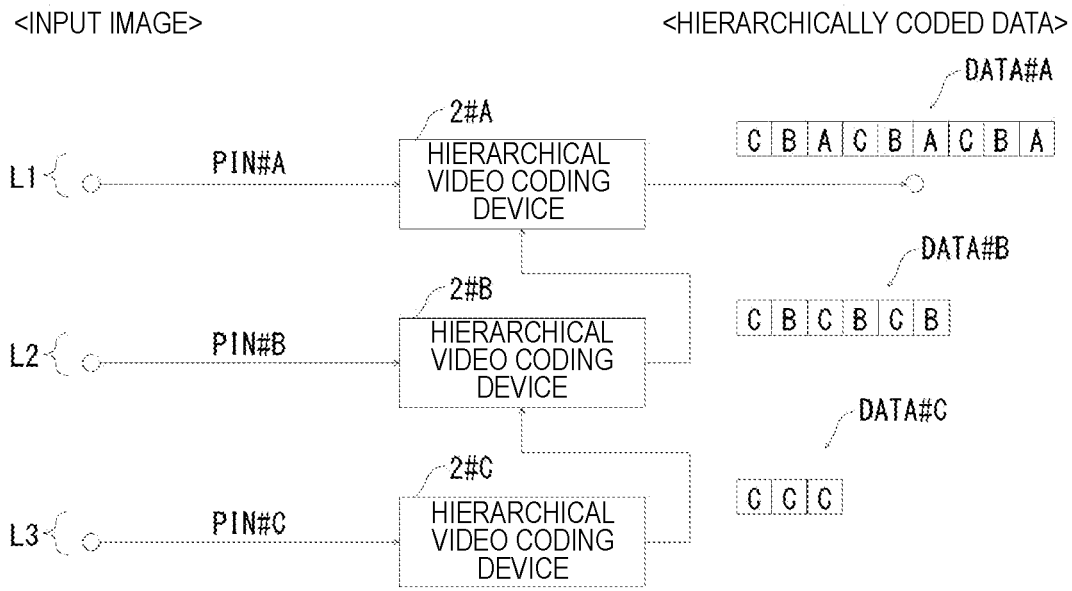
FIG. 2(a) and FIG. 2(b) are a diagram for illustrating a layer configuration of hierarchically coded data according to an embodiment of the present invention.
Figure 2B:
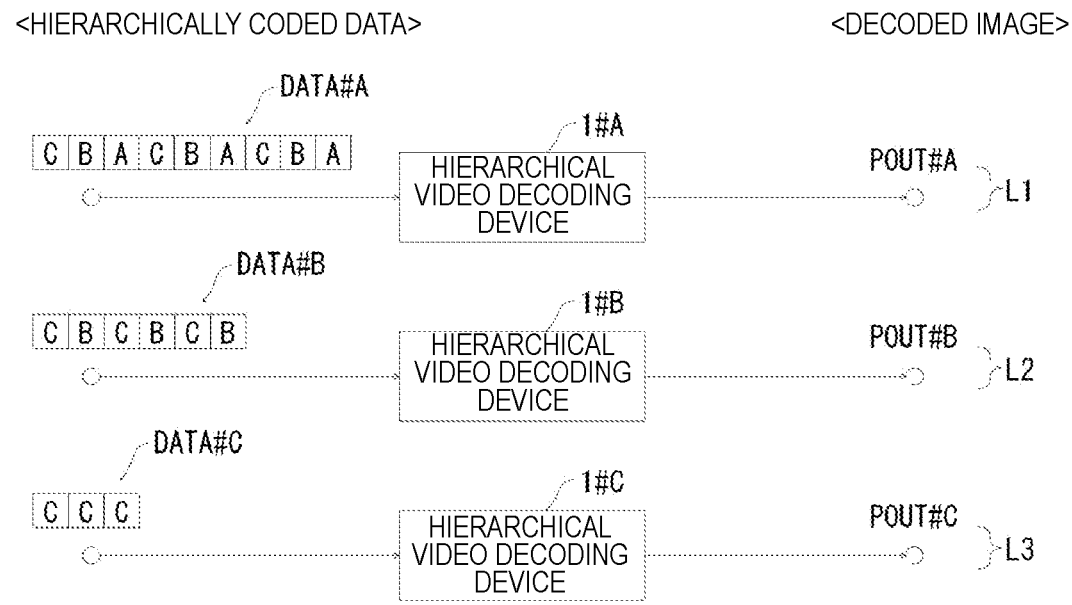

Here, referring to FIG. 2, coding and decoding of hierarchically coded data are described as follows. FIG. 2 is a diagram schematically showing the case of hierarchically coding/decoding video in three hierarchical layers of a lower hierarchical layer L3, a medium hierarchical layer L2, and a higher hierarchical layer L1. That is, in an example shown in FIGS. 2(a) and 2(b), among the three hierarchical layers, the higher hierarchical layer L1 is the highest layer, and the lower hierarchical layer L3 is the lowest layer.

A decoded image corresponding to a specific quality that can be decoded from the hierarchically coded data is hereinafter called a decoded image on a specific hierarchical layer (or a decoded image corresponding to a specific hierarchical layer) (e.g., a decoded image POUT #A on the higher hierarchical layer L1).

FIG. 2(a) shows hierarchical video coding apparatuses 2 #A to 2 #C that generate coded data DATA #A to DATA #C by hierarchically coding respective input images PIN #A to PIN #C. FIG. 2(b) shows hierarchical video decoding apparatus 1 #A to 1 #C that generate decoded images POUT #A to POUT #C by decoding respective coded data DATA #A to DATA #C having been hierarchically coded.

First, referring to FIG. 2(a), the coding apparatus side is described. The input images PIN #A, PIN #B and PIN #C, which are to be inputs on the coding apparatus side, have been originated from the same image, but are different in image quality (resolution, frame rate, image quality, etc.). The image quality becomes lower in an order of the input images PIN #A, PIN #B and PIN #C.

The hierarchical video coding apparatus 2 #C on the lower hierarchical layer L3 codes the input image PIN #C on the lower hierarchical layer L3 to generate the coded data DATA #C on the lower hierarchical layer L3. Basic information required for decoding to obtain the decoded image POUT #C on the lower hierarchical layer L3 is included (indicated as "C" in FIG. 2). The lower hierarchical layer L3 is the lowest hierarchical layer. Consequently, the coded data DATA #C on the lower hierarchical layer L3 is also called basic coded data.

The hierarchical video coding apparatus 2 #B on the medium hierarchical layer L2 codes the input image PIN #B on the medium hierarchical layer L2 to generate the coded data DATA #B on the medium hierarchical layer L2 with reference to the coded data DATA #C on the lower hierarchical layer. The coded data DATA #B on the medium hierarchical layer L2 includes not only the basic information "C" included in the coded data DATA #C but also additional information (indicated as "B" in FIG. 2) required for decoding to obtain the decoded image POUT #B on the medium hierarchical layer.

The hierarchical video coding apparatus 2 #A on the higher hierarchical layer L1 codes the input image PIN #A on the higher hierarchical layer L1 to generate the coded data DATA #A on the higher hierarchical layer L1 with reference to the coded data DATA #B on the medium layer L2. The coded data DATA #A on the higher hierarchical layer L1 includes not only the basic information "C" required for decoding to obtain the decoded image POUT #C on the lower hierarchical layer L3 and the additional information "B" required for decoding to obtain the decoded image POUT #B on the medium hierarchical layer L2, but also additional information (indicated as "A" in FIG. 2) required for decoding to obtain the decoded image POUT #A on the higher hierarchical layer.

As described above, the coded data DATA #A on the higher hierarchical layer L1 includes information pertaining to the decoded images with variable qualities.

Now, referring to FIG. 2(b), the decoding apparatus side is described. On the decoding apparatus side, the decoding apparatus 1 #A, 1 #B and 1 #C, which correspond to the higher hierarchical layer L1, the medium hierarchical layer L2 and the lower hierarchical layer L3, respectively, decode the coded data DATA #A, DATA #B and DATA #C to output the decoded images POUT #A, POUT #B and POUT #C.

Video with a specific quality can be reproduced by extracting a part of information on the higher hierarchically coded data (also called bit stream extraction) and by decoding the extracted information in a specific decoding apparatus on a lower level.

For example, the hierarchical decoding apparatus 1 #B on the medium hierarchical layer L2 may extract the information required for decoding to obtain the decoded image POUT #B (i.e., "B" and "C" included in the hierarchically coded data DATA #A) from the hierarchically coded data DATA #A on the higher hierarchical layer L1, and perform decoding to obtain the decoded image POUT #B. In other words, on the decoding apparatus side, the decoded images POUT #A, POUT #B and POUT #C can be obtained through decoding, on the basis of the information included in the hierarchically coded data DATA #A on the higher hierarchical layer L1.

The hierarchically coded data is not limited to the three-hierarchical-layered data described above. Alternatively, the hierarchically coded data may be hierarchically coded in two hierarchical layers, or hierarchically coded in layers that are more than three hierarchical layers.

A part or the entire coded data pertaining to the decoded image on a specific hierarchical layer may be coded independently of the other hierarchical layers to configure the hierarchically coded data so as to negate the need to refer to information on the other hierarchical layers during decoding on the specific hierarchical layer. For example, the description has been made such that in the example described above with reference to FIGS. 2(a) and 2(b), "C" and "B" are referred to for decoding to obtain the decoded image POUT #B. However, the reference is not limited thereto. The hierarchically coded data can be configured so as to allow the decoded image POUT #B to be obtained through decoding only use of "B". For example, a hierarchical video decoding apparatus can be configured that receives, as input, hierarchically coded data consisting only of "B" and the decoded image POUT #C, for decoding to obtain the decoded image POUT #B.

In the case of achieving the SNR scalability, the hierarchically coded data may be generated so that even when the same original image is used as input images PIN #A, PIN #B and PIN #C, and the decoded images POUT #A, POUT #B and POUT #C have different image qualities. In this case, the hierarchical video coding apparatus on the lower hierarchical layer generates the hierarchically coded data by quantizing the predictive residue using a larger quantization width than the hierarchical video coding apparatus on the higher hierarchical layer does.

In this description, for the sake of illustration, terms are defined as follows. The following terms are used to represent technical issues described below if not otherwise specified.

Profile: a profile specifies a processing function that a decoder complying with standards has assuming a specific application. The processing function is defined by a combination or a set of coding tools (element technology). The definition of the profile allows each application to implement only a suitable profile instead of the entire standards, thereby achieving an advantage of reducing the complexity of the decoder/encoder.

Level: a level specifies the upper limit of processing capability of the decoder and the range of the circuit size, and thus specifies limits on parameters, such as the maximum number of processing pixels per unit time, the maximum resolution of an image, the maximum bitrate, the maximum reference image buffer size, and the minimum compression ratio. That is, the level specifies the processing capability of the decoder and the complexity of the bit stream. The level also specifies the range up to which a tool specified by each profile is supported. Thus, the lower level is required to be supported by the upper level. For example, level-limited various parameters include the maximum luma picture size (Max luma picture size), the maximum bitrate (Max bitrate), maximum CPB size (Max CPB size), the number of maximum slice segments per picture (Max slice segments per picture), the maximum number of tile rows per picture unit (Max number of tile rows), and the maximum number of tile columns per picture unit (Max number of tile columns). The level-limited various parameters to be applied to specific profiles include the maximum luma sample rate (Max luma sample rate), the maximum bitrate (Max bitrate), and the minimum compression ratio (Min compression Ratio). One of a sub concept of the level is a "tier" that represents the maximum bitrates of bit streams (coded data) corresponding to the respective levels, and whether the maximum size of CPB for storing a bit stream is a value specified in a main tier (for a consumer) or a value specified in a high tier (for business use).

HRD (Hypothetical Reference Decoder): an HRD is a hypothetical model of a decoder mainly on the operation of a buffer, and also called a buffer model. The HRD includes (1) a CPB (Coded Picture Buffer) that is a transmission buffer for a bit stream, (2) a decoding processor that instantaneously performs a decoding operation, (3) a DPB (Decoded Picture Buffer) that stores the decoded picture, and (4) a cropping processor that performs a process of cutting out (a process of cutting out only an effective region of an image).

The basic operation of HRD is as follows.

(SA01) The input bit stream is stored in the CPB.

(SA02) An instantaneous decoding process is applied to the AU stored in the CPB.

(SA03) The decoded picture obtained by being subjected to the instantaneous decoding process is stored in the DPB.

(SA04) The decoded picture stored in the DPB is cropped and output.

HRD parameters: HRD parameters are parameters that indicate a buffer model used to verify whether the inputted bit stream satisfies the conformance condition in the HRD or not.

Bit stream conformance: a bit stream conformance is a condition satisfied by the bit stream decoded by the hierarchical video decoding apparatus (here, the hierarchical video decoding apparatus according to the embodiment of the present invention). Likewise, as to the bit stream generated by the hierarchical video coding apparatus (here, the hierarchical video coding apparatus according to the embodiment of the present invention), the bit stream conformance is required to be satisfied to securely allow the bit stream to be decoded by the hierarchical video decoding apparatus.

VCL NAL unit: VCL (Video Coding Layer) NAL unit is an NAL unit containing video (video signal) coded data. For example, the VCL NAL unit contains slice data (CTU coded data), and header information (slice header) commonly used through decoding the slice.

Non-VCL NAL unit: a non-VCL (non-Video Coding Layer, non-VCL) NAL unit is an NAL unit that contains coded data, such as header information or auxiliary information SE, which is a set of coding parameters used for decoding to obtain sequences and pictures, such as a video parameter set VPS, sequence parameter set SPS, and picture parameter set PPS.

Layer identifier: a layer identifier (also called layer ID) is for identifying the hierarchical layer (layer), and corresponds to the hierarchical layer on a one-to-one basis. The hierarchically coded data contains an identifier used to select partially coded data required for decoding to obtain a decoded image on a specific hierarchical layer. A subset of hierarchically coded data associated with a layer identifier corresponding to a specific layer is also called layer representation.

Typically, for the sake of decoding to obtain a decoded image on a specific hierarchical layer, the layer representation on the hierarchical layer and/or the layer representation corresponding to the lower layer of the hierarchical layer concerned are used. That is, for the sake of decoding to obtain the decoded image on the target layer, the layer representation on the target layer and/or the layer representation on at least one hierarchical layer included in the lower layer of the target layer are used.

Layer: a set of VCL NAL units having the value of layer identifier on the specific hierarchical layer (nuh_layer_id, nuhLayerId) and non-VCL NAL units associated with the VCL NAL units, or a set of syntax structures having hierarchical relationship.

Higher layer: a hierarchical layer disposed higher than a certain hierarchical layer is called a higher layer. For example, in FIG. 2, the higher layers of the lower hierarchical layer L3 are the medium hierarchical layer L2 and the higher hierarchical layer L1. A decoded image on the higher layer means a decoded image with a higher quality (e.g., high resolution, high frame rate, high image quality, etc.).

Lower layer: a hierarchical layer disposed lower than a certain hierarchical layer is called a lower layer. For example, in FIG. 2, the lower layers of the higher hierarchical layer L1 are the medium hierarchical layer L2 and the lower hierarchical layer L3. The decoded image on the lower layer means a decoded image with a lower quality.

Target layer: a hierarchical layer that is a target of decoding or coding. A decoded image corresponding to the target layer is called a target layer picture. Pixels constituting the target layer picture are referred to as target layer pixels.

Output layer: a layer where designation is made that outputs, as an output picture, the decoded picture on this layer among decoding or coding target layers.

Reference layer: a specific lower layer to be referred to for decoding to obtain the decoded image corresponding to the target layer is called a reference layer. The decoded image corresponding to the reference layer is called a reference layer picture. Pixels constituting the reference layer are referred to as reference layer pixels.

In the example shown in FIGS. 2(a) and 2(b), the reference layers of the higher hierarchical layer L1 are the medium hierarchical layer L2 and the lower hierarchical layer L3. However, the configuration is not limited thereto. Alternatively, the hierarchically coded data may be configured so as to negate the need to refer to all the lower layers during decoding to obtain the specific layer. For example, the hierarchically coded data may be configured for the reference layer of the higher hierarchical layer L1 to be any of the medium hierarchical layer L2 and the lower hierarchical layer L3. The reference layer can be represented as a layer different from the target layer that is used (referred to) to predict the coding parameter and the like used to decode the target layer. A reference layer directly referred to during inter-layer prediction on the target layer is called a direct reference layer. The direct reference layer B, which is referred to in inter-layer prediction on the direct reference layer A of the target layer, is also called an indirect reference layer of the target layer because the target layer indirectly depends thereon. In other words, in the case where the layer i depends on the layer j through one or more layers k (i<k<j), the layer j is the indirect reference layer of the layer i. The direct reference layer and the indirect reference layer to the target layer are collectively called dependence layers.

Basic layer: the hierarchical layer arranged on the lowest layer is called a basic layer. A decoded image on the basic layer is a decoded image into which the coded data is decoded and which has the lowest quality, and is called a basic decoded image. In other words, the basic decoded image is a decoded image corresponding to the lowest hierarchical layer. A partially coded data of the hierarchically coded data required for decoding to obtain the basic decoded image is called basic coded data. For example, basic information "C" contained in hierarchically coded data DATA #A on the higher hierarchical layer L1 is the basic coded data. The basic layer includes at least the same layer identifier, and is a layer which includes one or more VCL NAL units and whose layer identifier (nuh_layer_id) has a value of zero.

Non-base layer: a higher layer of the basic layer is called a non-base layer. The non-base layer is a layer including one or more VCL NAL units which have at least the same layer identifier, the layer identifier (nuh_layer_id) having a value higher than zero.

Inter-layer prediction: the inter-layer prediction is prediction of the syntax element value on the target value, a coding parameter used to decode the target layer and the like, on the basis of the syntax element value included in the layer representation on the hierarchical layer (reference layer) different from the layer representation on the target layer, of a value derived from the syntax element value and of the decoded image. The inter-layer prediction that predicts information pertaining to the motion information from the information on the reference layer may be called inter-layer motion information prediction. The inter-layer prediction from the decoded image on the lower layer may be called inter-layer image prediction (or inter-layer texture prediction). The hierarchical layer used for inter-layer prediction is exemplified as the lower layer of the target layer. Prediction in the target layer without using the reference layer may be called intra-layer prediction.

Temporal identifier: a temporal identifier (a temporal ID) is an identifier for identifying the layer pertaining to temporal scalability (hereinafter called sub-layer). The temporal identifier is for identifying a sub-layer, and corresponds to the sub-layer on a one-to-one basis. The coded data contains a temporal identifier used to select partially coded data required for decoding to obtain a decoded image on a specific sub-layer. In particular, the temporal identifier on the highest (uppermost) sub-layer is called the highest (uppermost) temporal identifier (highest TemporalId, highestTid).

Sub-layer: a sub-layer is a layer pertaining to temporal scalability identified by the temporal identifier. For the sake of discrimination from other scalabilities, such as spatial scalability and SNR scalability, this is hereinafter called a sub-layer (also called temporal layer). It is hereinafter assumed that the temporal scalability is achieved by a sub-layer contained in the coded data on the basic layer, or the hierarchically coded data required for decoding on a certain layer.

Layer set: a layer set is a set of layers that include at least one layer. In particular, the configuration of the layer set is represented by a layer ID list LayerSetLayerIdList[ ] (or LayerIdList[ ]). The layer ID for identifying a layer included in the layer set (or an index indicating the order of layer on the VPS) is stored in each of elements of a layer ID list LayerIdList[K] (K=0 . . . N−1, N is the number of layers included in the layer set).

Output layer set: an output layer set is a set of layers where the layers included in the layer set are designated whether the layers are output layers or not. The output layer set may also be represented as a set represented by a combination of the layer set and output layer flags designating the output layers.

Bit stream extraction process: a bit stream extraction process is a process that removes (discards) NAL units that are not contained in a set (called a target set TargetSet) defined by the target highest temporal identifier (highestTid) and a layer ID list LayerIdList[ ] indicating layers contained in the target layer set, from a certain bit stream (hierarchically coded data, coded data), and extracts a bit stream including NAL units contained in the target set TargetSet. The bit stream extraction is also called sub-bit-stream extraction.

The target highest temporal identifier is also called TargetHighestTid, the target layer set is also called TargetLayerSet, and the layer ID list of the target layer set (target layer ID list) is also called TargetLayerIdList. In particular, the layer ID list that is to be a decoding target is also called TargetDecLayerIdList. The bit stream that is generated through bit stream extraction and includes the NAL units contained in the target set TargetSet is also called coded data BitsreamToDecode.

Figure 3:
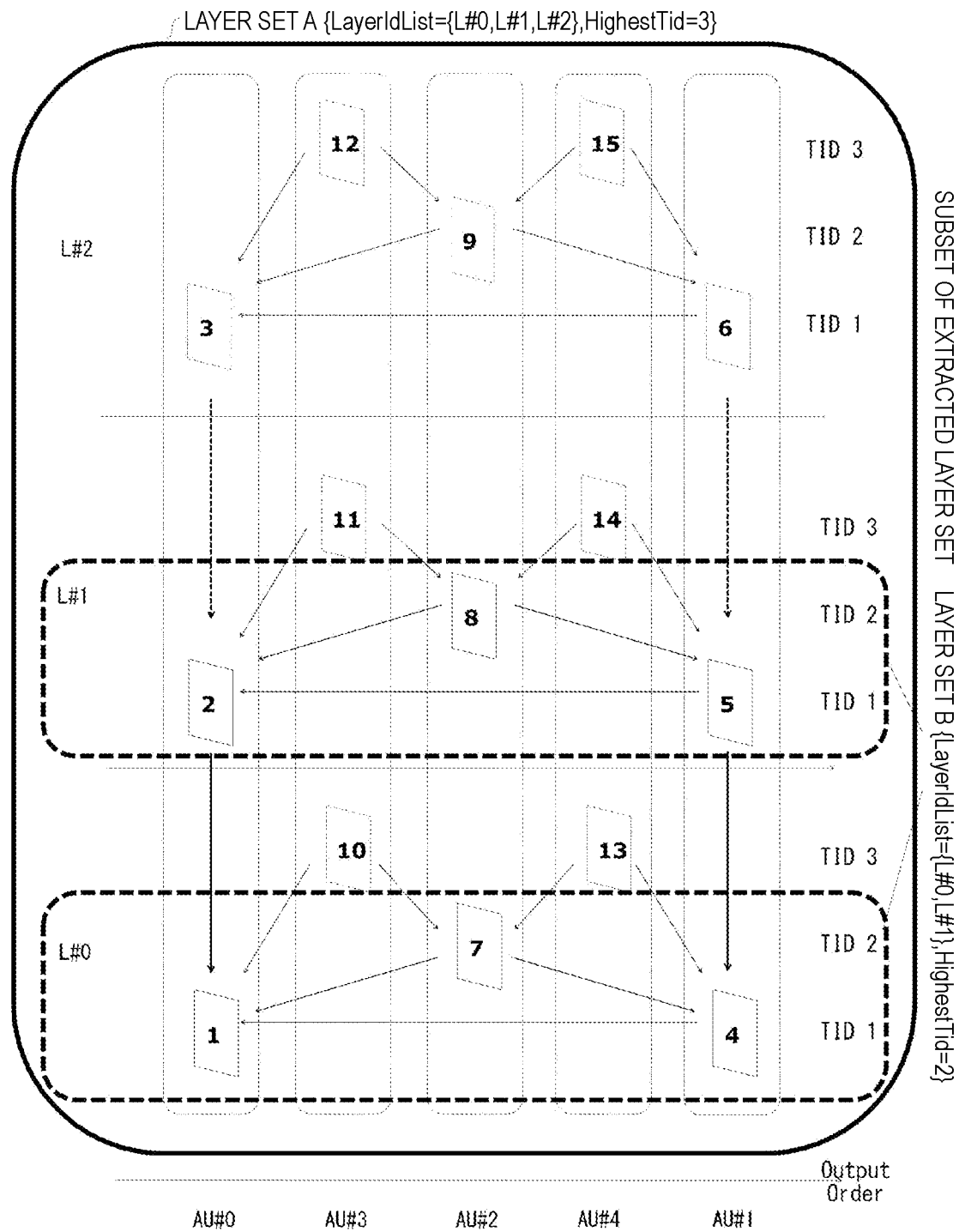
FIG. 3 is a diagram for illustrating a bit stream extraction process, and shows the configurations of a layer set A and a layer set B that is a subset thereof.

Next, referring to FIG. 3, an example is described where the bit stream extraction process extracts, from the hierarchically coded data containing a certain layer set A, the hierarchically coded data containing a layer set B, which is a subset of the layer set A.

FIG. 3 shows the configurations of the layer set A that includes three layers (L #0, L #1 and L #2) each made up of three sub-layers (TID1, TID2 and TID3), and the layer set B that is a subset thereof. The layers that constitute a layer set, and sub-layers are hereinafter represented as {LayerIdList={L #0, . . . , L #N}, HighestTid=K}. For example, the layer set A in FIG. 3 is represented as {LayerIdList={L #0,L #1,L #2}, HighestTid=3}. Here, the symbol L #N indicates a certain layer N, boxes in FIG. 3 each indicate a picture, and the numbers in respective boxes indicate an example of a decoding order. Hereinafter, a picture with a number N is represented as P #N.

Arrows between pictures represent dependence directions between pictures (reference relationship). Arrows in the same layer represent reference pictures used for inter prediction. Arrows between layers represent reference pictures used for inter-layer prediction (also called reference layer pictures).

AU in FIG. 3 represents an access unit, and a symbol #N indicates the access unit number. Provided that AU at a certain starting point (e.g., the start point of random access) is represented as AU #0, AU #N represents the (N−1)-th access unit, and represents the order of AU contained in the bit stream. That is, in the example of FIG. 3, the access units are aligned on the bit stream in an order of AU #0, AU #1, AU #2, AU #3, AU #4 . . . . The access unit represents a set of NAL units complied according to a specific classification rule. AU #0 in FIG. 3 can be regarded as a set of VCL NALs containing coded data of pictures P #1, P #1 and P #3. The details of the access unit are described later. In this Description, in the case of representation of an X-th order, it is assumed that the leading element is 0-th element, and the order is counted from the 0-th element (hereinafter, same as above).

In the example of FIG. 3, the target set TargetSet (layer set B) is {LayerIdList={L #0, L #1}, HighestTid=2}. Consequently, layers that are not contained in the target set TargetSet, and sub-layers having values higher than the highest temporal ID (HighestTid=2) are discarded from the bit stream containing the layer set A through bit stream extraction. That is, the layer L #2 and the sub-layer (TID3) that are not included in the layer ID list are discarded. Finally, the bit stream containing the layer set B is extracted. In FIG. 3, broken-line boxes represent discarded pictures. Broken-line arrows indicate the dependence directions between the discarded pictures and the reference pictures. As the NAL units constituting the pictures on the layer L #3 and sub-layer TID3 have already been discarded, the dependency relationship has already been broken off.

SHVC and MV-HEVC adopt concepts of layers and sub-layers in order to achieve the SNR scalability, the spatial scalability, the temporal scalability and the like. As described in FIG. 3, in the case of changing the frame rate to achieve the temporal scalability, coded data of pictures (highest temporal ID (TID3)) which are not referred to by another picture are discarded through the bit stream extraction process. In the case of FIG. 3, the coded data of the pictures (10, 13, 11, 14, 12 and 15) are discarded, thereby generating coded data at a frame rate of 1/2.

In the case of achieving the SNR scalability, the spatial scalability and the view scalability, the coded data on the layer not contained in the target set TargetSet are discarded through bit stream extraction, thereby the granularity of each scalability is changed. In the case of FIG. 3, the coded data of the pictures (3, 6, 9, 12 and 15) are discarded, thereby generating coded data with a rough granularity of scalability. Repetition of the above process can gradually adjust the granularities of layers and sub-layers.

The terms described above are used for the sake of convenience for description. Consequently, the above technical matters may be represented in other terms.

[Data Structure of Hierarchically Coded Data]

The case of using HEVC and its extended scheme is exemplified as the coding scheme for generating coded data on the respective hierarchical layers. However, the example is not limited thereto. Alternatively, the coded data on the respective hierarchical layers may be generated according to a coding scheme, such as MPEG-2 or H.264/AVC.

The lower layer and the higher layer may be coded according to different coding schemes. The coded data on the respective hierarchical layers may be supplied to the hierarchical video decoding apparatus 1 through transmission paths different from each other, or to the hierarchical video decoding apparatus 1 through the same transmission path.

For example, in the case of scalable-coding ultrahigh-definition video (video, 4K video data) through the basic layer and one extended layer and transmitting the coded video, the basic layer may code video data obtained by downscaling and interlacing 4K video data, according to MPEG-2 or H.264/AVC, transmit the coded data through a television broadcasting network, while the extended layer may code 4K video (progressive) through HEVC and transmit the coded video via the Internet.

<Structure of Hierarchically Coded Data DATA>

Prior to detailed description on the image coding apparatus 2 and the image decoding apparatus 1 according to this embodiment, the data structure of hierarchically coded data DATA, which is generated by the image coding apparatus 2 and decoded by the image decoding apparatus 1, are described.

(NAL Unit Layer)

Figure 4:
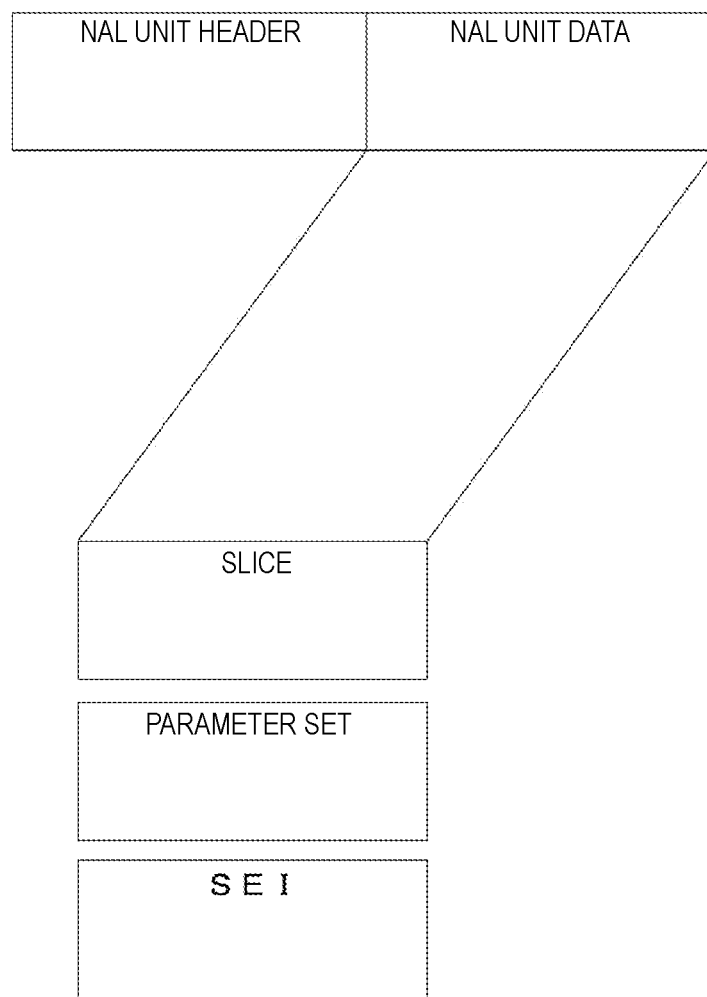
FIG. 4 is a diagram showing an example of the data structure that configures an NAL unit layer.

FIG. 4 is a diagram showing the hierarchical layer data structure of hierarchically coded data DATA. The hierarchically coded data DATA is coded on the basis of a unit called NAL (Network Abstraction Layer) unit.

NAL is a layer provided to abstract communication between a VCL (Video Coding Layer) that is a layer for performing a video coding process, and a lower system for transmitting and accumulating the coded data.

VCL is a layer for performing an image coding process. On VCL, coding is performed. Meanwhile, the so called a lower system corresponds to the file formats of H.264/AVC and HEVC, and the MPEG-2 system etc. In an example described below, the lower system corresponds to decoding processes on the target layer and the reference layer. In NAL, the bit stream generated on VCL is delimited in units that are NAL units, and transmitted to the lower system, which is the destination.

FIG. 5(a) shows a syntax table of an NAL unit. The NAL unit includes a coded data that is coded on VCL, and a header (NAL unit header: nal_unit_header( )) for allowing the coded data to be appropriately delivered to the lower system, which is the destination. The NAL unit header is, for example, represented according to the syntax shown in FIG. 5(b). In the NAL unit header there are described "nal_unit_type" that represents the type of the coded data stored in the NAL unit, "nuh_temporal_id plus1" that represents the identifier (temporal identifier) of the sub-layer to which the stored coded data belongs, and "nuh_layer_id" (or nuh_reserved_zero_6bits) that represents the identifier (layer identifier) of the layer to which the stored coded data belongs. Meanwhile, the NAL unit data includes a parameter set, SEI, slice, etc., which are described later.

FIG. 6 is a diagram showing the relationship of the value of the NAL unit type and the kind of the NAL unit. As shown in FIG. 6, NAL units having NAL unit types with values ranging from 0 to 15 indicated by SYNA101 are slices of non-RAP (random access picture). NAL units having NAL unit types with values ranging from 16 to 21 indicated by SYNA102 are slices of RAP (random access point picture, IRAP picture). The RAP pictures are roughly classified into BLA pictures, IDR pictures, and CRA pictures. The BLA pictures are further classified into BLA_W_LP, BLA_W_DLP and BLA_N_LP. The IDR pictures are further classified into IDR_W_DLP and IDR_N_LP. Pictures other than the RAP pictures include leading pictures (LP pictures), temporal access pictures (TSA pictures, STSA pictures), and trailing pictures (TRAIL pictures). The coded data on each hierarchical layer is stored in the NAL unit to thus be NAL-multiplexed, and is transmitted to the hierarchical video decoding apparatus 1.

As shown especially in NAL Unit Type Class in FIG. 6, the NAL units are classified into data (VCL data) constituting pictures and other data (non-VCL), according to the NAL unit type. All the pictures are classified into the VCL NAL units regardless of the kind of picture, such as random access pictures, leading pictures, and trailing pictures. A parameter set that is data required for decoding to obtain the picture, SEI that is auxiliary information on the picture, an access unit delimiter (AUD) that indicates delimitations for the sequence, end of sequence (EOS), an end of bit stream (EOB) and the like are classified into non-VCL NAL units.

(Access Unit)

The set of NAL units complied according to the specific classification rule is called an access unit. In the case where the number of layers is one, the access unit is a set of NAL units configuring one picture. In the case where the number of layers is more than one, the access unit is a set of NAL units configuring pictures on multiple layers at the same time (same output timing). In order to indicate the delimitation between access units, the coded data may include an NAL unit that is called an access unit delimiter (AUD: Access unit delimiter). The access unit delimiter is included between a set of NAL units configuring a certain access unit in the coded data, and a set of NAL units configuring another access unit.

Figure 7:
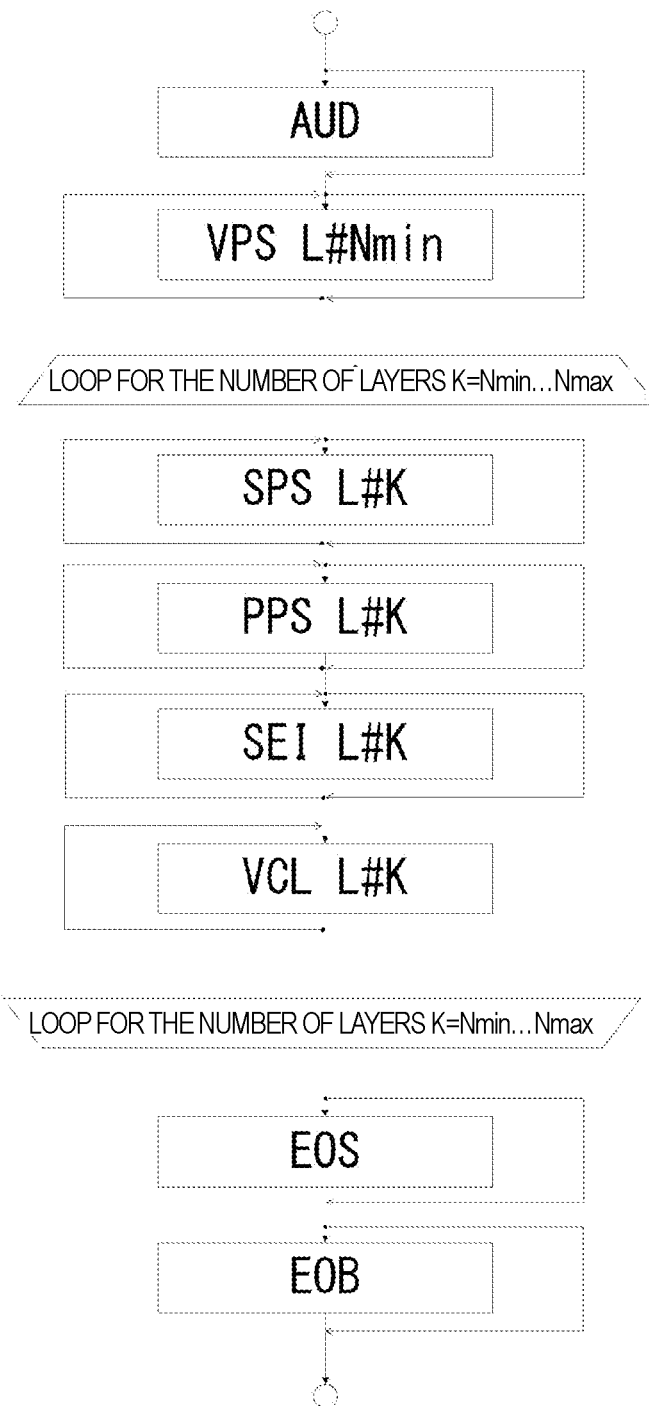
FIG. 7 is a diagram showing an example of a configuration of the NAL unit included in an access unit.

FIG. 7 is a diagram showing an example of the configuration of the NAL unit included in the access unit. In the figure, AU includes NAL units, such as an access unit delimiter (AUD) that shows the leading position of AU, various parameter sets (VPS, SPS, and PPS), various SEIs (Prefix SEI, and Suffix SEI), VCL (slice) constituting one picture in the case where the number of layers is one, VCL constituting pictures as many as the number of layers in the case where the number of layers is more than one, EOS (End of Sequence) showing the end of a sequence, and EOB (End of Bitstream) showing the end of a bit stream. In FIG. 7, codes L #K (K=Nmin . . . Nmax) after VPS, SPS, SEI and VCL represent layer IDs (or an index indicating the order of layer defined on VPS). According to the example of FIG. 7, SPS, PPS, SEI and VCL of each of the layers L #Nmin to L #Nmax, except VPS, are in AU in an ascending order of the layer ID (or an index indicating the order of layer defined on VPS). In the example in FIG. 7, the VPS is transmitted only through that with the lowest layer ID. FIG. 7 shows whether a specific NAL unit is present in AU or repetitively present, by means of arrows.

For example, the case of presence of the specific NAL unit in AU is indicated by an arrow passing through the NAL unit. The case of absence of the specific NAL unit in AU is indicated by an arrow skipping this NAL unit. For example, an arrow that does not pass through AUD but is toward VPS indicates the case of absence of AUD in AU. An arrow that passes through the VCL and then returns to the VCL indicates a case of presence of at least one VCL.

Although the VPS having a higher layer ID other than the lowest one may be included in AU, the image decoding apparatus ignores the VPS having the layer ID other than the lowest one. Various parameter sets (VPS, SPS and PPS), and SEI, which is auxiliary information, may be included as a part of the access unit as shown in FIG. 7, or transmitted to a decoder through what is different from the bit stream. FIG. 7 is only one embodiment of the configuration of the NAL unit included in the access unit. The configuration of the NAL unit included in the access unit can be changed within a range capable of decoding the bit stream.

In particular, an access unit including an IRAP picture with a layer identifier nuhLayerId=0 is called an IRAP access unit (random access point access unit). An IRAP access unit that performs initialization of a process of decoding all the layers included in the target set is called an initialization IRAP access unit. According to the decoding order, a set ranging from the initialization IRAP access unit and through a non-initialization IRAP access unit with at least zero (access unit other than the initialization IRAP access unit) and to the next initialization IRAP access unit (note that the next initialization IRAP access unit is excluded) is also called CVS (Coded Video Sequence; hereinafter, referred to as sequence SEQ).

Figure 8:
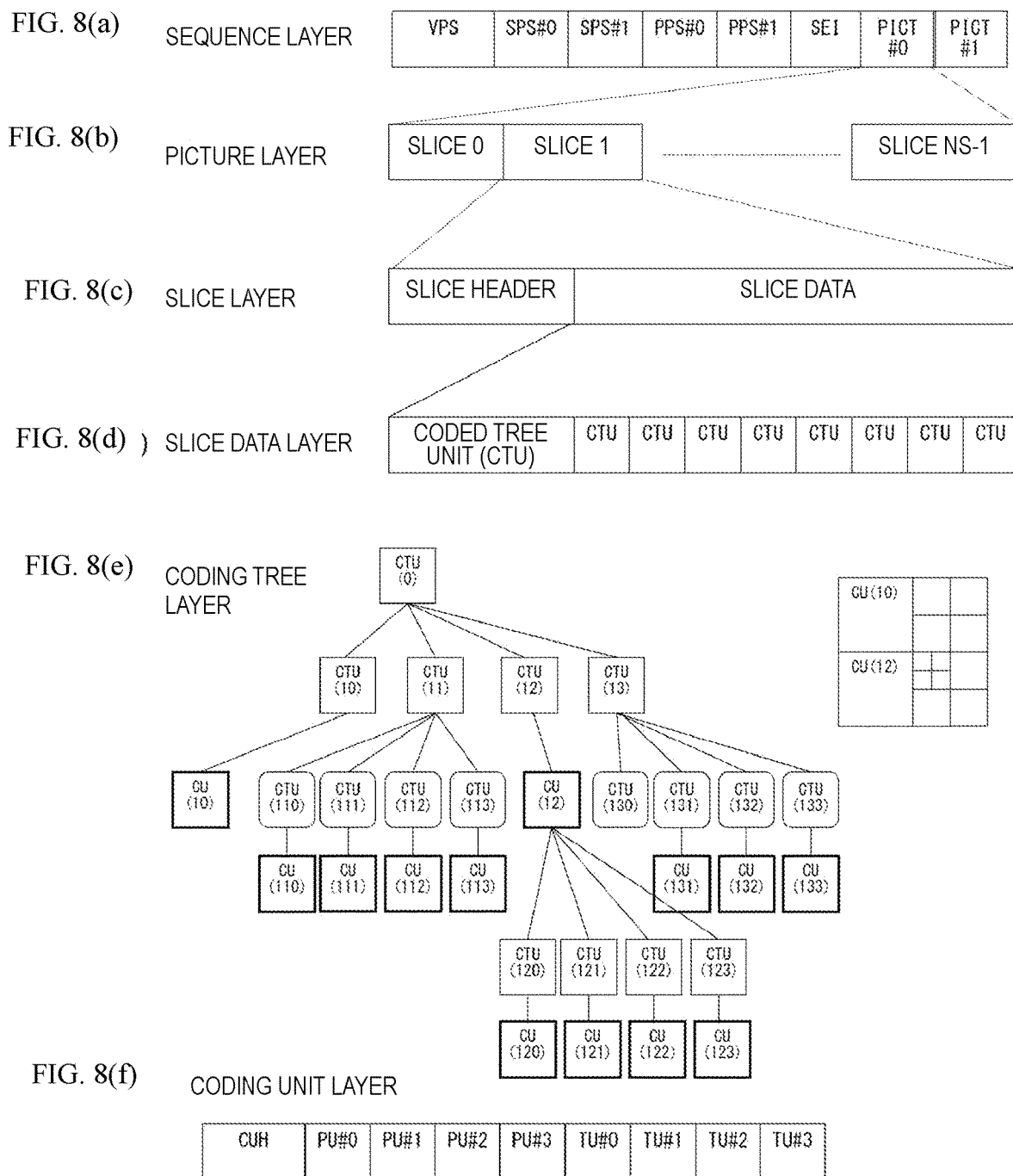
FIG. 8(a) and FIG. 8(f) are a diagram for illustrating a configuration of hierarchically coded data according to the embodiment of the present invention.
FIG. 8(b) is a diagram showing a picture layer defining a picture PICT.
FIG. 8(c) is a diagram showing a slice layer defining a slice S.
FIG. 8(d) is a diagram showing a slice data layer defining slice data.
FIG. 8(e) is a diagram showing a coding tree layer defining a coded tree unit included in the slice data.

FIG. 8 is a diagram showing the hierarchical layer data structure of hierarchically coded data DATA. The hierarchically coded data DATA includes a sequence and multiple pictures configuring the sequence in an exemplary manner. FIGS. 8(*a*) to 8(*f*) are diagrams showing a sequence layer defining a sequence SEQ, a picture layer defining a picture PICT, a slice layer defining a slice S, a slice data layer defining slice data, a coding tree layer defining a coded tree unit included in the slice data, and a coding unit layer defining a coding unit (Coding Unit; CU) included in the coding tree, respectively.

(Sequence Layer)

The sequence layer defines a set of data referred to by the image decoding apparatus 1 to decode the processing target sequence SEQ (hereinafter, also called a target sequence). As shown in FIG. 8(*a*), the sequence SEQ contains a video parameter set, a sequence parameter set (SPS), a picture parameter set (PPS), a picture PICT, and supplemental enhancement information (SEI). Here, the value shown after # indicates the layer ID. FIG. 8 shows an example of presence of the coded data having #0 and #1, i.e., the layer ID of zero and the layer ID of one. However, the kinds of layers and the number of layers are not limited thereto.

(Video Parameter Set)

FIG. 11 shows an example of the syntax table of the video parameter set VPS. FIG. 12 shows an example of the syntax table of extension data on the video parameter set VPS. The video parameter set VPS defines a set of coding parameters referred to by the image decoding apparatus 1 for decoding the coded data made up of at least one layer. For example, a VPS identifier (video_parameter_set_id) used for identifying the VPS referred to by the after-mentioned sequence parameter set and another syntax element (SYNVPS01 in FIG. 11), the number of layers included in the coded data (vps_max_layers_minus1) (SYNVPS02 in FIG. 11), the number of sub-layers included on the layer (vps_sub_layers_minus1) (SYNVPS03 in FIG. 11), the number of layer sets (vps_num_layer_sets_minus1) specifying the set of layers including at least one layer represented in the coded data (SYNVPS06 in FIG. 11), layer set information (layer_id_included_flag[i][j]) specifying the set of layers constituting the layer set (SYNVPS07 in FIG. 11), inter-layer dependency relationship (direct dependency flag direct_dependency_flag[i][j] (SYNVPS0C in FIG. 12), the set of output layers constituting the output layer set, output layer set information (default output layer identifier default_target_output_layer_idc, output layer flag output_layer_flag[i][j], etc.) specifying PTL information etc. (SYNVPS0G to SYNVPS0K in FIG. 12) and the like are specified. Multiple VPSs may be in the coded data. In this case, a VPS used for decoding is selected from among the VPSs for each target sequence.

The VPS used for decoding to obtain a specific sequence belonging to a certain layer is called an active VPS. Hereinafter, the VPS means the active VPS for the target sequence belonging to a certain layer, if not otherwise specified.

(Sequence Parameter Set)

FIG. 15(*a*) shows an example of the syntax table of the sequence parameter set SPS. The sequence parameter set SPS specifies a set of coding parameters referred to by the image decoding apparatus 1 for decoding the target sequence. For example, the active VPS identifier (sps_video_parameter_set_id) indicating the active VPS referred to by the target SPS (SYNSPS01 in FIG. 15(*a*)), the SPS identifier (sps_seq_parameter_set_id) used to identify SPS referred to by the after-mentioned picture parameter set and other syntax elements (SYNSPS02 in FIG. 15(*a*)), and the width and height of a picture are specified. A plurality of SPSs may be in the coded data. In this case, the SPS used for decoding is selected from among multiple candidates for each target sequence.

The SPS used to decode a specific sequence belonging to a certain layer is also called an active SPS. Hereinafter, the SPS means the active SPS for the target sequence belonging to a certain layer, if not otherwise specified.

(Picture Parameter Set)

FIG. 15(*b*) shows an example of the syntax table of the picture parameter set PPS. The picture parameter set PPS defines a set of coding parameters referred to by the image decoding apparatus 1 for decoding each picture in the target sequence. For example, the set includes the active SPS identifier (pps_seq_parameter_set_id) (SYNPPS01 in FIG. 15(*b*)) indicating the active SPS referred to by the target PPS, the PPS identifier (pps_pic_parameter_set_id) (SYNPPS02 in FIG. 15(*b*)) used to identify PPS referred to by an after-mentioned slice header and other syntax elements, the reference value (pic_init_qp_minus26) of quantization width used for picture decoding, a flag (weighted_pred_flag) representing application of weighted prediction, and a scaling list (quantization matrix). Note that multiple PPSs may be present. In this case, any of PPSs is selected from each picture in the target sequence.

The PPS used for decoding to obtain a specific picture belonging to a certain layer is called an active PPS. Hereinafter, the PPS means the active PPS for the target picture belonging to a certain layer, if not otherwise specified. The active SPS and the active PPS may be set to different SPS and PPS for each layer. That is, the decoding process can be performed with reference to different SPS and PPS for each layer.

(Picture Layer)

The picture layer defines a set of data referred to by the hierarchical video decoding apparatus 1 to decode the processing target picture PICT (hereinafter, also called a target picture). As shown in FIG. 8(*b*), the picture PICT includes slices S0 to SNS−1 (NS is the total number of slices included in the picture PICT). Hereinafter, in the case where the slices S0 to SNS−1 are not required to be discriminated from each other, the description may be sometimes made without the subscripts of codes. This omission is also applicable to other data which is included in after-mentioned hierarchically coded data DATA and to which a subscript is added.

(Slice Layer)

The slice layer defines a set of data referred to by the hierarchical video decoding apparatus 1 to decode the processing target slice S (hereinafter, slice segment also called a target slice). As shown in FIG. 8(*c*), the slice S includes a slice header SH, and slice data SDATA.

The slice header SH includes a coding parameter group referred to by the hierarchical video decoding apparatus 1 to define the method of decoding the target slice. FIG. 15(*d*) shows an example of the syntax table of the slice header. For example, an active PPS identifier (slice_pic_parameter_set_id) (SYNSH02 in FIG. 15(*d*)) that designates a PPS (active PPS) referred to decode the target slice is included. The SPS referred to by the active PPS is designated by the active SPS identifier (pps_seq_parameter_set_id) included in the active PPS. Furthermore, the VPS (active VPS) referred to by the active SPS is designated by the active VPS identifier (sps_video_parameter_set_id) included in the active SPS.

Figure 9:
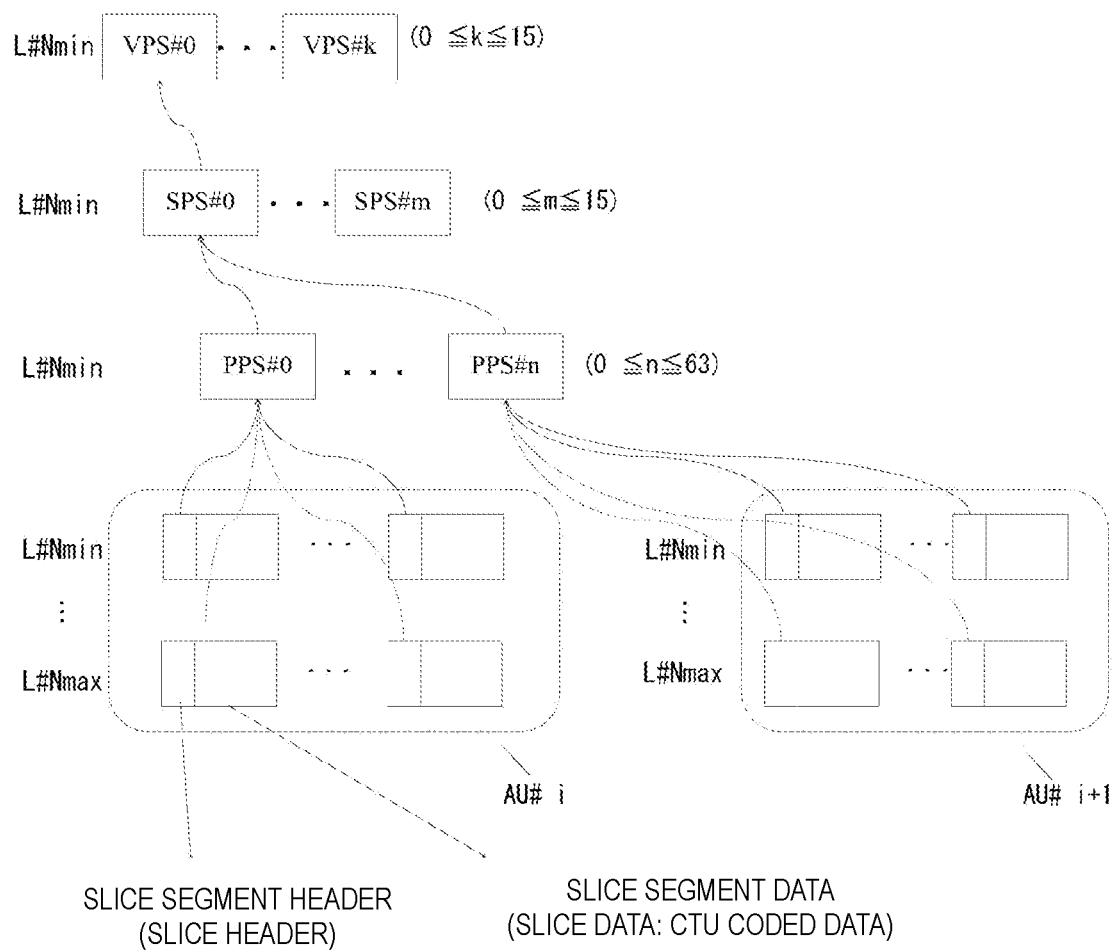
FIG. 9 is a diagram showing the reference relationship of a parameter set according to this embodiment.

Referring to the example in FIG. 9, parameter set activation is described. The figure describes the reference relationship between the header information and the coded data constituting the access unit (AU). In the example of the figure, each of the slices constituting a picture belonging to the layers L #K (K=Nmin . . . Nmax) in each AU includes the active PPS identifier that designates the PPS to be referred to in the slice header, and designates the PPS (active PPS) to be used for decoding (also called activates) by means of the identifier when decoding of each slice is started. The identifiers of PPS, SPS and VPS referred to by slices in the same picture are required to be the same. In the activated PPS, the active SPS identifier that identifies the SPS (active SPS) to be referred to for the decoding process is included. The SPS (active SPS) used for decoding is identified by means of the identifier. Likewise, in the activated SPS, the active VPS identifier that identifies the VPS (active VPS) to be referred to for the process of decoding the sequence belonging to each layer is included. The VPS (active VPS) used for decoding is identified by means of the identifier. According to the above procedures, the parameter set required to perform the process of decoding the coded data on each layer is established.

The identifier of the higher parameter set to be referred to by each piece of the header information (slice header, SH, PPS and SPS) is not limited to the example of the figure. In the case of VPS, the identifier may be selected from among the VPS identifiers k=0 . . . 15. In the case of SPS, the identifier may be selected from among the SPS identifiers m=0 . . . 15. In the case of PPS, the identifier may be selected from among the PPS identifiers n=0 . . . 63.

The slice type designation information (slice_type) that designates the slice type is an example of the coding parameter included in the slice header SH.

Slice types that can be designated by the slice type designation information include (1) I slice that only uses intra prediction during coding, (2) P slice that uses mono-directional prediction or the intra prediction during coding, and (3) B slice that uses the mono-directional prediction, bi-directional prediction, or intra prediction during coding.

(Slice DATA Layer)

The slice data layer defines a set of data referred to by the hierarchical video decoding apparatus 1 to decode the processing target slice data SDATA. As shown in FIG. 8(d), the slice data SDATA includes a coded tree block (CTB: Coded Tree Block). The CTB is a fixed-size block (e.g., 64×64) in s slice, and also called the largest cording unit (LCU).

(Coding Tree Layer)

As shown in FIG. 8(e), the coding tree layer defines the set of data referred to by the hierarchical video decoding apparatus 1 to decode the processing target coded tree block. The coded tree unit is split according to recursive quadtree splitting. The nodes of a tree structure obtained by the recursive quadtree splitting is called coding tree. A quadtree intermediate node is a coded tree unit (CTU). The coded tree block itself is defined as the highest CTU. The CTU includes a split flag (split flag). When the split flag is one, it is split into four coded tree units CTU. When the split flag is zero, the coded tree unit CTU is split into four coded units (CUs). The coded unit CU is an end node of the coding tree layer, and this layer is not split further. The coded unit CU serves as a basic unit of the coding process.

A partial region on a target picture decoded from the coded tree unit is called a coding tree block (CTB). A CTB corresponding to a luma picture, which is the luma component of a target picture, is called luma CTB. In other words, the partial region that is on the luma picture and decoded from the CTU is called luma CTB. Meanwhile, a partial region corresponding to a color-difference picture and decoded from the CTU is called a color-difference CTB. Typically, in the case where the color format of an image is determined, the luma CTB size and the color-difference CTB size can be transformed into each other. For example, in the case where the color format is 4:2:2, the color-difference CTB size is half of the luma CTB size. In the following description, the CTB size means the luma CTB size, if not otherwise specified. The CTU size is the luma CTB size corresponding to CTU.

(Coding Unit Layer)

As shown in FIG. 8(f), the coding unit layer defines the set of data referred to by the hierarchical video decoding apparatus 1 to decode the processing target coding unit. More specifically, the coding unit CU includes a CU header CUH, a predictive tree, and a transform tree. The CU header CUH defines whether the coded unit is a unit using intra prediction or a unit using inter prediction and the like. The coded unit is along a route of a prediction tree (PT) and a transform tree (TT). A region that is in a picture and corresponds to CU is called a coding block (CB). The CB on the luma picture is called luma CB, and the CB on a color-difference picture is called a color-difference CB. The CU size (size of coded node) means the luma CB size.

(Transform Tree)

The transform tree (hereinafter, abbreviated as TT) has the coded unit CU split into one or more transform blocks, and defines the position and size of each transform block. In other words, the transform block is one or more regions that do not overlap with each other and constitute the coded unit CU. The transform tree includes one or more transform blocks obtained through the aforementioned splitting. The information pertaining to the transform tree included in CU and information included in the transform tree are called TT information.

Splitting in the transform tree is classified into splitting that assigns a region having the same size as the coded unit as a transform block, and splitting according to recursive quadtree splitting as with the aforementioned tree block splitting. The transform process is performed for each transform block. Hereinafter, the transform block, which is a unit of transform, is also called a transform unit (TU).

The transform tree TT includes TT splitting information SP_TT that designates a pattern of splitting the target CU into each transform block, and quantization predictive residue $QD_1$ to $QD_{NT}$ (NT is the total number of transform units TU included in the target CU).

More specifically, the TT splitting information SP_TT is information for determining the shape of each transform block included in the target CU, and the position in the target CU. For example, the TT splitting information SP_TT can be achieved using information (split_transform_unit_flag) indicating whether to split the target node or not, and information indicating the depth of splitting (transfoDepth).

Each quantization predictive residue QD is coded data generated by the hierarchical video coding apparatus 2 applying the following processes 1 to 3 to the target block, which is a transform block to be processed.

Process 1: Apply frequency transform (e.g., DCT transform (Discrete Cosine Transform) and DST transform (Discrete Sine Transform), etc.) to the predictive residue obtained by subtracting the predictive image from the coding target image.

Process 2: Quantize the transform coefficients obtained in the process 1.

Process 3: Variable-length code the transform coefficients quantized in the process 2.

The aforementioned quantization parameter qp represents the magnitude of the quantization step QP used by the hierarchical video coding apparatus 2 to quantize the transform coefficients ($QP=2^{qp/6}$).

(Predictive Tree)

The predictive tree (hereinafter, abbreviated as PT) has the coded unit CU split into one or more predictive blocks, and defines the position and size of each predictive block. In other words, the predictive block is one or more regions that do not overlap with each other and constitute the coded unit CU. The predictive tree includes one or more predictive blocks obtained through the aforementioned splitting. The information pertaining to the predictive tree included in CU and information included in the predictive tree are called PT information.

The predicting process is performed for each predictive block. Hereinafter, the predictive block, which is the unit of prediction, is also called prediction unit (PU).

The splitting types of the predictive tree are classified into two cases, i.e., a case of intra prediction and a case of inter prediction. The intra prediction is prediction in the same picture. The inter prediction means a predicting process performed between pictures different from each other (e.g., between displayed times, and between layer images). That is, the inter prediction adopts, as the reference picture, any of the reference picture on the same layer as the target layer (intra-layer reference picture) and the reference picture on the reference layer of the target layer (inter-layer reference picture), and generates the predictive image from the decoded image on the reference picture.

In the case of intra prediction, the splitting methods are 2N×2N (the same size as that of the coded unit) and N×N.

In the case of inter prediction, the splitting methods perform coding according to part_mode of the coded data, and these methods are 2N×2N (the same size as that of the coded unit), 2N×N, 2N×nU, 2N×nD, N×2N, nL×2N, nR×2N, N×N, etc.

(Prediction Parameter)

The predictive image of the predictive unit is derived according to the prediction parameters accompanying the predictive unit. The prediction parameters include prediction parameters for intra prediction, and prediction parameters for inter prediction.

The intra prediction parameters are parameters for decoding intra prediction (prediction mode) for each intra PU. The parameters for decoding the prediction mode includes mpm_flag that is a flag pertaining to MPM (Most Probable Mode; the same applies hereafter), mpm_idx that is an index for selecting MPM, and rem_idx that is an index for designating the prediction mode other than MPM.

The inter prediction parameter includes a prediction list usage flags predFlagL0 and predFlagL1, reference picture indices refIdxL0 and refIdxL1, and vectors mvL0 and mvL1. Each of the prediction list usage flags predFlagL0 and predFlagL1 is a flag indicating whether reference picture lists called L0 reference list and L1 reference list are used or not. In the case where the value is one, the corresponding reference picture list is used. The case where the two reference picture lists are used, i.e., the case where predFlagL0=1 and predFlagL1=1 corresponds to the bidirectional prediction. The case where one reference picture is used, i.e., the case of (predF LagL0, predFlagL1)=(1, 0) or (predFlagL0, predFlagL1)=(0, 1) corresponds to single prediction.

(Examples of Reference Picture List)

Figure 10A:
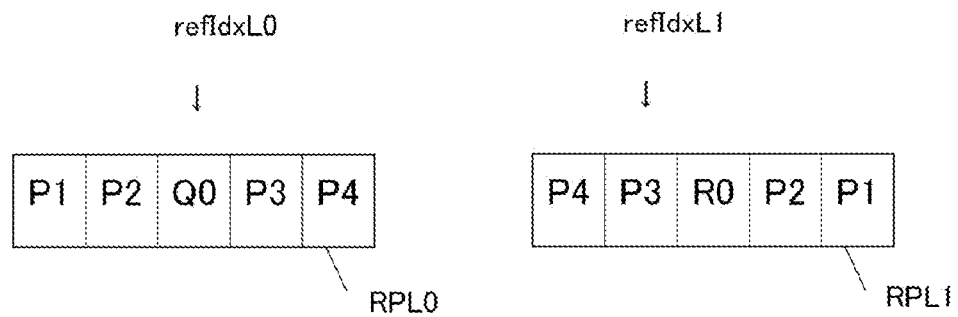
FIG. 10(a) and FIG. 10(b) are a diagram for illustrating reference picture lists and reference pictures.

An example of the reference picture list is now described. The reference picture list is a sequence made up of reference pictures stored in a decoded picture buffer. FIG. 10(a) is a diagram schematically showing examples of reference picture lists. In the reference picture list RPL0, five rectangles laterally arranged in a row indicate respective reference pictures. Symbols P1, P2, Q0, P3 and P4 shown from the left end toward the right are symbols for indicating the respective reference pictures. Likewise, in the reference picture list RPL1, symbols P4, P3, R0, P2 and P1 laterally arranged from the left end toward the right are symbols for indicating the respective reference pictures. "P" of P1 and the like indicates the target layer P. "Q" of Q0 indicates a layer Q different from the target layer P. Likewise, "R" of R0 indicates a layer R different from the target layer P and the layer Q. Subscripts attached to P, Q and R indicate the picture ordering count POC (Picture Ordering Count). A downward arrow immediate below of refIdxL0 shows that the reference picture index refIdxL0 is an index that refers to the reference picture Q0 from the reference picture list RPL0 in the decoded picture buffer. Likewise, a downward arrow immediate below of refIdxL1 shows that the reference picture index refIdxL1 is an index that refers to the reference picture P3 from the reference picture list RPL1 in the decoded picture buffer.

(Examples of Reference Picture)

Figure 10B:
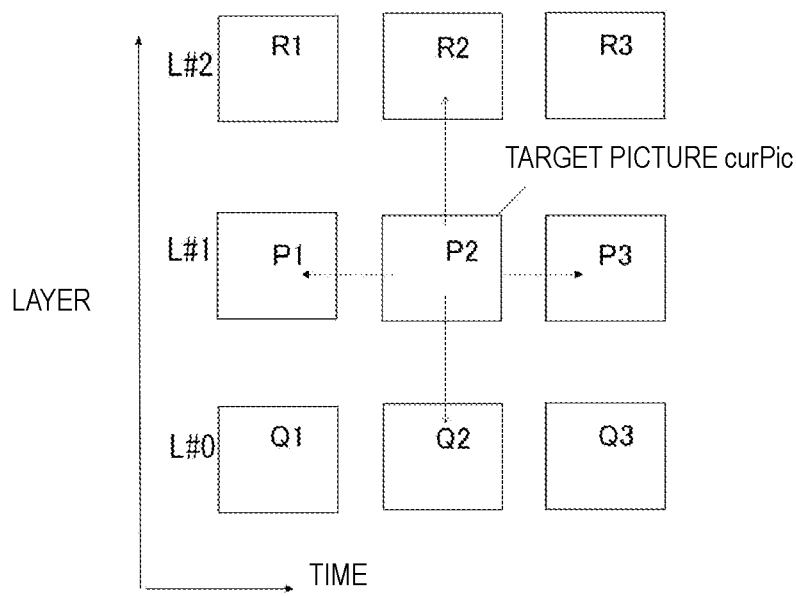

Examples of reference pictures used for deriving vectors are now described. FIG. 10(b) is a diagram schematically showing examples of reference pictures. In FIG. 10(b), the abscissa axis indicates the display time, and the ordinate axis indicates the number of layers. Illustrated rectangles arranged in vertical three rows and horizontal three columns (total nine) indicate respective pictures. Among the nine rectangles, the rectangle on the second column from the left on the low row indicates the decoding target picture, and the residual eight rectangles show the respective reference pictures. The reference pictures Q2 and R2 indicated by the downward arrow from the target picture are pictures at the same display time as that of the target picture but on different layers. In inter-layer prediction with reference to the target picture curPic(P2), the reference picture Q2 or R2 is used. The reference picture P1 indicated by the left arrow from the target picture is a past picture on the same layer as the target picture. The reference picture P3 indicated by the right arrow from the target picture is a future picture on the same layer as the target picture. Motion prediction with reference to the target picture uses the reference picture P1 or P3.

(Motion Vector and Displacement Vector)

Vectors mvLX include a motion vector and a displacement vector (disparity vector). The motion vector is a vector indicating the positional deviation between the position of a block in a picture at a certain display time on a certain layer, and the position of the corresponding block on the picture on the same layer at a different display time (e.g., adjacent discrete time).

The displacement vector is a vector indicating the positional deviation between the position of a block in a picture at a certain display time on a certain layer, and the position of the corresponding block on the picture on the different layer at the same display time. The picture on a different layer encompasses the case of a picture at the same resolution but a different quality, the case of a picture in a different viewpoint, and the case of a picture at a different resolution. In particular, a displacement vector corresponding to a picture in a different viewpoint is called a disparity vector.

[Hierarchical Video Decoding Apparatus]

The configuration of the hierarchical video decoding apparatus 1 according to this embodiment is hereinafter described with reference to FIGS. 16 to 19.

(Configuration of Hierarchical Video Decoding Apparatus)

Figure 16:
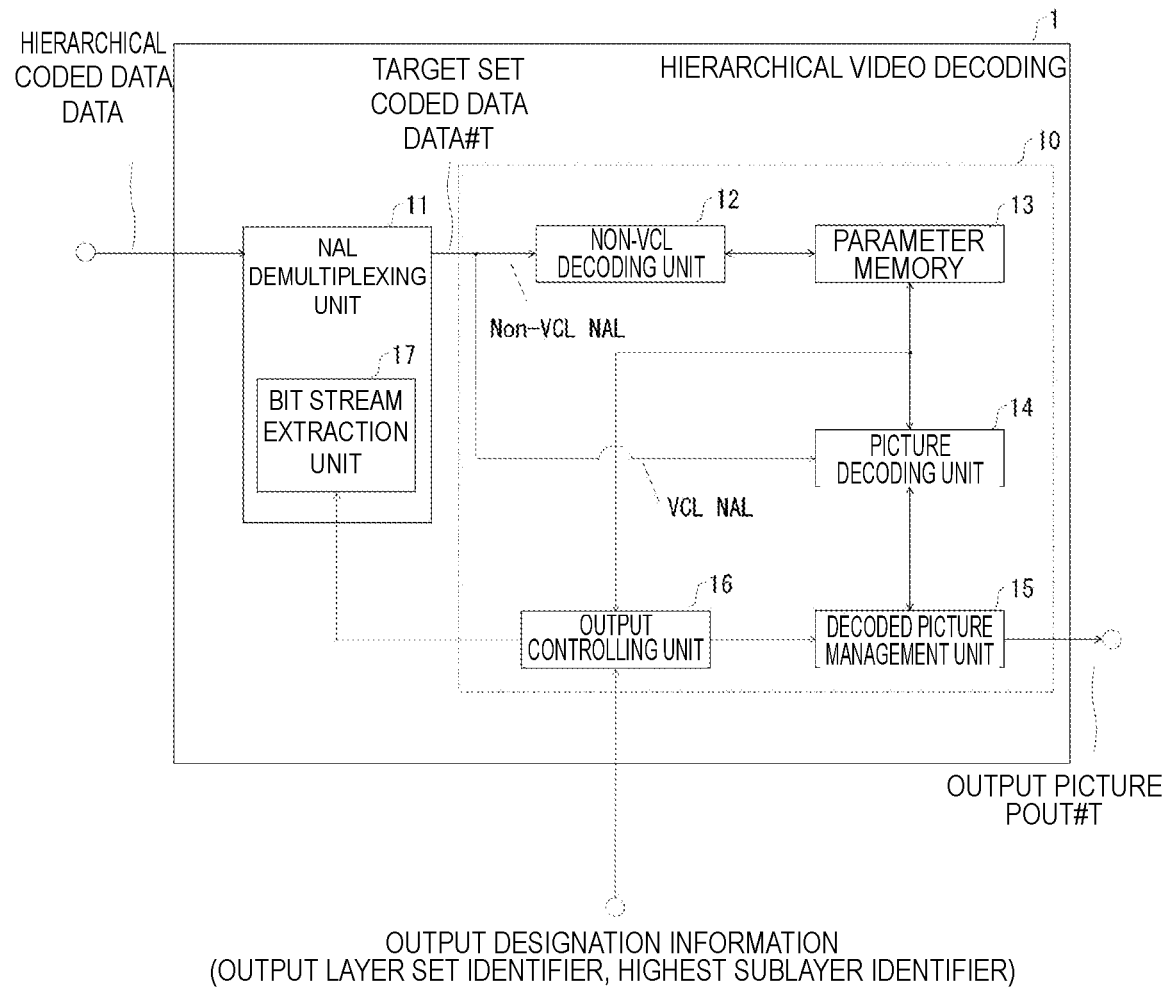
FIG. 16 is a diagram schematically showing a configuration of a hierarchical video decoding apparatus according to this embodiment.

The configuration of the hierarchical video decoding apparatus 1 according to this embodiment is described. FIG. 16 is a diagram schematically showing the configuration of the hierarchical video decoding apparatus 1 according to this embodiment.

The hierarchical video decoding apparatus 1 decodes the hierarchically coded data DATA supplied from the hierarchical video coding apparatus 2 to generate a decoded picture on each layer included in the target set TargetSet, which is determined by the layer ID list TargetDecLayerIdList of layer sets TargetDecLayerSet that is a decoding target and identified by output designation information (target layer set identifier) supplied from the outside, and the target highest temporal identifier TargetHighestTid that designates the highest sublayer accompanying the layer that is supplied from the outside and is to be the decoding target, and outputs, as an output picture POUT #T, the decoded picture on the layer designated as the output layer by the output layer information OutputLayerFlag pertaining to the target output layer set.

That is, the hierarchical video decoding apparatus 1 decodes the coded data on the picture on the layer i in order of the elements of layer ID list TargetDecLayerIdList [0] . . . TargetDecLayerIdList [N−1] (N is the number of layers included in the target decoding layer set) of the target decoding layer set TargetDecLayerSet, generates the decoded picture, and outputs the decoded picture on the layer i at predetermined timing in the case where the output layer information on the layer i OutputLayerFlag[i] indicates "output layer".

As shown in FIG. 16, the hierarchical video decoding apparatus 1 includes an NAL demultiplexing unit 11, and a target set picture decoding unit 10. Furthermore, the target set picture decoding unit 10 includes a non-VCL decoding unit 12, a parameter memory 13, a picture decoding unit 14, a decoded picture management unit 15, and an output controlling unit 16. The NAL demultiplexing unit 11 further includes a bit stream extraction unit 17.

The hierarchically coded data DATA includes not only an NALU (NAL Unit) generated by the VCL, but also an NALU that includes parameter sets (VPS, SPS and PPS) and SEI. These NALs are called non-VCL NALUs (non-VCL NAL units), which are discriminated from VCL NALUs.

The output controlling unit 16 derives the target output layer ID list TargetOptLayerIdList that indicates the layer structure of the target output layer set TargetOptLayerSet, as output control information, and the target decoding layer ID list TargetDecLayerIdList that indicates the layer structure required to decode the target output layer set, on the basis of output designation information supplied from the outside, layer set information on the active VPS stored in the parameter memory 13, and outputs layer set information. The target output layer ID list TargetOptLayerIdList and the target decoding layer ID list TargetDecLayerIdList, having thus been derived, are supplied to the bit stream extraction unit 17 and the decoded picture management unit 15. The details of processes of deriving the target output layer ID list and the target decoding layer ID list in the output controlling unit 16 are described later.

In a schematic view, the bit stream extraction unit 17 included in the NAL demultiplexing unit 11 performs a bit stream extraction process. This extraction unit extracts target decoding layer ID list supplied from the output controlling unit 16, and target set coded data DATA #T (Bit streamToDecode) that includes NAL units included in the target set TargetSet determined by the decoding target highest sublayer identifier TargetHighestTid, from the hierarchically coded data DATA. The details of processes having high relationship with the present invention in the bit stream extraction unit 17 are described later.

Subsequently, the NAL demultiplexing unit 11 demultiplexes the target set coded data DATA #T (Bit streamToDecode) extracted by the bit stream extraction unit 17, refers to the NAL unit type included in the NAL unit, the layer identifier (layer ID), and the temporal identifier (temporal ID), and supplies the NAL unit included in the target set to the target set picture decoding unit 10.

The target set picture decoding unit 10 supplies the non-VCL NALU to the non-VCL decoding unit 12, and supplies the VCL NALU to the picture decoding unit 14, among the NALUs included in the supplied target set coded data DATA #T. That is, the target set picture decoding unit 10 decodes the header (NAL unit header) of the supplied NAL unit, and supplies the coded data on non-VCL NALU to the non-VCL decoding unit 12 and supplies the coded data on the VCL NALU to the picture decoding unit 14, together with the decoded NAL unit type, layer identifier, and temporal identifier, on the basis of the NAL unit type, the layer identifier and the temporal identifier, which are included in the decoded NAL unit header.

The non-VCL decoding unit 12 decodes the inputted non-VCL NALU to obtain the parameter set, i.e., the VPS, SPS and PPS, and supplies the set to the parameter memory 13. The details of processes having high relationship with the present invention in the non-VCL decoding unit 12 are described later.

The parameter memory 13 holds the decoded parameter sets for each of the identifiers of the parameter sets, and thus holds the coding parameters of the parameter sets. More specifically, in the case of the VPS, the VPS coding parameter is held for each VPS identifier (video_parameter_set_id). In the case of the SPS, the SPS coding parameter is held for each SPS identifier (sps_seq_parameter_set_id). In the case of the PPS, the PPS coding parameter is held for each PPS identifier (pps_pic_parameter_set_id). The coding parameter held in the parameter memory 13 may include the layer identifier and the temporal identifier of each parameter set.

The parameter memory 13 supplies the after-mentioned picture decoding unit 14 with the coding parameter of the parameter set (active parameter set) referred to by the picture decoding unit 14 for picture decoding. More specifically, first, the active PPS is designated by means of the active PPS identifier (slice_pic_parameter_set_id) included in the slice header SH decoded by the picture decoding unit 14. Next, the active SPS is designated by means of the active SPS identifier (pps_seq_parameter_set id) included in the designated active PPS. Finally, the active VPS is designated by means of the active VPS identifier (sps_video_parameter_set_id) included in the active SPS. Subsequently, the coding parameters of the designated active PPS, active SPS, and active VPS are supplied to the picture decoding unit 14. Likewise, the parameter memory 13 supplies the output controlling unit 16 with the coding parameter of the active parameter set referred to by the output controlling unit 16 to derive output control information.

The picture decoding unit 14 generates the decoded picture on the basis of the input VCL NALU, the active parameter sets (active PPS, active SPS and active VPS) and the reference picture, and supplies the picture to the decoded picture management unit 15. The supplied decoded picture is recorded in a buffer in the decoded picture management unit 15. The details of the picture decoding unit 14 are described later.

The decoded picture management unit 15 records the input decoded picture in the internal decoded picture buffer (DPB), while generating the reference picture list and determining the output picture. The decoded picture management unit 15 outputs, as the output picture POUT #T, the decoded picture on the output layer included in the target output layer ID list TargetOptLayerIdList derived by the output controlling unit 16 among decoded pictures recorded in the DPB, to the outside at a predetermined timing.

(Non-VCL Decoding Unit 12)

The non-VCL decoding unit 12 decodes the inputted target set coded data to obtain the parameter sets (VPS, SPS and PPS) to be used to decode the target set. The coding parameters of the decoded parameter sets are supplied to the parameter memory 13, and recorded with respect to the identifier of each parameter set. The non-VCL decoding unit 12 is not limited to the parameter set, and may decode the NAL unit (nal_unit_type=32 . . . 63) classified as non-VCL in FIG. 6. As with the case of the parameter set, each coding parameter of the decoded non-VCL is recorded in the parameter memory 13.

Typically, the parameter set is decoded on the basis of a predetermined syntax table. That is, a bit sequence is read from the coded data according to the procedures defined in the syntax table, and decoded to obtain the syntax included in the syntax table. A variable may be derived on the basis of the decoded syntax and included into the parameter set to be output, if necessary. Consequently, the parameter set output from the non-VCL decoding unit 12 can be represented as the syntax pertaining to the parameter sets (VPS, SPS and PPS) included in the coded data, and a set of variables derived from the syntax.

The non-VCL decoding unit 12 includes parameter set decoding means for decoding the parameter set (VPS/SPS/PPS) on the basis of a predetermined syntax table, not shown. Furthermore, the parameter set decoding means includes layer set decoding means for decoding the layer set information, inter-layer dependence information decoding means for decoding the inter-layer dependence information, output layer set information decoding means for decoding the output layer set information, PTL information decoding means for decoding the PTL information corresponding to the output layer set, HRD parameter decoding means for decoding the HRD parameter corresponding to the output layer set, and DPB information decoding means for decoding the DPB information corresponding to the output layer set, which are not shown.

Hereinafter, a syntax table having high relationship with the present invention among syntax tables used for decoding in the non-VCL decoding unit 12 is mainly described.

(Layer Set Information)

The layer set information is a list that represents a set of layers constituting a layer set included in the hierarchically coded data (hereinafter, layer ID list LayerIdList), and is decoded from the VPS by the layer set information decoding means. The layer set information includes a syntax (vps_num_layer_sets_minus1) (SYNPVS06 in FIG. 11) that represents the number of layer sets defined on the VPS, and a syntax "layer_id_included_flag[i][j]" (SYNVPS07) that represents whether the j-th layer (layer j) is included in the i-th layer set (layer set i) or not in order of layer definition on VPS. The number of layer sets VpsNumLayerSets is set to a value (vps_num_layer_sets_minus1+1). The layer set i includes the layer j where the value of syntax "layer id included flag[i][j]" is one. That is, the layer j constituting the layer set i is included in the layer ID list LayerIdList[i].

The number of layers NumLayersInIdList[i] included in the layer set i is the number of flags where the syntax value is one with respect to the layer set i in the syntax "layer_id_included_flag[i][j]".

More specifically, the layer ID list LayerIdList[i] of each layer set i, and the number of layers NumLayersInIdList[i] included in the layer set i are derived by the following pseudocode.

(Pseudocode Representing Derivation of Layer ID List of Each Layer Set)
```
for( i = 0; i < VpsNumLayerSets; i++){
NumLayersInIdList[i] = 0;
for( m = 0; m <= vps_max_layer_id; m++){
if( layer_id_included_flag[i][m]){
LayerIdList[i][ NumLayersInIdList[i]] = m;
NumLayersInIdList[i]++;
}
} // end of loop on for(m=0; m<= vps_max_layer_id; m++)
} // end of loop on for(i=0; i<VpsNumLayerSets; i++)
```

The pseudocode can be represented in steps as follows.

(SA01) The start point of a loop pertaining to derivation of the layer ID list of the layer set i. Before the loop is started, the variable i is initialized to zero. The process in the loop is executed when the variable i is less than the number of layer sets "NumLayerSets". The variable i is incremented by "1" every time the process in the loop is executed one time.

(SA02) The number of layers NumLayresInIdList[i] of the layer set i is initialized to zero (i.e., NumLayersInIdList [i]=0).

(SA03) The start point of a loop pertaining to addition of an element of the m-th layer (layer m) to the layer ID list of the layer set i. Before the loop is started, the variable m is initialized to zero. The process in the loop is executed when the variable m (m-th layer) is equal to or less than the maximum layer identifier "vps_max_layer_id" (m<=vps_max_layer_id), and the variable m is incremented by "1" every time the process in the loop is executed one time. Instead of the maximum layer identifier "vps_max_layer_id", the maximum number of layers VpsMaxLayers may be used to execute the process in the loop when the variable m is less than the maximum number of layers VpsMaxLayers. That is, the determination expression of "m<=vps_max_layer_id" of the for statement may be replaced with "m<VpsMaxLayers".

(SA04) It is determined whether the layer m is included in the layer set i or not (layer_id_included_flag[i][m]). When layer_id_included_flag[i][m] is one, the processing transitions to step SA05. When layer_id_included_flag[i][m] is zero, the processes in steps SA05 to SA06 are omitted and the processing transitions to step SA0A.

(SA05) The layer m is added to the NumLayersInIdList [i]-th element of the layer ID list LayerIdList[i][ ] of the layer set i (i.e., LayerIdList[i][NumLayersInIdList[i]]=m).

(SA06) The value of the number of layers NumLayresInIdList[i] of the layer set i is incremented by "1" (i.e., NumLayersInIdList[i]++).

(SA0A) The end point of the loop pertaining to addition of the element of the m-th layer (layer m) to the layer ID list of the layer set i.

(SA0B) The end point of the loop pertaining to derivation of the layer ID list of the layer set i.

The above procedures can derive the layer ID list LayerIdList[i] of each layer set i. Reference to the layer ID list LayerIdList[ ] can grasp the order of the layer that is the m-th element in the layer set i among all the layers (layers defined by VPS). The number of layers included in the layer set i can be grasped by referring to the variable NumLayersInIdList[i] representing the number of layers of the layer set i. The deriving procedures are not limited to the aforementioned steps, and may be changed in an implementable range.

[PTL Information]

The PTL information is information indicating the profile and level required to decode the output layer set, and is decoded by the PTL information decoding means from VPS or SPS.

Notification about the PTL information corresponding to the output layer set OLS #0 is issued in SYNVPS04 shown in FIG. 11 on VPS or in FIG. 15(a) on SPS. The PTL information corresponding to the output layer set OLS #i (i=1 . . . NumOutputLayerSets−1) includes a syntax "vps_num_profile_tier_level_minus1" (SYNVPS0D in FIG. 11) representing "the number of pieces of PTL information−1" defined on the VPS, a profile presence or absence flag "vps_profile_present_flag[i]" (SYNVPS0E in FIG. 11) representing presence or absence of the profile information on the i-th (i=1 . . . num_profile_tier_level_minus1) PTL information, and i-th PTL information "profile_tier_level( )" (SYNVPS0F in FIG. 11).

Each piece of PTL information is associated with the output layer set OLS #i by the PTL designation identifier (profile_level_tier_idx[i]) (SYNVPS0J in FIG. 12) included in the output layer set OLS #i, described later. For example, when the PTL designation identifier of the output layer set OLS #3 is profile_level_tier_idx[3]=10, the tenth PTL information from the beginning in the list of the PTL information on SYNVPS0F FIG. 12 is the PTL information applied to the output layer set OLS #3.

As shown in FIG. 13, the PTL information (SYNVPS04 and SYNVPS0H) includes syntax groups pertaining to the profile and level (SYNPTL01, SYNPTL02, SYNPTL03, SYNPTL04, SYNPTL05 and SYNPTL06), and is decoded by the PTL information decoding means.

The syntax group SYNPTL01 includes the following syntax.

Profile space general_profile_space

Tier flag general_tier_flag

Profile identifier general_profile_idc

Profile compatibility flag general_profile_compatibility_flag[i]

Profile reserved syntax general_reserved_zero_44bits

The syntax group SYNPTL02 includes a level identifier general_level_idc.

The syntax group SYNPTL03 includes a sub-layer profile presence or absence flag of a sub-layer, and a sub-layer level presence or absence flag.

The syntax group SYNPTL04 is byte align data (reserved_zero_2bits[i]) for the number of bits determined on the basis of the number of sub-layers (MaxNumSbuLayersMinus1, or MaxNumSubLayers−1).

The syntax group SYNPTL05 includes the following syntax.

Sub-layer profile space sub_layer_profile_space[i]

Sub-layer tier flag sub_layer_tier_flag[i]

Sub-layer profile identifier sub_layer_profile_idc[i]

Sub-layer profile compatibility flag sub_layer_profile_compatibility_flag[i][j]

Sub-layer profile reserved syntax sub_layer_reserved_zero_44bits[i]

The syntax group SYNPTL05 includes a sub-layer level identifier sub_layer_level_idc[i] as sub-layer level information of the sub-layer.

(Output Layer Set Information)

The output layer set is defined by the combination of a set of layers to be outputted (output layer information) and a set of layers that are targets of the decoding process (layer set information), and is decoded by output layer set information decoding means that is included in the hierarchical video decoding apparatus and is not shown. The hierarchical video decoding apparatus adopts, as decoding targets, the layers included in the layer set (the layer set associated with the output layer set) included in the output layer set decoded by the layer set information decoding means, performs decoding to obtain the decoded picture on the layer and records the picture in the buffer, selects the decoded picture on a specific layer recorded in the buffer among the output layers included in the output layer set as the targets, and outputs the picture.

The output layer set information includes the following syntax elements (E1 to E5).

E1: the number of additional output layer sets (num_add_output_layer_sets) (SYNVPS0G in FIG. 12)

E2: default output layer identifier (default_target_output_layer_idc) (SYNVPS0H in FIG. 12)

E3: layer set identifier (output_layer_set_idx_minus1) (SYNVPS0I in FIG. 12)

E4: output layer information (output_layer_flag) (SYNVPS0J in FIG. 12)

E5: PTL designation IDX (profile_level_tier_idx) (SYNVPS0K in FIG. 12)

The output layer set information decoding means of this embodiment decodes at least the layer set identifier and the output layer flag of the output layer set.

(E1: Additional Output Layer Set)

The output layer set is defined on the basis of the corresponding layer set. The number of additional output layer sets is larger than the number of layer sets VpsNumlayerSets that serve as bases. In the case where the output layer sets are defined, the additional output layer sets are defined. The number of additional output layer sets num_add_output_layer_sets is a syntax element pertaining to the number of additional output layer sets.

The output layer set information decoding means of this embodiment decodes the number of output layer sets NumOutputLayerSets, and derives the number of output layer sets NumOutputLayerSets by calculating the number of layer sets VpsNumlayerSets+the number of additional output layer sets num_add_output_layer_sets. Hereinafter, with respect to the additional layer set OLS #i for i=VpsNumLayerSets−1 . . . NumOutputLayerSet, the output layer sets OLS #i for i=0 . . . (VpsNumLayerSets−1) are called basic layer sets.

The output layer set information decoding means of this embodiment omits decoding of the number of additional output layer sets according to the number of layer sets VpsNumLayerSets. More specifically, the number of layer sets VpsNumLayerSets is larger than one (vps_num_layer_sets_minus1>0), the output layer set information decoding means decodes the coded data to obtain the number of additional output layer sets num_add_output_layer_sets (SYNVPS0G). When the number of additional layer sets num_add_output_layer_sets does not appear in the coded data, that is, when the number of layer sets VpsNumLayerSets is one (vps_num_layer_sets_minus1=0), the output layer set information decoding means estimates the number of additional output layer sets num_add_output_layer_sets as zero.

The layer set 0 is a layer set that is always made up of base layers. Consequently, when the number of layer sets is one, the layers (layer set) included in the output layer set are only the base layers. Cases having significance of decoding to obtain the output layer set made up of base layers are only cases where the output flag of the base layer is one. There are no other meaning of decoding the additional output layer set. Therefore, the output layer set information decoding means that has the above configuration and does not decode the number of additional output layer sets when the number of layer sets is zero is appropriate.

According to the output layer set information decoding means having the above configuration, coding/decoding pertaining to the syntax element of the number of additional output layer sets can be omitted when the number of layer sets is one.

(E2: Default Output Layer Identifier)

The default output layer identifier default_target_output_layer_idc is a syntax element that designates a process of deriving the output layer set (output layer information). The output layer set information decoding means of this embodiment derives the output layer information (OutputLayerFlag) on the output layer set OLS #i (i=1 . . . (VpsNumLayerSets−1)) on the basis of the default output layer identifier.

(1) The case of the default output layer identifier=0: for the basic layer set (output layer sets OLS #i ranging i=1 . . . (VpsNumLayerSets−1)), the after-mentioned output_layer_flag is omitted, and all the layers included in each output layer set are adopted as output layers. For the additional layer set, the output layer is explicitly designated by output layer flag.

(2) The case of the default output layer identifier=1: for the basic layer set (output layer sets OLS #i ranging i=1 . . . (VpsNumLayerSets−1)), the highest layer identifier included in each output layer set is adopted as the output layer. For the additional layer set, the output layer is explicitly designated by output layer flag.

(3) The case of the default output layer identifier=2: for all the output layer sets (the basic layer set and the additional layer set, the output layer sets OLS #i ranging i=0 . . . (NumOutputLayerSet−1)), output_layer_flag[i][j] is explicitly coded to designate the output layer.

Among the values of the default output layer identifiers, values at least three are reserved value for future extension of the specifications.

The output layer set information decoding means of this embodiment omits decoding of the default output layer identifier (default_target_output_layer_idc) according to the number of layer sets VpsNumLayerSets.

More specifically, the output layer set information decoding means of this embodiment decodes the default output layer identifier (default_target_output_layer_idc) when the number of layer sets VpsNumLayerSets is larger than one (vps_num_layer_sets_minus1>0), but does not decode the default output layer identifier (default_target_output_layer_idc) when the number of layer sets VpsNumLayerSets equals to one (vps_num_layer_sets_minus1=0). When the default output layer identifier (default_target_output_layer_idc does not appear in the coded data, the output layer set information decoding means of this embodiment estimates that the default output layer identifier (default_target_output_layer_idc) is zero (the cases other than the case of the default output layer identifier=2).

Instead of the number of output layer sets NumOutputLayerSets, the number of layer sets VpsNumLayerSets is adopted as a condition for decoding, which allows the output layer set information decoding means having the above configuration to decode the syntax element pertaining to the number of additional output layer sets (num_add_output_layer_sets) and decode the syntax element pertaining to the default output layer identifier without deriving the number of output layer sets NumOutputLayerSets (=VpsNumOutputLayerSets+num_add_output_layer_sets) determined from the number of additional output layer sets. That is, the process pertaining to decoding the default output layer identifier can be simplified.

(E3: Layer Set Identifier)

The layer set identifier has a value for identifying the layer set associated with the output layer set. The output layer set information decoding means of this embodiment decodes the syntax element output_layer_set_idx_minus1[i], and associates, with the output layer set OLS #i, the layer set (LS #(output_layer_set_idx_minus1[i]+1)) indicated by the layer set identifier having a value obtained by adding one to output_layer_set_idx_minus1[i].

In the case of absence of the layer set identifier output_layer_set_idx_minus1[i] of the output layer set OLS #i (in the case of omission), the output layer set information decoding means may estimate the identifier in the coded data. For example, in the case of the output layer set OLS #i ranging i=0 . . . VpsNumLayerSets−1, the layer set identifier is assumed as output_layer_set_minus1[i]=(i−1). In this embodiment, the syntax element pertaining to the layer set identifier is represented as "the value of layer set identifier−1". However, the element is not limited thereto. Instead, the element may be "the value of layer set identifier" itself.

(E4: Output Layer Information)

The output layer information is a flag OutputLayerFlag[i][j] indicating whether each layer included in the layer set associated with the output layer set is adopted as the output target layer or not. The output layer set information decoding means of this embodiment decodes the output layer information OutputLayerFlag[i][j] on the basis of the syntax element output_layer_flag[i][j]. The output_layer_flag[i][j] is a flag indicating whether the j-th layer included in the output layer set i is adopted as the output target layer or not. When the value is true (1), the flag indicates that the layer is adopted as the output target layer. When the value is false (0), the layer is not adopted as the output target layer.

The output layer set information decoding means may omit decoding of a part of or the entire output layer information, and determine the output layer information by estimation or a deriving process based on the value of another syntax element. For example, the output layer information on the output layer set OLS #i (i=1 . . . VpsNumLayerSets−1) may be determined based on the default output layer identifier (default_target_output_layer_idc) on the basis of the deriving process represented in the following (1) to (3). The output layer information on the output layer set OLS #0 made up only of base layers may be assumed as OutputLayerFlag[0][0]=1.

(1) When the default output layer identifier=0, the output layer set information decoding means estimates the output layer flags OutputLayerFlag[i][j] of all the layers as one with respect to the basic output layer where i=0 . . . vps_number_layer_sets_minus1, as shown in the following pseudo-code. Here, the variable LayerSetIdx[i] represents the layer set identifier that indicates the layer set associated with the output layer set OLS #i and is set to (output_layer_set_idx_minus1[i]+1). The variable NumLayersInIdList

[LayerSetIdx[i]] is the number of layers included in the layer set LS #(LayerSetIdx[i]) (hereinafter, same as above).

```
for (j=0;j<NumLayersInIdList[LayerSetIdx[i]]; j++)
{OutputLayerFlag[i][j]=1;}
```

(2) The case of the default output layer identifier=1: for the basic output layer where i=0 . . . vps_number_layer_sets_minus1, output layer set information decoding means adopts, as the output layer, the primary layer having the highest layer identifier included in each output layer set. The output layer information (OutputLayerFlag) is derived by the pseudocode, described below.

```
for (j=0; j<NumLayersInIdList[LayerSetIdx[i]]; j++){
  if(the layer j is the primary layer having the highest layer identifier in
LayerIdList[LayerSetIdx[i]]){
    OutputLayerFlag[i][j] = 1;
  } else{
    OutputLayerFlag[i][j] = 0;
  }
}
```

It is determined whether the layer j is the primary layer or not according to the scalability ID (ScalabilityId) derived from the syntax representing the dimension ID "dimension id[i][j]" pertaining to the layer j, and to the correspondence table between the scalable ID (ScalabilityId) and the scalability type (Scalability Dimension) shown in FIG. 13; the determination is made according to the value of the item "Auxiliary" (AuxId[j]=ScalabilityId[j][3]) in this table. That is, when this item has a value of zero (AuxId[j]==0), the value indicates that the layer j is a primary layer. When the item has a value higher than zero (AuxId[j]>0), the value indicates that the layer j is an auxiliary layer (or an AUX layer). The auxiliary layer is a layer for issuing notification about a depth map for a picture belonging to the primary layer and an auxiliary picture, such as an alpha channel. The primary layer is for a layer for issuing notification of a picture including luma/color-difference. The auxiliary picture is not classified into the primary layer.

(3) The case of default output layer identifier=2: the output layer is determined according to the syntax element "output_layer_flag[i][j]" pertaining to the output layer information about which notification is explicitly issued with respect to each output layer set OLS #i. That is, as shown in the following pseudocode, the output layer information (OutputLayerFlag[i][j]) on the j-th layer j in the output layer set OLS #i is set to the value of the syntax element output layer flag[i][j].

```
for (j=0; j<NumLayersInIdList[LayerSetIdx[i]]; j++){
  OutputLayerFlag[i][j] = output_layer_flag[i][j];
}
```

The output layer set information decoding means may derive the number of output layers NumOptLayersInOLS[i] in each output layer set OLS #i (i=0 . . . NumOuputLayerSets−1) by the pseudocode, described below, on the basis of the derived output layer information (OutputLayerFlag). That is, the number of output layers NumOptLayersInOLS[i] of the output layer set OLS #i is the number of flags where the output layer flag OutputLayerFlag[i][j] on the layer j indicates the "output layer".

```
NumOptLayersInOLS[i] = 0;
for (j=0; j<NumLayersInIdList[LayerSetIdx[i]]; j++){
  NumOptLayersInOLS[i] += OuputLayerFlag[i][j];
}
```

(E5: PTL Designation Identifier)

PTL designation identifier (profile_level_tier_idx) (SYNVPS0K in FIG. 12) . . . a syntax element for designating PTL information applied to the output layer set OLS #i (i=1 . . . NumOutputLayerSets−1). The (profile_tier_level_idx[i])-th PTL information designated by the PTL designation identifier (profile_tier_level[i]) is applied to the output layer set OLS #i.

(Bit Stream Conformance Pertaining to Output Layer Set)

Various types of the bit stream conformance which the output layer set is required to satisfy are described.

In order to prohibit definition of the output layer set having no output layer, which causes a problem in the conventional art, the image decoding apparatus 1 and the image coding apparatus 2 are respectively required to decode and generate coded data that satisfies at least the conformance condition CA1, described below, pertaining to the output layer set in this embodiment.

CA1: each output layer set OLS #i (i=0 . . . NumOutputLayerSets−1) has one or more output layers (or at least one output layer).

The condition CA1 can be represented as any of conditions CA2 and CA3, using the output layer flag OutputLayerFlag.

CA2: in each output layer set OLS #i (i=0 . . . NumOutputLayerSets−1), the total sum of the output layer flag is one or more (or higher larger than zero) (for all i=0 . . . NumOutputLayerSets−1, the sum of OutputLayerFlag[i][j] pertaining to j=0 . . . NumLayersInIdList[LayerSetIdx[i]] is one or more).

In the condition CA2, the total sum SumOfOutputLayerFlag of the output layer flags of the output layer set OLS #i is derived by the following pseudocode, for example.

```
SumOfOutputLayerFlag = 0;
for (j=0; j<NumLayersInIdList[LayerSetIdx[i]]; j++){
  SumOfOutputLayerFlag += OutputLayerFlag[i][j];
}
```

CA3: for all i=0 . . . NumOutputLayerSets−1, OutputLayerFlag[i][j] equals to one with respect to at least one j satisfying 0 . . . NumLayersInIdList[LayerSetIdx[i]].

In other words, the conformance conditions CA1 to CA3 prohibit definition of an output layer set having no output layer. As to the coded data, satisfying the conformance conditions CA1 (or CA2 or CA3) for the output layer set allows the output layer set decoded from the coded data to be securely outputted where decoded pictures on at least one output layer are output pictures in the image decoding apparatus 1. Consequently, even in case the image decoding apparatus decodes each layer in an output layer set having no output layer from the coded data, which has caused the problem in the conventional art, the possibility of causing an unanticipated operation without a picture to be outputted can be prevented.

Furthermore, it is preferred that the image decoding apparatus 1 and the image coding apparatus 2 respectively decode and generate coded data satisfying a conformance condition CB1, described below, pertaining to the output layer set.

Condition CB1: when two or more output layer sets are associated with the same layer set and the numbers of output layers are the same, the output layer flags pertaining to at least one identical layer have values different from each other on the two or more output layers.

The condition CB1 may be represented as any of conditions CB2 and CB3, instead.

Condition CB2: when the layer set identifier LayerSetIdx[i] of the output layer set OLS #i (i=0 ... NumOutputLayerSets−1) equals to the layer set identifier LayerSetIdx[j] of the output layer set OLS #j (j=0 ... NumOutputLayerSets−1, i!=j) and the number of output layers NumOptLayersInOLS [i] of the output layer set OLS #i equals to the number of output layers NumOptLayersInOLS[j] of the output layer set OLS #j, the output layer flag OuputLayerFlag[i][n] of the output layer set OLS #i is different from the output layer flag OuputLayerFlag[i][n] of the output layer set OLS #j with respect to at least one layer n (n=0 ... NumOptLayersInOLS[i]−1).

Condition CB3: when the layer set identifier LayerSetIdx [i] of the output layer set OLS #i (i=0 ... NumOutputLayerSets−1) equals to the layer set identifier LayerSetIdx[j] of the output layer set OLS #j (j=0 ... NumOutputLayerSets−1, i!=j), the list of the output layer flags OutputLayerFlag[j][ ] of the output layer set OLS #i is different from the list of the output layer flags OutputLayerFlag[j][ ] of the output layer set OLS #j.

In other words, conditions CB1 to CB3 prohibit redundant definition of output layer sets having the same output layer configuration. As to the coded data, satisfying the conformance conditions CB1 (or CB2 or CB3) for the output layer set allows two or more output layer sets decoded from the coded data to have output layer configurations different from each other, in the image decoding apparatus 1. Consequently, the image decoding apparatus can prevent decoding pertaining to the redundantly defined output layer set from the coded data. Furthermore, the amount of code pertaining to the redundant definition of the output layer set can be reduced.

The image decoding apparatus 1 and the image coding apparatus 2 may respectively decode and generate coded data that satisfies conformance conditions CB4 to CB6 for prohibiting redundant definition in the case of combination of the output layer flag and the PTL information, as the conformance condition pertaining to prohibition of redundant definition of the output layer set instead of the conditions CB1 to CB3.

Condition CB4: when two or more output layer sets are associated with the same layer set and the numbers of output layers are the same, the output layer flags where the PTL information associated with each output layer set is different or which pertain to at least one identical layer have values different from each other on the two or more output layers.

Condition CB5: when the layer set identifier LayerSetIdx [i] of the output layer set OLS #i (i=0 ... NumOutputLayerSets−1) equals to the layer set identifier LayerSetIdx[j] of the output layer set OLS #j (j=0 ... NumOutputLayerSets−1, i!=j) and the number of output layers NumOptLayersInOLS [i] of the output layer set OLS #i equals to the number of output layers NumOptLayersInOLS[j] of the output layer set OLS #j, the pieces of PTL information associated with the output layer sets are different from each other, or the output layer flag OuputLayerFlag[i][n] of the output layer set OLS #i is different from the output layer flag OuputLayerFlag[i][n] of the output layer set OLS #j with respect to at least one layer n (n=0 ... NumOptLayersInOLS [i]−1).

Condition CB6: when the layer set identifier LayerSetIdx [i] of the output layer set OLS #i (i=0 ... NumOutputLayerSets−1) equals to the layer set identifier LayerSetIdx[j] of the output layer set OLS #j (j=0 ... NumOutputLayerSets−1, i!=j), the PTL information on the output layer set OLS #i and the set including the output layer flags are different from each other.

Here, it is preferred that difference in PTL information associated with each output layer set be "in the PTL information designated by the PTL designation identifier (profile_tier_level[i]) of the output layer set OLS #i the output layer set OLS #i and the PTL information designated by the PTL designation identifier IDX (profile_tier_level[j]) of the output layer set OLS #j, at least a set of syntax elements P={general_profile_space, general_profile_idc, general_level_idc, general_tier_flag, general_compatibility_flag [i] (i=0 ... 31)} of the profile space general_profile_space, the profile identifier general_profile_idc, the level identifier general_level_idc, the tier flag general_tier_flag, and the profile compatibility flag general_compatibility_flag[i] be different".

In other words, the conditions CB4 to CB6 prohibit redundant definition of output layer sets having the same output layer configuration and the same profile/level. As to the coded data, satisfying the conformance conditions CB4 (or CB5 or CB6) for the output layer set allows two or more output layer sets decoded from the coded data to have output layer configurations different from each other or different profile/level when these output layer sets are decoded, in the image decoding apparatus 1. Consequently, the image decoding apparatus can prevent decoding pertaining to the redundantly defined output layer set from the coded data. Furthermore, the amount of code pertaining to the redundant definition of the output layer set can be reduced.

Furthermore, it is preferred that the image decoding apparatus 1 and the image coding apparatus 2 respectively decode and generate coded data satisfying a conformance condition CCT, described below, pertaining to the layer set associated with the output layer set.

Condition CCT: the layer set LS #i (i=0 ... VpsNumLayerSets−1) includes base layers.

The condition CCT may be represented as any of conditions CC2 to CC4, instead.

CC2: the layer set LS #i (i=0 ... VpsNumLayerSets−1) includes layers with a layer identifier of zero.

CC3: the 0-th element LayerIdList[i][0] of the layer ID list LayerIDList[i] of the layer set LS #i (i=0 ... VpsNumLayerSets−1) is a layer with a layer identifier of zero.

CC4: the flag layer_id_included_flag[i][0] indicating whether the layer 0 is included in the layer set LS #i (i=0 ... VpsNumLayerSets−1) or not has a value of one (layer_id_included_flag[i][0]=1 for i=0 ... VpsNumLayerSets−1).

It is thus preferred that the image decoding apparatus 1 and the image coding apparatus 2 respectively decode and generate coded data satisfying the conformance condition CC (CC is any of CC1 to CC4).

In other words, the conditions CC1 to CC4 mean that in the output layer set, the base layer (layer with a layer identifier of zero) is always included as a layer that is to be a decoding target. As to the coded data, satisfying the conformance conditions CC (CC is any of CC1 to CC4) for the layer set (i.e., all layer sets) associated with the output layer set allows the output layer sets decoded from the coded data to decode the base layer necessarily and securely in the image decoding apparatus 1. Consequently, during decoding the coded data that has been generated from the coded data including a certain layer set A through the bit stream extraction process and includes the layer set B, which is a subset of the layer set A, even in the decoding apparatus V1 (e.g., decoding specified in HEVC Main profile) supporting only decoding the base layer (layer with a layer identifier of zero), the operation can be performed with no problem because of the following reason.

- The coded data including the extracted layer set B includes VCL (slice segment) with a layer identifier of zero and nonVCL (parameter sets (VPS/SPS/PPS).
- The decoding apparatus V1 decodes the slice segment with a layer identifier of zero. When it is indicated that the profile of SPS referred to by the slice segment with a layer identifier of zero can be decoded, decoding is performed. When it is not indicated that the PTL information, such as the SPS profile, referred to by the slice segment with a layer identifier of zero can be decoded, decoding is allowed not to be performed.
- The decoding apparatus V1 can perform decoding and stop decoding. That is, the decoding apparatus V1 can perform (support) decoding without any problem.

On the contrary, the coded data that does not satisfy the conditions CC1 to CC4 is decoded by the layer set decoding apparatus V1. That is, when the layer set including no base layer is decoded by the decoding apparatus V1, the following problems occur.

- No slice segment with a layer identifier of zero is in the coded data. Consequently, the decoding apparatus V1 does not decode the slice segment.
- The slice_pic_parameter_set_id of the slice segment is not decoded. Consequently, PPS is not activated (likewise, SPS and VPS are not activated).
- The decoding apparatus V1 does not decode SPS (and VPS) to be activated. PTL information, such as the profile, included in SPS (VPS) is not decoded. Consequently, decoding is not performed.
- When the coded data in an internal buffer is exhausted, the decoding apparatus V1 issues a request for coded data to the coding apparatus (or coded data transmitting apparatus, coded data buffering apparatus). The requested coded data does not have any target to be decoded either. Consequently, there is a possibility of endlessly continuing request for the coded data and decoding to try to decode the requested output image (e.g., one picture).

When the conformance condition CC (CC is any of CC1 to CC4) is satisfied, the coded data including the layer set A (the layer set B, which is a subset of the layer set A and generated by the bit stream extraction from the coded data including the layer set A) can be securely decoded (supported).

(Output Controlling Unit 16)

The output controlling unit 16 derives the target output layer ID list TargetOptLayerIdList that indicates the layer structure of the target output layer set TargetOptLayerSet, as output control information, and the target decoding layer ID list TargetDecLayerIdList required to decode the target output layer set, on the basis of output designation information supplied from the outside, layer set information on the active VPS stored in the parameter memory 13, and output layer set information, and outputs the result to the bit stream extraction unit 17 and the decoded picture management unit 15.

The output designation information supplied from the outside includes at least the target output layer set identifier TargetOLSIdx as information for identifying the output layer set that is a processing target. It is assumed that the active VPS referred to by the output controlling unit 16 has preliminarily been decoded and stored in the parameter memory 13. To identify the active VPS, the active VPS identifier may be included in the output designation information.

The target output layer ID list TargetOptLayerIdList and the target decoding layer ID list TargetDecLayerIdList are derived by the pseudocode, described below, for example.

(The pseudocode representing derivation of TargetDecLayerIdList and TargetOptLayerIdList) for (k=0, j=0; j<NumLayersInIdList [LayerSetIdx[TargetOLSIdx]]; j++) {//SA01

---

TargetDecLayerIdList[j] = LayerIdList[LayerSetIdx [TargetOLSIdx] ][j]; //SA02
if (OutputLayerFlag[TargetOLSIdx][j]){ //SA03
TargetOptLayerIdList[k] = LayerIdList[LayerSetIdx [TargetOLSIdx ][j]; //SA04
k++; //SA05
}
} // end of loop //SA07

---

The pseudocode can be represented in steps as follows.

(SA01) The start point of a loop pertaining to derivation of the layer ID list TargetOptLayerIdList[ ] of the target output layer set OLS #(TargetOLSIdx) and target decoding layer ID list TargetDecLayerIdList[ ]. Before the loop is started, the variables k and j are initialized to zero. The process in the loop is executed when the variable j is less than the number of layers "NumLayersInIdList [LayerSetIdx[TargetOLSIdx]]" included in the layer set LS #(LayerSetIdx[TargetOL SIdx]) associated with the target output layer set OLS # (TargetOLSIdx). The variable j is incremented by "1" every time when the process in the loop is executed.

(SA02) The j-th element of the layer set LS #(LayerSetIdx [TargetOLSIdx]) associated with the output layer set OLS #(TargetOLSIdx) is added to the j-th element of the target decoding layer ID list TargetDecLayerIdList [ ] (i.e., TargetDecLayerIdList[j]=LayerIdList[LayerSetIdx [TargetOLSIdx]][j]).

(SA03) It is determined whether the j-th layer in the output layer set OLS #(TargetOLSIdx) is an output layer or not. That is, when the output layer flag OutputLayerFlag [TargetOLSIdx][j] is one (true) (an output layer), the processing transitions to step SA04. When the output layer flag OutputLayerFlag [TargetOLSIdx][j] is zero (false) (not an output layer), the processing transitions to step SA0A.

(SA04) The j-th element of the layer set LS #(LayerSetIdx [TargetOLSIdx]) associated with the output layer set OLS #(TargetOLSIdx) is added to the k-th element of the layer ID list TargetOptLayerIdList[ ] of the output layer set OLS #(TargetOLSIdx) (i.e., TargetOptLayerIdList[k]=LayerIdList [LayerSetIdx[TargetOLSIdx]][j]).

(SA05) The variable k is incremented by "1" (i.e., k++).

(SA0A) The end point of a loop pertaining to derivation of the layer ID list TargetOptLayerIdList[ ] of the target output layer set OLS #(TargetOLSIdx) and target decoding layer ID list TargetDecLayerIdList[ ].

As described above, the output controlling unit 16 can derive the target output layer ID list TargetOptLayerIdList that indicates the layer structure of the target output layer set TargetOptLayerSet, as output control information, and the target decoding layer ID list TargetDecLayerIdList that indicates the layer structure required to decode the target output layer set, on the basis of output designation information supplied from the outside, layer set information on the active VPS stored in the parameter memory 13, and output layer set information. When the designated output layer set OLS # (TargetOLSIdx) has no output layer in the output controlling unit 16, it is preferred to designate at least one layer included in the output layer set as an output layer. For example, all the layers included in the output layer set or the primary layer having the highest layer identifier may be designated as output layers.

(Picture Decoding Unit 14)

The picture decoding unit 14 generates the decoded picture on the basis of the input VCL NAL unit and the active parameter set, and outputs the decoded picture.

Figure 17:
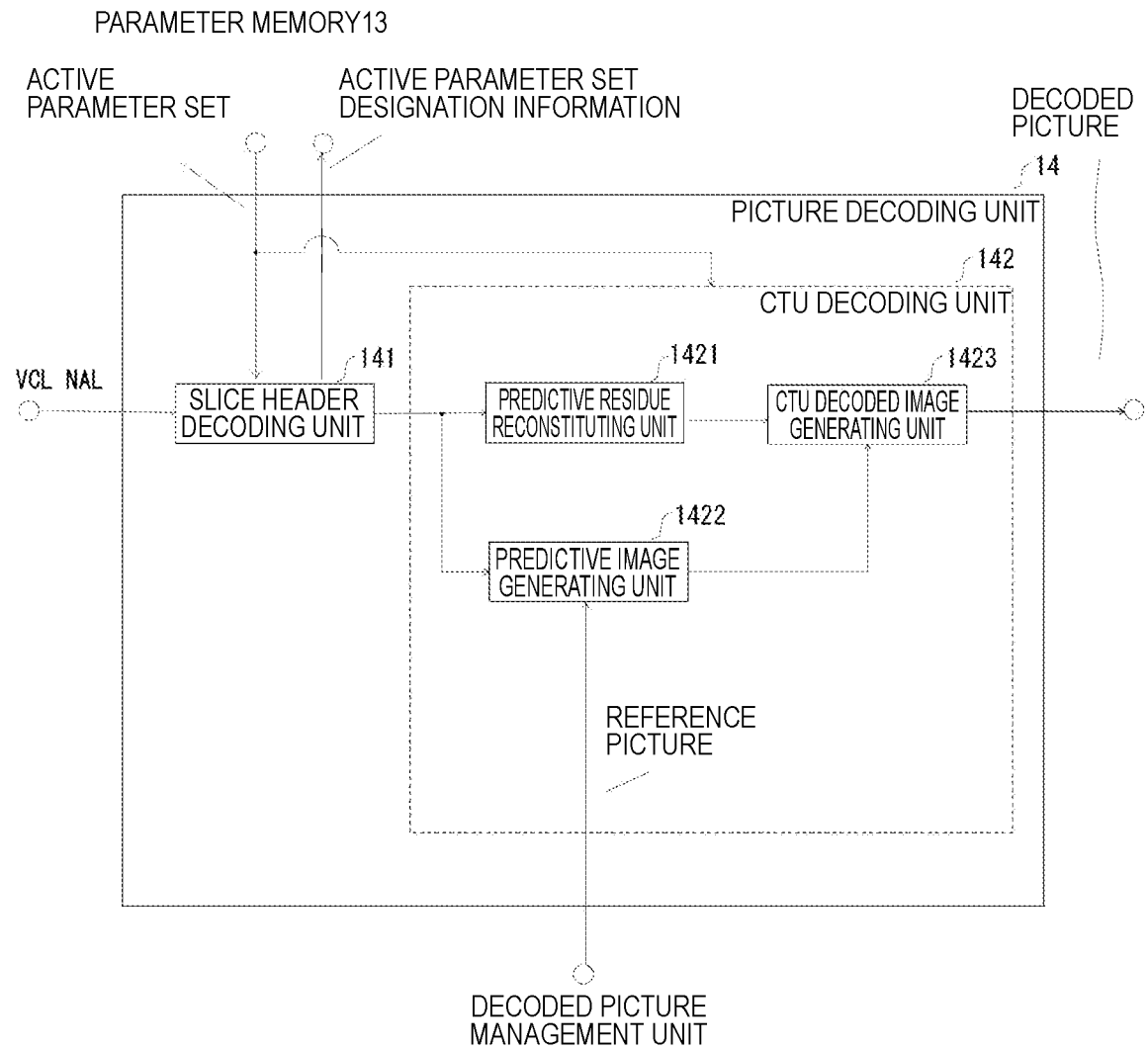
FIG. 17 is a schematic diagram showing a configuration of a target set picture decoding unit according to this embodiment.

Referring to FIG. 17, the schematic configuration of the picture decoding unit 14 is described. FIG. 17 is a functional block diagram showing the schematic configuration of the picture decoding unit 14.

The picture decoding unit 14 includes a slice header decoding unit 141, and a CTU decoding unit 142. The CTU decoding unit 142 further includes a predictive residue restoring unit 1421, a predictive image generating unit 1422, and a CTU decoded image generating unit 1423.

(Slice Header Decoding Unit 141)

The slice header decoding unit 141 decodes the slice header on the basis of the input VCL NAL unit and the active parameter set. The decoded slice header is output to the CTU decoding unit 142, together with the input VCL NAL unit.

(CTU Decoding Unit 142)

In a schematic view, the CTU decoding unit 142 performs decoding to obtain a decoded image in a region corresponding to each of CTUs included in the slices constituting the picture, on the basis of the input slice segment (slice header and slice data) included in the VCL NAL unit, and the active parameter set, thus generating the decoded image of the slice. The decoded image of CTU is generated by the predictive residue restoring unit 1421, the predictive image generating unit 1422 and the CTU decoded image generating unit 1423 in the CTU decoding unit 142.

The predictive residue restoring unit 1421 decodes the predictive residue information (TT information) contained in the input slice data, and generates and outputs the predictive residue of the target CTU.

The predictive image generating unit 1422 generates the predictive image on the basis of the prediction method and prediction parameters indicated by the predictive information (PT information) contained in the input slice data, and outputs the image. Here, the decoded image of the reference picture and the coding parameter therefor are used if necessary. For example, in the case of using inter prediction or inter-layer image prediction, the corresponding reference picture is read from the decoded picture management unit 15.

The CTU decoded image generating unit 1423 adds the input predictive image to the predictive residue, generates and outputs the decoded image of the target CTU.

<Decoding Process in Picture Decoding Unit 14>

Figure 18:
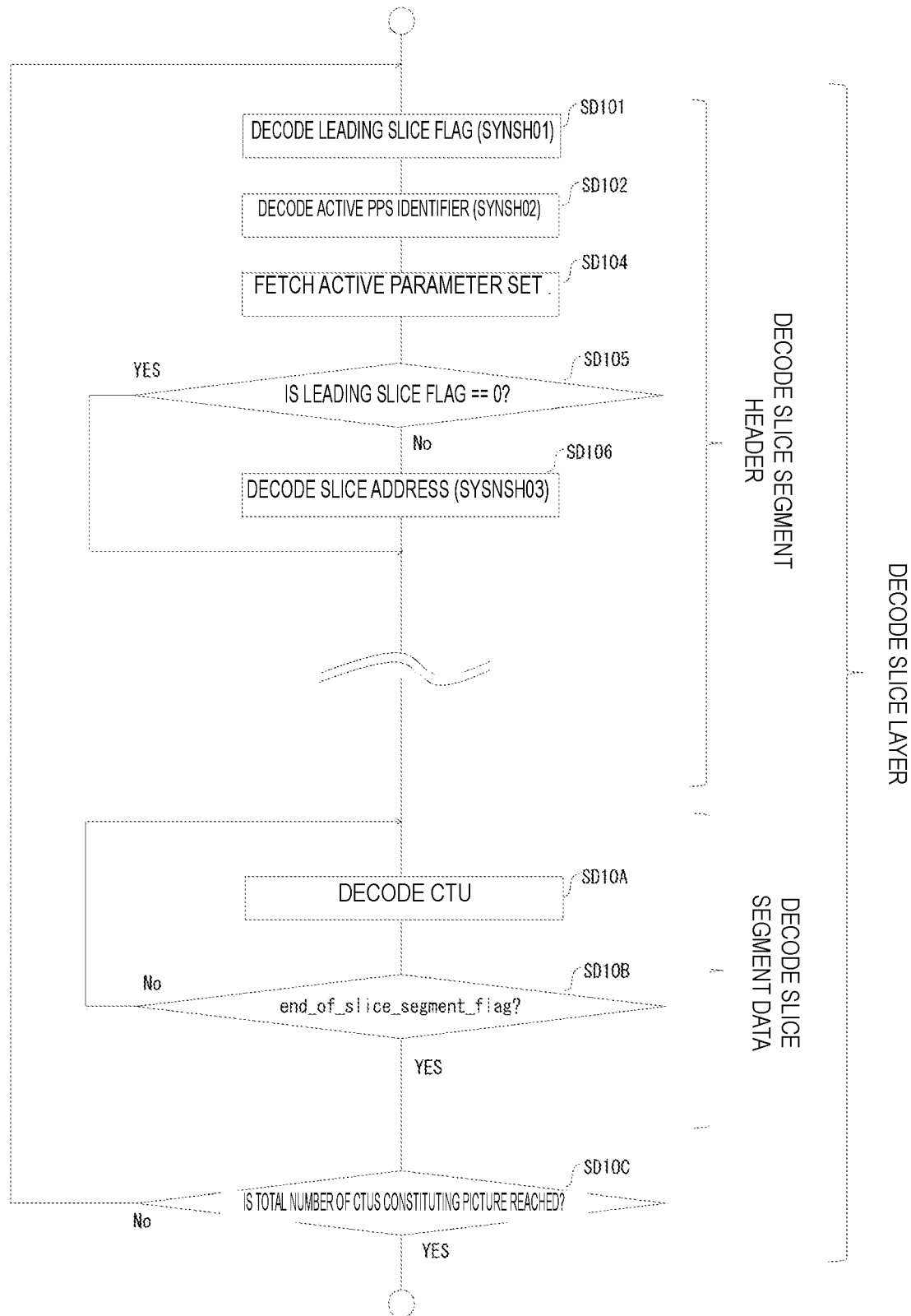
FIG. 18 is a flowchart for illustrating the operation of a picture decoding unit according to this embodiment.

Hereinafter, referring to FIG. 18, the schematic operation of the picture decoding on the target layer i in the picture decoding unit 14 is described. FIG. 18 is a flowchart showing the decoding process in units of slices that constitute the picture on the target layer i in the picture decoding unit 14.

(SD101) The leading slice flag of the decoding target slice (first_slice_segment_in_pic_flag) (SYNSH01 in FIG. 15(*d*)) is decoded. When the leading slice flag is one, the decoding target slice is the leading slice in the decoding order in the picture (hereinafter, processing order), and the position (hereinafter, CTU address) in a raster scanning order in the picture in the leading CTU in the decoding target slice is set to zero. Furthermore, a counter numCtu of the number of processed CTUs (hereinafter, the number of processed CTUs numCtu) in the picture is set to zero. When the leading slice flag is zero, the leading CTU address of the decoding target slice is set on the basis of the slice address decoded in the SD106, which will be described later.

(SD102) The active PPS identifier (slice_pic_parameter_set_id) (SYNSH02 in FIG. 15(*d*)) that designates an active PPS referred to during decoding the decoding target slice is decoded.

(SD104) The active parameter set is fetched from the parameter memory 13. That is, a PPS having the PPS identifier (pps_pic_parameter_set_id) identical to the active PPS identifier (slice_pic_parameter_set_id) to which the decoding target slice refers is regarded as the active PPS, and the coding parameter of the active PPS is fetched (read) from the parameter memory 13. Furthermore, an SPS having the SPS identifier (sps_seq_parameter_set_id) identical to the active SPS identifier (pps_seq_parameter_set_id) in the active PPS is regarded as the active SPS, and the coding parameter of the active SPS is fetched from the parameter memory 13. Moreover, a VPS having the VPS identifier (vps_video_parameter_set_id) identical to the active VPS identifier (sps_video_parameter_set_id) in the active SPS is regarded as the active VPS, and the coding parameter of the active VPS is fetched from the parameter memory 13.

(SD105) It is determined whether the decoding target slice is the leading slice in the processing order in the picture or not on the basis of the leading slice flag. In the case where the leading slice flag is zero (YES in SD105), the processing transitions to step SD106. In the other case (No in SD105), the process in SD106 is skipped. In the case where the leading slice flag is one, the slice address of the decoding target slice is zero.

(SD106) The slice address (slice_segment_address) (SYNSH03 in FIG. 15(*d*)) of the decoding target slice is decoded, and the leading CTU address of the decoding target slice is set. For example, the leading slice CTU address=slice_segment_address.

. . . not shown . . .

(SD10A) The CTU decoding unit 142 generates a CTU decoded image in a region corresponding to each of CTUs included in the slices constituting the picture, on the basis of the input slice header, active parameter set, and each of pieces of CTU information (SYNSD01 in FIG. 15(*d*)) in the slice data included in the VCL NAL unit. Furthermore, after each of the pieces of CTU information, there is a slice end flag (end_of_slice_segment_flag) indicating whether the CTU is the end of the decoding target slice or not (SYNSD02 in FIG. 15(*e*)). After each CTU is decoded, the value of the number of processed CTUs is incremented by one (numCtu++).

(SD10B) It is determined whether the CTU is the end of the decoding target slice or not on the basis of the slice end flag. In the case where the slice end flag is one (YES in SD10B), the processing transitions to step SD10C. In the other case (No in SD10B), the processing transitions to SD10A to decode the subsequent CTU information.

(SD10C) It is determined whether the number of processed CTUs numCtu reaches the total number of CTUs (PicSizeInCtbsY) that constitute the picture or not. That is, it is determined whether numCtu==PicSizeInCtbsY or not. In the case where numCtu is equal to PicSizeInCtbsY (YES in SD10C), the decoding process in units of slices that constitute the decoding target picture is finished. In other case (numCtu<PicSizeInCtbsY) (No in SD10C), the processing transitions to SD101 to continue the decoding process in units of slices that constitute the decoding target picture.

The operation of the picture decoding unit 14 according to Embodiment 1 is thus described above. The steps are not limited to the above steps. Alternatively, the steps may be changed in an implementable range.

(Bit Stream Extractor 17)

The bit stream extraction unit 17 performs the bit stream extraction process on the basis of the output control information supplied from the output controlling unit 16 (the target decoding layer ID list TargetDecLayerIdList that represents the configuration of the layer as a decoding target, and the target highest temporal identifier TargetHighestTid in the output layer set), removes (discards) the NAL unit that is not included in the set (called a target set TargetSet) determined by the target highest temporal identifier TargetHighestTid and the target decoding layer ID list TargetDecLayerIdList, from the hierarchically coded data DATA inputted, and extracts and outputs the target set coded data DATA #T (Bit streamToDecode) made up of the NAL units included in the target set TargetSet.

More specifically, the bit stream extraction unit 17 includes NAL unit decoding means for decoding the NAL unit header.

Figure 19:
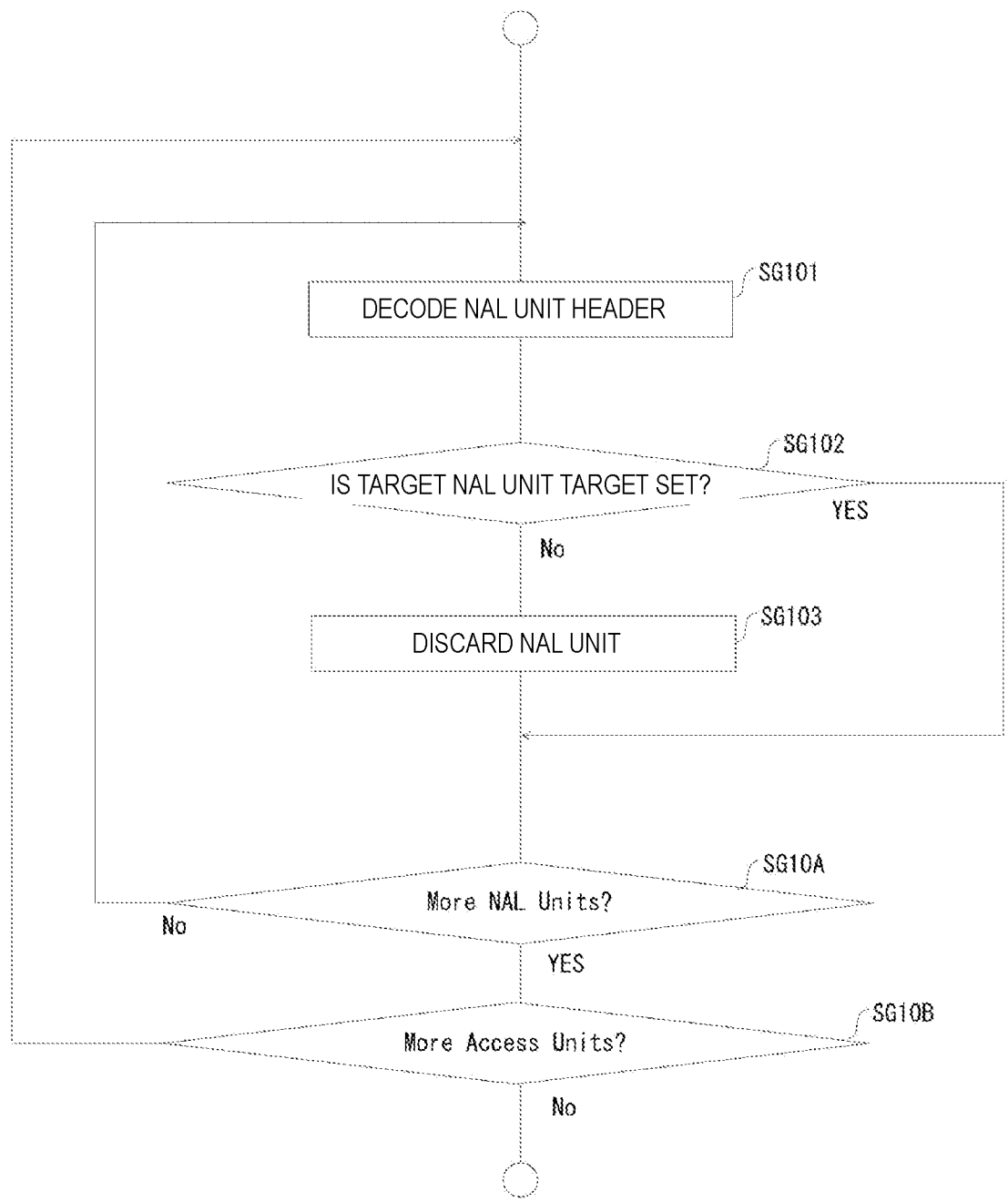
FIG. 19 is a flowchart for illustrating the operation of a bit stream extraction unit according to this embodiment.

Hereinafter, referring to FIG. 19, the schematic operation of the bit stream extraction unit 17 according to this embodiment is described. FIG. 19 is a flowchart showing a bit stream extraction process in units of the access unit in the bit stream extraction unit 17.

(SG101) The bit stream extraction unit 17 decodes the NAL unit header of the supplied target NAL unit according to the syntax table shown in FIG. 5(b). That is, an NAL unit type (nal_unit_type), a layer identifier (nuh_layer_id) and a temporal identifier (nuh_temporal_id_plus1) are decoded. The layer identifier nuhLayerId of the target NAL unit is set in the "nuh_layer_id". The temporal identifier temporalId of the target NAL unit is set in the "nuh_temporal_id_plus1−1".

(SG102) It is determined whether or not the layer identifier of the target NAL unit and the temporal identifier are included in the target set TargetSet, on the basis of the target decoding layer ID list TargetDecLayerIdList and the target highest temporal identifier. More specifically, when at least any of the following conditions (1) and (2) is false (No in SG102), the processing transitions to step SG103. In the other case (both (1) and (2) are true) (Yes in SG102), the processing transitions to step SG104.

(1) In the case "a value identical to the layer identifier of the target NAL unit is in the target decoding layer ID list TargetDecLayerIdList", it is determined to be true. In the other case (the value identical to the layer identifier of the target NAL unit is not in the target decoding layer ID list TargetDecLayerIdList), it is determined to be false.

(2) In the case "the temporal identifier of the target NAL unit is equal to or less than the target highest temporal identifier TargetHighestTid", it is determined to be true. In the other case (the temporal identifier of the target NAL unit is greater than the target highest temporal identifier TargetHighestTid), it is determined to be false.

(SG103) The target NAL unit is discarded. That is, as the target NAL unit is not included in the target set TargetSet, the bit stream extraction unit 17 removes the target NAL unit from the input hierarchically coded data DATA.

(SG10A) It is determined whether any unprocessed NAL unit is in the same access unit or not. In the case where any unprocessed NAL unit is present (No in SG10A), the processing transitions to step SG101 to continue the bit stream extraction in units of the NAL unit constituting the target access unit. In the other cases (Yes in SG10A), the processing transitions to step SG10B.

(SG10B) It is determined whether the access unit subsequent to the target access unit is in the input hierarchically coded data DATA or not. In the case where the subsequent access unit is present (YES in SG10B), the processing transitions to step SG101 to continue the process for the subsequent access unit. In the case where the subsequent access unit is absent (No in SG10B), the bit stream extraction process is finished.

The operation of the bit stream extraction unit 17 according to Embodiment 1 is thus described above. The steps are not limited to the above steps. Alternatively, the steps may be changed in an implementable range.

The bit stream extraction unit 17, which has been described above, performs the bit stream extraction process on the basis of the layer ID list LayerIdListTarget on the layer constituting the target layer set LayerSetTarget supplied from the outside, and of the target highest temporal identifier HighestTidTarget, removes (discards) the target highest temporal identifier HighestTidTarget, and NAL units that are not included in a target set TargetSet defined by the layer ID list LayerIdListTarget of the target layer set LayerSetTarget from the hierarchically coded data DATA inputted, and can thus extract and generate the coded data BitstreamToDecode made up of NAL units included in the target set TargetSet.

(Advantageous Effects of Video Decoding Apparatus 1)

The hierarchical video decoding apparatus 1 (hierarchical image decoding apparatus) according to this embodiment described above includes the bit stream extraction unit 17 that performs the bit stream extraction process, removes (discards) the NAL units that are not included in the target decoding layer ID list TargetDecLayerIdList indicating the layer configuration as the decoding target identified by the target output layer set supplied from the outside and the target set TargetSet determined by the target highest temporal identifier TargetHighestTid designating the highest sublayer accompanying the layer as the decoding target supplied from the outside, from the hierarchically coded data DATA inputted and extracts the target set coded data DATA #T (BitstreamToDecode) made up of NAL units included in the target set TargetSet.

The hierarchical video decoding apparatus 1 (hierarchical image decoding apparatus) includes: layer set information decoding means for decoding layer set information including at least one layer set from hierarchically coded data inputted; output layer set information decoding means for decoding output layer set information including at least one output layer set represented by a combination of the layer set and an output layer flag; output layer set selecting means for selecting one of output layer sets included in the output layer set information; picture decoding means for generating decoded pictures on layers included in a layer set corresponding to the selected output layer set; and buffer means for holding the decoded pictures on the layers. The buffer means outputs, as an output picture, the decoded picture corresponding to at least one layer among the held decoded pictures on the layers with respect to this layer. Consequently, even when the coded data of the output layer set having no output layer is inputted, at least one layer among layer sets that are to be decoding targets can be regarded as an output layer, and the decoded picture on the output layer can be outputted.

[Hierarchical Video Coding Apparatus]

The configuration of the hierarchical video coding apparatus 2 according to this embodiment is hereinafter described with reference to FIG. 20.

(Configuration of Hierarchical Video Coding Apparatus)

Figure 20:
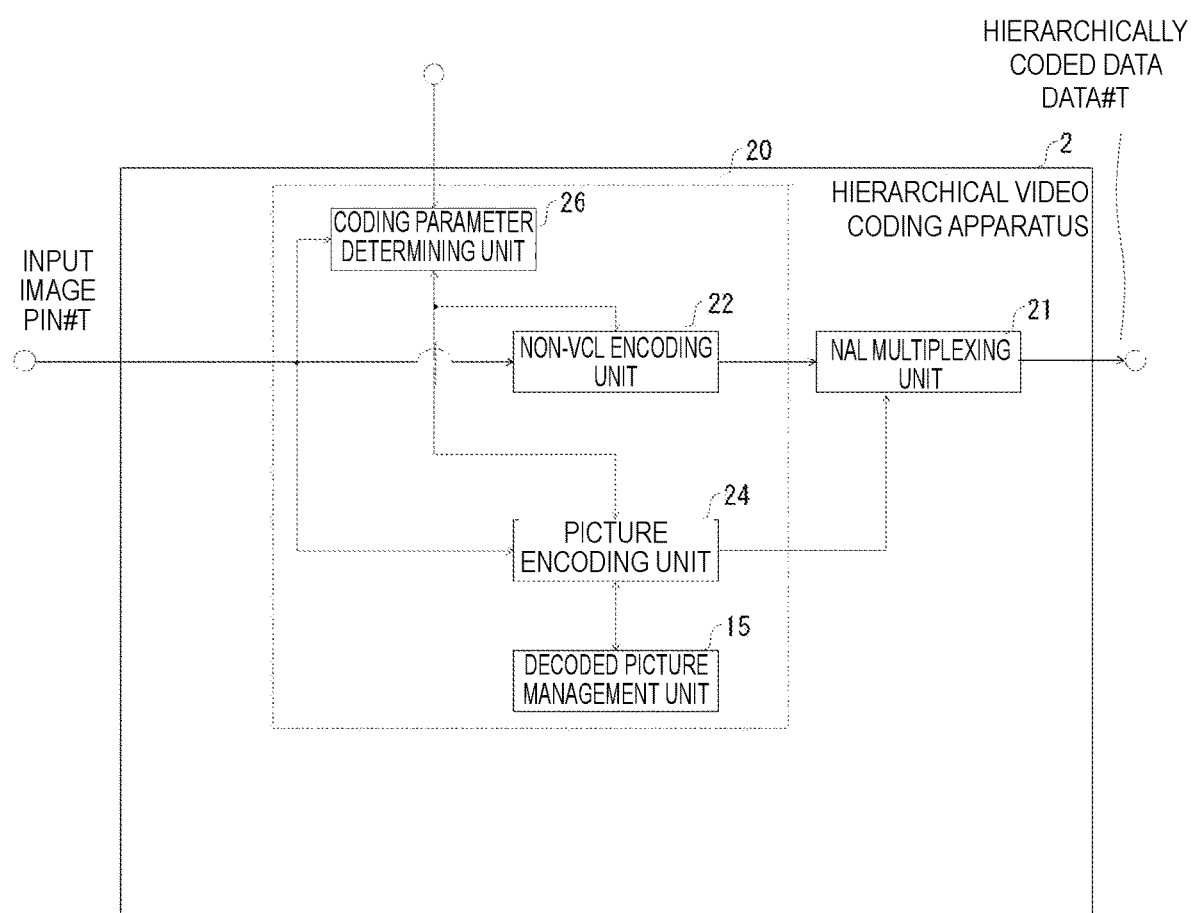
FIG. 20 is a schematic diagram showing a configuration of a hierarchical video coding apparatus according to this embodiment.

Referring to FIG. 20, the schematic configuration of the hierarchical video coding apparatus 2 is described. This diagram is a functional block diagram showing the schematic configuration of the hierarchical video coding apparatus 2. The hierarchical video coding apparatus 2 codes an input image PIN #T (picture) on each layer/sublayer included in the target set, which is to be a coding target, and thus generates the hierarchically coded data DATA of the target set. That is, the video coding apparatus 2 codes the picture on each layer in order of the element of the layer ID list TargetLayerIdList [0] . . . TargetLayerIdList [N−1] in the target set TargetSet (N is the number of layers included in the target set (target layer set)) and thus generates the coded data. To securely output the decoded picture on at least one output layer in the output layer set decoded from the coded data as the output picture in the hierarchical video decoding apparatus 1 (including its variations), the hierarchical video coding apparatus 2 generates the hierarchically coded data DATA of the target set so as to satisfy at least the conformance condition CAT (or CA2, CA3). To secure that the two or more output layer sets decoded from the coded data have output layer configurations different from each other, it is preferred to generate the hierarchically coded data DATA of the target set so as to satisfy the conformance condition CB1 (or CB2 to CB6). To secure that the layer set includes a base layer, it is preferred to generate the hierarchically coded data DATA of the target set so as to satisfy the conformance condition CC (CC is any of CC1 to CC4). The hierarchically coded data DATA of the target set may be generated so as to satisfy the conformance tests of Annex.C of Non-Patent Literature 1 or Annex.C of any of Non-Patent Literatures 2 and 3.

As shown in FIG. 20, the hierarchical video coding apparatus 2 includes a target set picture encoding unit 20, and an NAL multiplexing unit 21. Furthermore, the target set picture encoding unit 20 includes a non-VCL encoding unit 22, a picture encoding unit 24, a decoded picture management unit 15, and a coding parameter determining unit 26.

The decoded picture management unit 15 is the same configuration element as the decoded picture management unit 15 included in the hierarchical video decoding apparatus 1, having been described above. However, the decoded picture management unit 15 included in the hierarchical video coding apparatus 2 is not required to output a picture recorded in an internal DPB as an output picture. Consequently, such output may be omitted. The description of "decoding" with respect to the decoded picture management unit 15 of the hierarchical video decoding apparatus 1 is replaced with "coding", which is applicable to the decoded picture management unit 15 included in the hierarchical video coding apparatus 2.

The NAL multiplexing unit 21 stores, in an NAL unit, an input VCL and a non-VCL on each layer of the target set to generate NAL-multiplexed hierarchical video coded data DATA #T, and outputs the data to the outside. In other words, the NAL multiplexing unit 21 stores (codes), in the NAL unit, the non-VCL coded data and VCL coded data supplied from the target set picture encoding unit 20, the NAL unit types, layer identifiers and temporal identifiers that correspond to the non-VCLs and VCLs, and generates NAL-multiplexed hierarchically coded data DATA #T.

The Coding parameter determining unit 26 selects one set from among sets of coding parameters. The coding parameters are various parameters pertaining to the parameter sets (VPS, SPS and PPS), prediction parameters for picture coding, and parameters that are coding targets generated in relation to the prediction parameters. The Coding parameter determining unit 26 calculates a cost value representing the magnitude of amount of information and the coding error of each of the sets of coding parameters. The cost value is, for example, a sum of the amount of code and the value obtained by multiplying the square error by a coefficient λ. The amount of code is the amount of information on the coded data on each layer/sub-layer of the target set that is obtained by variable-length-coding the quantization error and the coding parameter. The square error is the total sum of the square values of difference values between an input image PIN #T and a predictive image over the pixels. The coefficient λ is a preset real number greater than zero. The Coding parameter determining unit 26 selects a coding parameter set whose calculated cost value is the minimum, and supplies the selected coding parameter set to the parameter set encoding unit 22 and the picture encoding unit 24.

The non-VCL encoding unit 22 corresponds to an inverse process in the non-VCL decoding unit 12 in the hierarchical video decoding apparatus 1, sets the non-VCL in the parameter set (VPS, SPS and PPS) and the like used to code the input image, on the basis of the coding parameter of each non-VCL inputted from the coding parameter determining unit 26 and the input image, and supplies the NAL multiplexing unit 21 with each parameter set and the other non-VCL as data to be stored in the non-VCL NAL unit. The non-VCL decoded by the non-VCL encoding unit 22 includes the layer set information, the output layer set information and the PTL information, which have been described in the illustration of the non-VCL decoding unit 12 included in the hierarchical image decoding apparatus 1. That is, the non-VCL encoding unit 22 includes parameter set coding means, not shown. The parameter set coding means includes layer set information coding means for coding (generating) the layer set information, output layer set information coding means for coding (generating) output layer set information, and PTL information coding means for coding the PTL information, which are not shown. The functions and operations of each encoding unit and coding means correspond to inverse processes of the respective decoding unit and decoding means. They are construed with "decoding", in the decoding unit and the decoding means, being replaced with "coding". When supplying the NAL multiplexing unit 21 with the non-VCL coded data, the non-VCL encoding unit 22 adds, to this data, the NAL unit type, the layer identifier and the temporal identifier that correspond to the non-VCL, and outputs these items.

The parameter set generated by the Non-VCL encoding unit 22 includes the identifier to identify the parameter set, and the active parameter set identifier that identifies the parameter set (active parameter set) to which the parameter set is referred for decoding pictures on the layers. More specifically, in the case of the video parameter set VPS, this VPS includes the VPS identifier to identify this VPS. In the case of the sequence parameter set SPS, this SPS includes the SPS identifier (sps_seq_paramete_set_id) to identify this SPS, and the active VPS identifier (sps_video_parameter_set_id) to identify the VPS to which this SPS and another syntax refer. In the case of the picture parameter set PPS, this PPS includes the PPS identifier (pps_pic_paramete_set_id) to identify this PPS, and the active SPS identifier (pps_seq_parameter_set_id) to identify the SPS to which this PPS and another syntax refer.

The picture encoding unit 24 codes a part of the input image on each of the layers corresponding to the slices constituting the picture, on the basis of the input image PIN #T on each layer, Non-VCL (in particular, the parameter set) supplied by the Coding parameter determining unit 26, and the reference picture recorded in the decoded picture management unit 15, thus generates the coded data on this part, and supplies the NAL multiplexing unit 21 with the data, as data to be stored in the VCL NAL unit. The details of the picture encoding unit 24 are described later. When supplying the NAL multiplexing unit 21 with the VCL coded data, the picture encoding unit 24 adds, to this data, the NAL unit type, the layer identifier and the temporal identifier that correspond to the VCL, and outputs the these items.

(Picture Encoding Unit 24)

Figure 21:
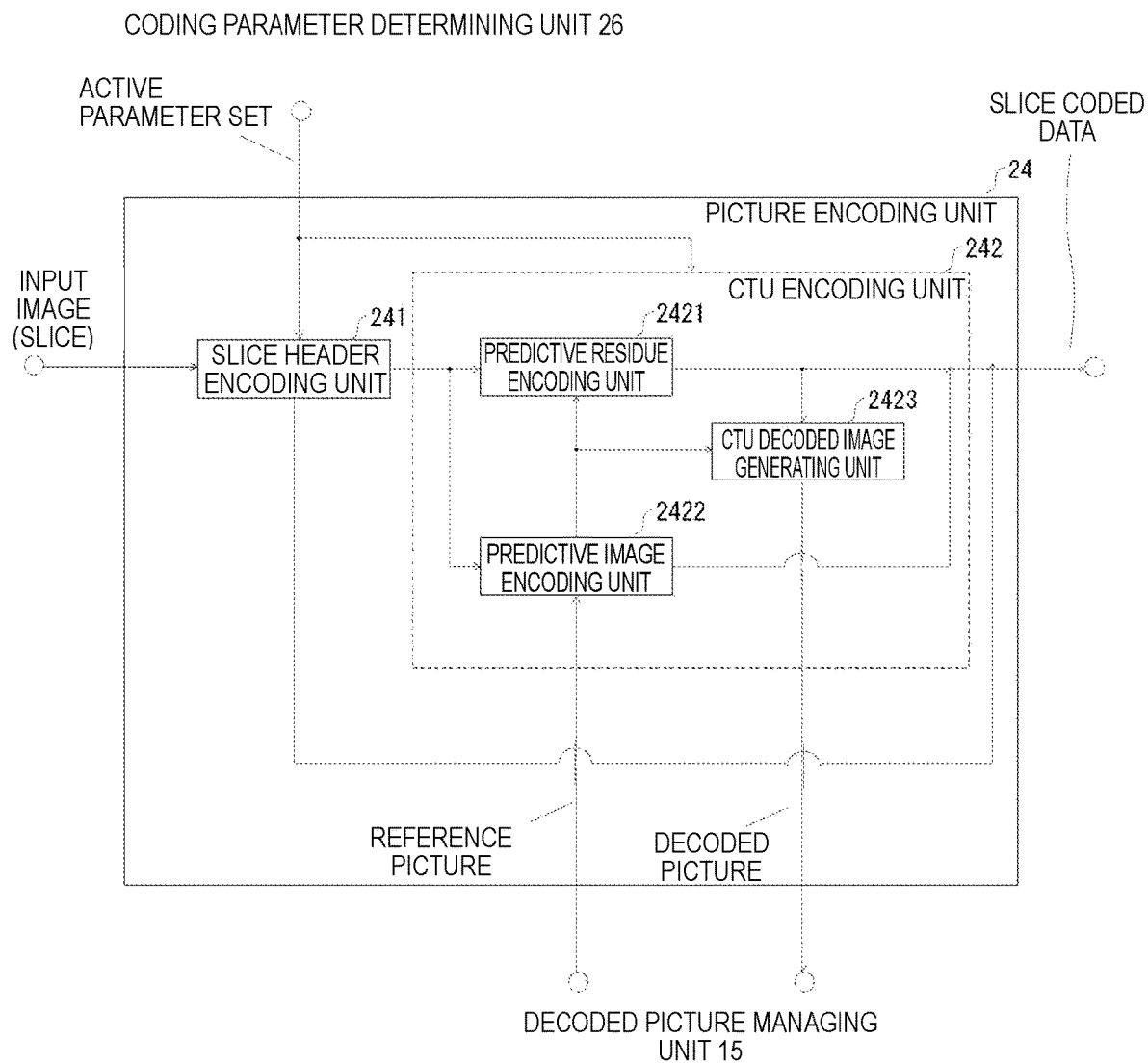
FIG. 21 is a schematic diagram showing a configuration of a target set picture encoding unit according to this embodiment.

Referring to FIG. 21, the details of the configuration of the picture encoding unit 24 are described. FIG. 21 is a functional block diagram showing the schematic configuration of the picture encoding unit 24.

As shown in FIG. 21, the picture encoding unit 24 includes a slice header encoding unit 241, and a CTU encoding unit 242.

The slice header encoding unit 241 generates a slice header used to code the input data on each layer that is input in units of slices, on the basis of the input active parameter set. The generated slice header is output as a part of the slice coded data, and supplied to the CTU encoding unit 242 together with the input data. The slice header generated by the slice header encoding unit 241 includes the active PPS identifier that designates the picture parameter set PPS (active PPS) referred to for decoding pictures on the layers.

The CTU encoding unit 242 codes the input image (target slice part) in units of CTUs, on the basis of the input active parameter set and slice header, generates the slice data pertaining to the target slice, and the decoded image (decoded picture), and outputs these items. More specifically, the CTU encoding unit 242 divides the input image in the target slice, in units of CTBs having a CTB size included in the parameter set, and codes the image corresponding to each CTB as one CTU. The CTU coding is performed by a predictive residue encoding unit 2421, a predictive image encoding unit 2422, and a CTU decoded image generating unit 2423.

The predictive residue encoding unit 2421 outputs, as a part of the slice data included in the slice coded data, quantization residue information (TT information) obtained by transforming and quantizing the difference image between the input image and the predictive image. The predictive residue is restored by applying inverse transformation and inverse quantization to the quantization residue information, and the restored predictive residue is output to the CTU decoded image generating unit 2423.

The predictive image encoding unit 2422 generates the predictive image on the basis of the predictive scheme of the target CTU included in the target slice and of the prediction parameter determined by the Coding parameter determining unit 26, and outputs the image to the predictive residue encoding unit 2421 and the CTU decoded image generating unit 2423. Information on the predictive scheme and the prediction parameter is variable-length coded as predictive information (PT information), and output as a part of slice data included in the slice coded data. In the case of using inter prediction or inter-layer image prediction, the corresponding reference picture is read from the decoded picture management unit 15.

The CTU decoded image generating unit 2423 is the same configuration element as the CTU decoded image generating unit 1423 included in the hierarchical video decoding apparatus 1. Consequently, the description thereof is omitted. The decoded image of the target CTU is supplied to the decoded picture management unit 15, and stored in the internal DPB.

<Coding Process in Picture Encoding Unit 24>

Figure 22:
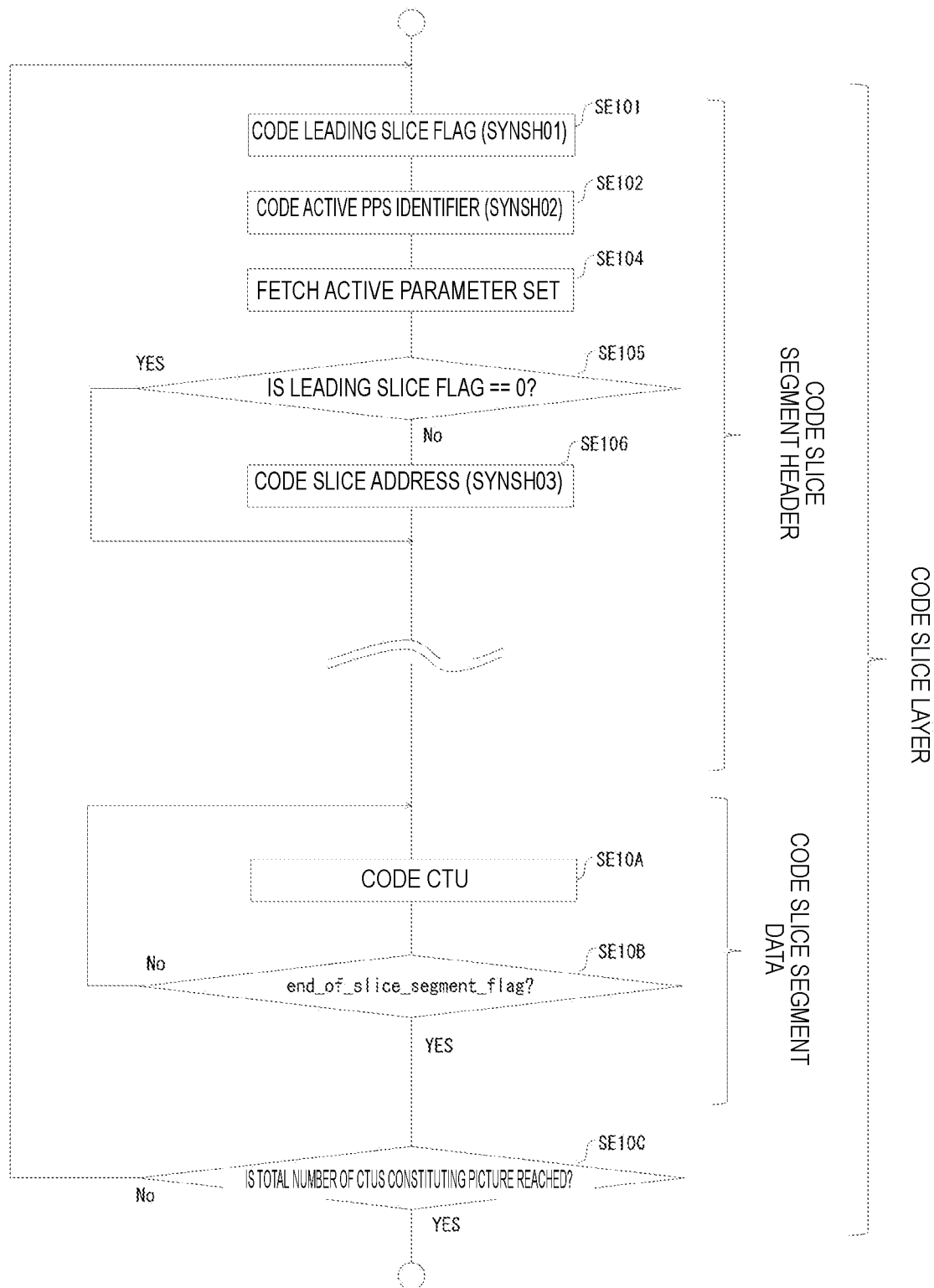
FIG. 22 is a flowchart for illustrating the operation of a picture encoding unit according to this embodiment.

Hereinafter, referring to FIG. 22, the schematic operation of the picture coding on the target layer i in the picture encoding unit 24 is described. FIG. 22 is a flowchart showing the coding process in units of slices that constitute the picture on the target layer i in the picture encoding unit 24.

(SE101) The leading slice flag of the coding target slice (first_slice_segment_in_pic_flag) (SYNSH01 in FIG. 15(d)) is coded. That is, when a piece of the input image divided into units of slices (hereinafter, the coding target slice) is the leading slice in a coding order (decoding order) (hereinafter, processing order) in the picture, the leading slice flag (first_slice_segment_in_pic_flag) is one. When the coding target slice is not the leading slice, the leading slice flag is zero. When the leading slice flag is one, the leading CTU address of the coding target slice is set to zero. Furthermore, the counter numCtu of the number of processed CTUs in the picture is set to zero. When the leading slice flag is zero, the leading CTU address of the coding target slice is set on the basis of the slice address coded in the SE106, which will be described later.

(SE102) The active PPS identifier (slice_pic_parameter_set_id) (SYNSH02 in FIG. 15(d)) that designates an active PPS referred to during decoding of the coding target slice is coded.

(SE104) The active parameter set determined by the coding parameter determining unit 26 is fetched. That is, a PPS having the PPS identifier (pps_pic_parameter_set_id) identical to the active PPS identifier (slice_pic_parameter_set_id) to which the coding target slice refers is regarded as the active PPS, and the coding parameter of the active PPS is fetched (read) from the coding parameter determining unit 26. Furthermore, an SPS having the SPS identifier (sps_seq_parameter_set_id) identical to the active SPS identifier (pps_seq_parameter_set_id) in the active PPS is regarded as the active SPS, and the coding parameter of the active SPS is fetched from the coding parameter determining unit 26. Moreover, a VPS having the VPS identifier (vps_video_parameter_set_id) identical to the active VPS identifier (sps_video_parameter_set_id) in the active SPS is regarded as the active VPS, and the coding parameter of the active VPS is fetched from the coding parameter determining unit 26.

The picture encoding unit 24 may verify whether the target set satisfies the conformance condition or not according to the layer set information, the output layer set information and the PTL information, which are included in the active VPS, the layer identifier of the active parameter set (VPS, SPS, PPS), the layer identifier of the target layer and the like. The conformance condition has already been described with reference to the hierarchical video decoding apparatus 1. Consequently, the description is omitted here. When the conformance condition is satisfied, it is secured that the hierarchically coded data DATA of the generated target set can be decoded in the hierarchical video decoding apparatus 1 corresponding to the hierarchical image coding apparatus 2.

(SE105) It is determined whether the coding target slice is the leading slice in the processing order in the picture or not on the basis of the leading slice flag. In the case where the leading slice flag is zero (YES in SE105), the processing transitions to step SE106. In the other case (No in SE105), the process in step SE106 is skipped. In the case where the leading slice flag is one, the slice address of the coding target slice is zero.

(SE106) The slice address of the coding target flag (slice_segment_address) (SYNSH03 in FIG. 15(d)) is coded. The slice address of the coding target flag (the leading CUT address of the coding target flag) can be set, for example, on the basis of the counter numCtu of the number of processed CTUs in the picture. In this case, the slice address slice_segment_address=numCtu. That is, the leading CTU address of the coding target flag=numCtu. The method of determining the slice address is not limited thereto, and can be changed in an implementable range.

(SE10A) The CTU encoding unit 242 codes the input image (coding target slice) in units of CTUs, on the basis of the input active parameter set and slice header, and outputs the coded data on the CTU information (SYNSD01 in FIG. 15(d)) as a part of the slice data of the coding target slice. The CTU encoding unit 242 generates and outputs the CTU decoded image of the region corresponding to each CTU. Furthermore, after the coded data on each of the pieces of CTU information, a slice end flag (end_of_slice_segment_flag) indicating whether the CTU is the end of the coding target slice or not (SYNSD02 in FIG. 15(d)) is coded. In the case where the CTU is the end of the coding target slice, the slice end flag is set to one. In the other case, the flag is set to zero. The set value is thus coded. After each CTU is coded, the value of the number of processed CTUs numCtu is incremented by one (numCtu++).

(SE10B) It is determined whether the CTU is the end of the coding target slice or not on the basis of the slice end flag. In the case where the slice end flag is one (YES in SE10B), the processing transitions to step SE10C. In the other case (No in SE10B), the processing transitions to SE10A to code the subsequent CTU.

(SE10C) It is determined whether the number of processed CTUs numCtu reaches the total number of CTUs (PicSizeInCtbsY) that constitute the picture or not. That is, it is determined whether numCtu==PicSizeInCtbsY or not. In the case where numCtu is equal to PicSizeInCtbsY (YES in SE10C), the coding process in units of slices that constitute the coding target picture is finished. In other case (numCtu<PicSizeInCtbsY) (No in SE10C), the processing transitions to step SE101 to continue the coding process in units of slices that constitute the coding target picture.

The operation of the picture encoding unit 24 according to Embodiment 1 has thus been described above. The steps are not limited to the above steps. Alternatively, the steps may be changed in an implementable range.

[Advantageous Effects of Video Coding Apparatus 2]

To securely output the decoded picture on at least one output layer in the output layer set decoded from the coded data as the output picture in the hierarchical video decoding apparatus 1 (including its variations), the hierarchical video coding apparatus 2 according to this embodiment described above generates the hierarchically coded data DATA of the target set so as to satisfy at least the conformance condition CA1 (or CA2). To secure that the two or more output layer sets decoded from the coded data have output layer configurations different from each other, the hierarchically coded data DATA of the target set is generated so as to satisfy the conformance condition CB1 (or CB2 to CB6). Consequently, generation of the hierarchically coded data DATA satisfying the bit stream conformance allows the hierarchical video decoding apparatus 1 to (1) prevent an output layer set having no output layer from being selected and (2) prevent a redundant output layer set having the same output layer from occurring.

To secure that the layer set includes a base layer, the hierarchically coded data DATA of the target set is generated so as to satisfy the conformance condition CC1 (or CC2 to CC4). Consequently, in the image decoding apparatus 1, it is secured that the output layer set decoded from the coded data allows the base layer to be necessarily decoded. Consequently, in the case where the parameter set (VPS/SPS/PPS) having the layer identifier on the base layer is regarded to be an active parameter set and is referred to on a certain layer C (layer identifier>0) of the layer set B during decoding the coded data including the layer set B that has been generated by the bit stream extraction process from coded data including a certain layer set A and is a subset of the layer set A, a case can be prevented where no base layer is included in the coded data including the layer set B and the certain layer C cannot be decoded. That is, satisfying the conformance condition CC1 (CC2 to CC4) can secure that the coded data including the layer set B, which is a subset of the layer set A and has been generated by the bit stream extraction from the coded data including the layer set A, can be decoded.

(Application Example to Another Hierarchical Video Coding/Decoding System) The aforementioned hierarchical video coding apparatus 2 and the hierarchical video decoding apparatus 1 can be used in a manner mounted on various apparatuses for video transmitting, receiving, recording and reproducing. The video may be natural video taken by a camera and the like, and artificial video (CG and GUI) generated by a computer and the like.

Figure 23A:
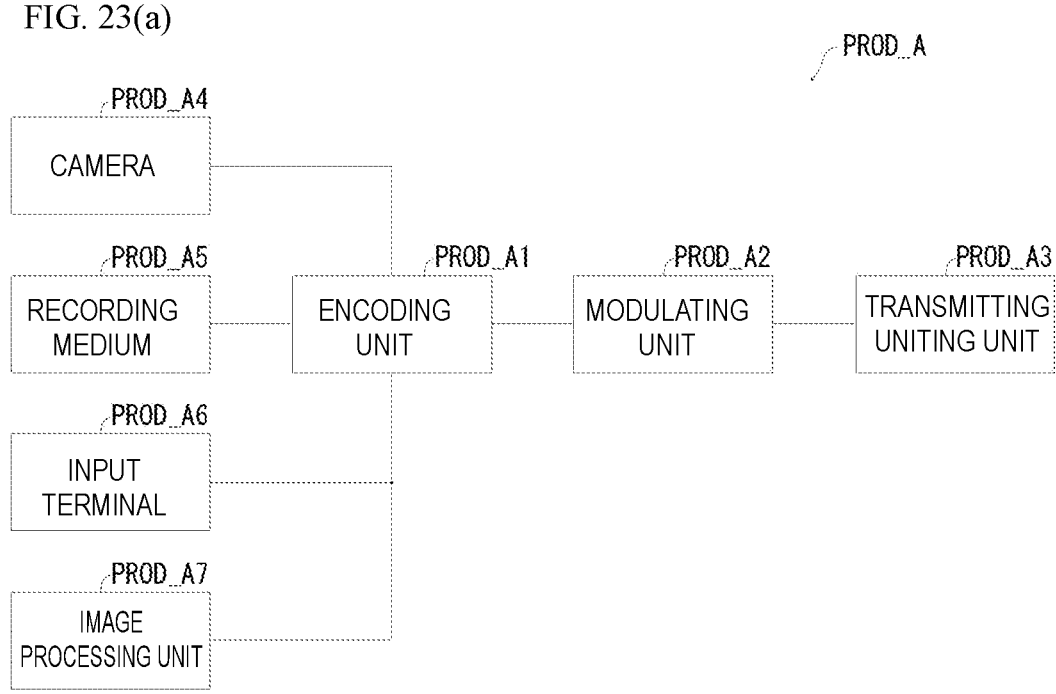
FIG. 23(a) and FIG. 23(b) are a diagram showing configurations of a transmitting apparatus mounted with the hierarchical video coding apparatus, and a receiving apparatus mounted with the hierarchical video decoding apparatus.

Referring to FIG. 23, it is described that the aforementioned hierarchical video coding apparatus 2 and the hierarchical video decoding apparatus 1 can be used for video transmitting and receiving. FIG. 23(a) is a block diagram showing the configuration of a transmitting apparatus PROD_A mounted with the hierarchical video coding apparatus 2.

As described in FIG. 23(a), the transmitting apparatus PROD_A includes an encoding unit PROD_A1 that obtains coded data by coding video, a modulating unit PROD_A2 that obtains a modulated signal by modulating carrier waves using coded data obtained by the encoding unit PROD_A1, and a transmitting unit PROD_A3 that transmits the modulated signal obtained by the modulating unit PROD_A2. The aforementioned hierarchical video coding apparatus 2 is used as the encoding unit PROD_A1.

The transmitting apparatus PROD_A may further include a camera PROD_A4 that serves as a supply source of video to be input into the encoding unit PROD_A1 and takes video, a recording medium PROD_A5 that records video, an input terminal PROD_A6 for receiving video from the outside, and an image processing unit A7 that generates or processes images. In FIG. 23(a), the configuration where the transmitting apparatus PROD_A is provided with all of these elements is illustrated. However, some of these may be omitted.

The recording medium PROD_A5 may record uncoded video. Alternatively, this medium may record video coded according to a coding scheme for recording that is different from the coding scheme for transmission. In the latter case, it is preferred that a decoding unit (not shown) that decodes coded data read from the recording medium PROD_A5 according to a coding scheme for recording intervene between the recording medium PROD_A5 and the encoding unit PROD_A1.

Figure 23B:
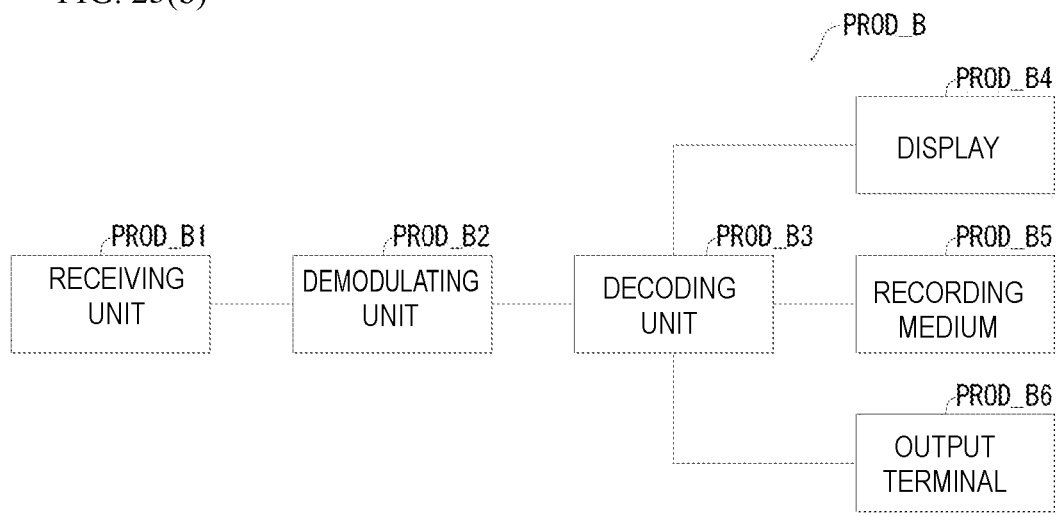

FIG. 23(b) is a block diagram showing the configuration of a receiving apparatus PROD_B mounted with the hierarchical video decoding apparatus 1. As described in FIG. 23(b), the receiving apparatus PROD_B includes a receiving unit PROD_B1 that receives a modulated signal, a demodulating unit PROD_B2 that obtains a coded data by demodulating the modulated signal received by the receiving unit PROD_B1, and a decoding unit PROD_B3 that obtains video by decoding the coded data obtained by the demodulating unit PROD_B2. The aforementioned hierarchical video decoding apparatus 1 is used as the decoding unit PROD_B3.

The receiving apparatus PROD_B may further include a display PROD_B4 that serves as a supply destination of video to be output from the decoding unit PROD_B3 and displays video, and a recording medium PROD_B5 for recording video, and an output terminal PROD_B6 for outputting video to the outside. In FIG. 23(b), the configuration where the receiving apparatus PROD_B is provided with all of these elements is illustrated. However, some of these may be omitted.

The recording medium PROD_B5 may be for recording uncoded video. Alternatively, this medium may record video coded according to a coding scheme for recording that is different from the coding scheme for transmission. In the latter case, it is preferred that an encoding unit (not shown) that codes video obtained from the decoding unit PROD_B3 according to the coding scheme for recording intervene between the decoding unit PROD_B3 and the recording medium PROD_B5.

The transmission medium that transmits the modulated signal may be wireless or wired medium. The transmission manner that transmits the modulated signal may be broadcast (here, indicating a transmission manner where the transmission destination has not preliminarily been specified). This manner may be communication (here, indicating a transmission manner where the transmission destination has been preliminarily specified). That is, the transmission of the modulated signal may be achieved by any of wireless broadcast, wired broadcast, wireless communication, and wired communication.

For example, a broadcast station for terrestrial digital broadcast (broadcast facilities and the like)/receiving unit (television receiving unit and the like) is an example of the transmitting apparatus PROD_A/receiving apparatus PROD_B for transmitting and receiving the modulated signal through wireless broadcasting. A broadcast station for cable television broadcast (broadcast facilities and the like)/receiving unit (television receiving unit and the like) is an example of the transmitting apparatus PROD_A/receiving apparatus PROD_B for transmitting and receiving the modulated signal through wired broadcasting.

A server (workstation etc.)/client (television receiving unit, personal computer, smartphone, etc.) for VOD (Video On Demand) service or video sharing service using the Internet is an example of the transmitting apparatus PROD_A/receiving apparatus PROD_B for transmitting and receiving the modulated signal through communication (typically, any of wireless and wired transmission media is used in LAN, and a wired transmission medium is used in WAN). Here, the personal computer may be any of a desktop PC, a laptop PC, and a tablet PC. The smartphone may be a multi-functional mobile phone.

A client of a video sharing service has not only a function of decoding the coded data downloaded from a server and displaying the data, but also a function of coding video taken by a camera and uploading the video to the server. That is, the client of the video sharing service functions as both of a transmitting apparatus PROD_A and a receiving apparatus PROD_B.

Figure 24A:
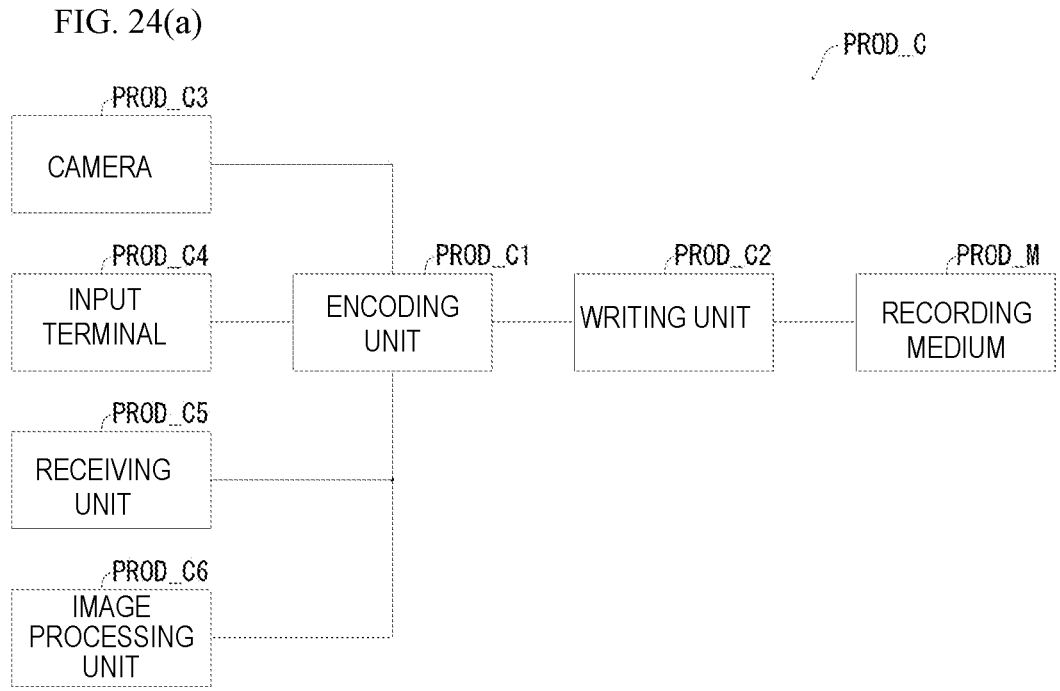
FIG. 24(a) and FIG. 24(b) are a diagram showing configurations of a recording apparatus mounted with the hierarchical video coding apparatus, and a reproducing apparatus mounted with the hierarchical video decoding apparatus.

Referring to FIG. 24, it is described that the aforementioned hierarchical video coding apparatus 2 and the hierarchical video decoding apparatus 1 can be used for video recording and reproducing. FIG. 24(a) is a block diagram showing the configuration of a recording apparatus PROD_C mounted with the hierarchical video coding apparatus 2.

As shown in FIG. 24(a), the recording apparatus PROD_C includes an encoding unit PROD_C1 that obtains coded data by coding video, and a writing unit PROD_C2 that writes, in a recording medium PROD_M, the coded data obtained by the encoding unit PROD_C1. The aforementioned hierarchical video coding apparatus 2 is used as the encoding unit PROD_C1.

The recording medium PROD_M may be (1) what is embedded in the recording apparatus PROD_C, such as an HDD (Hard Disk Drive) or an SSD (Solid State Drive), (2) what is connected to the recording apparatus PROD_C, such as an SD memory card or a USB (Universal Serial Bus) flash memory, (3) what is inserted in a drive apparatus (not shown) embedded in the recording apparatus PROD_C, such as a DVD (Digital Versatile Disc) or a BD (BLu-ray Disc®).

The recording apparatus PROD_C may further include a camera PROD_C3 that serves as a supply source of video to be input into the encoding unit PROD_C1 and takes video, an input terminal PROD_C4 for receiving video from the outside, a receiving unit PROD_C5 for receiving video, and an image processing unit C6 that generates or processes images. In FIG. 24(a), the configuration where the recording apparatus PROD_C is provided with all of these elements is illustrated. However, some of these may be omitted.

The receiving unit PROD_C5 may be for receiving uncoded video. Alternatively, this receiving unit may receive coded data coded according to a coding scheme for transmitting that is different from the coding scheme for recording. In the latter case, it is preferred that a decoding unit for transmission (not shown) that decodes coded data coded according to a coding scheme for transmission intervene between the receiving unit PROD_C5 and the encoding unit PROD_C1.

Examples of such a recording apparatus PROD_C include a DVD recorder, a BD recorder, and an HDD (Hard Disk Drive) recorder (in this case, the input terminal PROD_C4 or the receiving unit PROD_C5 serves as a main supply source of video). Alternatively, a camcorder (in this case, the camera PROD_C3 serves as a main supply source of video), a personal computer (in this case, the receiving unit PROD_C5 or the image processing unit PROD_C6 serves as a main supply source of video), a smartphone (in this case, the camera PROD_C3 or the receiving unit PROD_C5 serves as a main supply source of video) are examples of such a recording apparatus PROD_C.

Figure 24B:
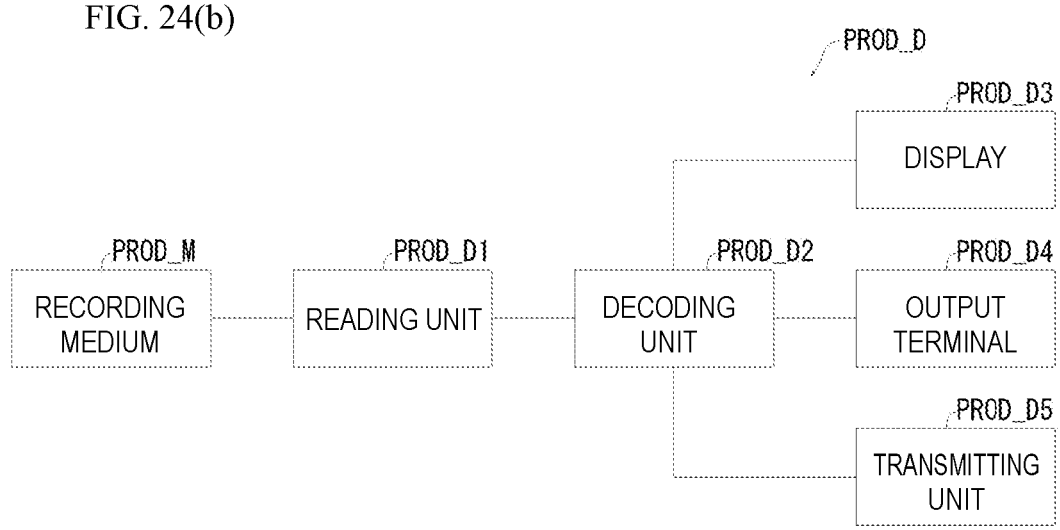

FIG. 24(b) is a block diagram showing the configuration of a reproducing apparatus PROD_D mounted with the aforementioned hierarchical video decoding apparatus 1. As shown in FIG. 24(b), the reproducing apparatus PROD_D includes a reading unit PROD_D1 that reads coded data written in the recording medium PROD_M, and a decoding unit PROD_D2 that obtains video by decoding the coded data read by the reading unit PROD_D1. The aforementioned hierarchical video decoding apparatus 1 is used as the decoding unit PROD_D2.

The recording medium PROD_M may be (1) what is embedded in the reproducing apparatus PROD_D, such as an HDD or an SSD, (2) what is connected to the reproducing apparatus PROD_D, such as an SD memory card or a USB flash memory, (3) what is inserted in a drive apparatus (not shown) embedded in the reproducing apparatus PROD_D, such as a DVD or a BD.

The reproducing apparatus PROD_D may further include a display PROD_D3 that serves as a supply destination of video to be output from the decoding unit PROD_D2 and displays video, and an output terminal PROD_D4 for outputting the video to the outside, and a transmitting unit PROD_D5 that transmits the video. In FIG. 24(b), the configuration where the reproducing apparatus PROD_D is provided with all of these elements is illustrated. However, some of these may be omitted.

The transmitting unit PROD_D5 may be for transmitting uncoded video. Alternatively, this transmitting unit may transmit coded data coded according to a coding scheme for transmitting that is different from the coding scheme for recording. In the latter case, it is preferred that an encoding unit (not shown) that codes video according to a coding scheme for transmission intervene between the decoding unit PROD_D2 and the transmitting unit PROD_D5.

Such a reproducing apparatus PROD_D may be, for example, a DVD player, a BD player, an HDD player or the like (in this case, the output terminal PROD_D4 to which a television receiving unit or the like is connected serves as a main supply destination of video). A television receiving unit (in this case, the display PROD D3 serves as a main supply destination of video), a digital signage (also called an electronic signage or electronic bulletin board, and the display PROD_D3 or the transmitting unit PROD_D5 serves as a main supply destination of video), a desktop PC (in this case, the output terminal PROD_D4 or the transmitting unit PROD_D5 serves as a main supply destination of video), a laptop or tablet PC (in this case, the display PROD_D3 or the transmitting unit PROD_D5 serves as a main supply destination of video), a smartphone (in this case, the display PROD_D3 or the transmitting unit PROD_D5 serves as a main supply destination of video) and the like are examples of such a reproducing apparatus PROD_D.

(On Achievement Into Hardware and Achievement Into Software)

Finally, each of the blocks of the hierarchical video decoding apparatus 1 and the hierarchical video coding apparatus 2 may be achieved by a logic circuit formed on an integrated circuit (IC chip) in a hardware manner, or achieved in a software manner using a CPU (Central Processing Unit).

In the latter case, each of the apparatuses includes a CPU that executes instructions of control programs that achieve functions, ROM (Read Only Memory) that stores the programs, RAM (Random Access Memory) on which the program are deployed, and a storing apparatus (recording medium), such as memory, which stores the programs and various data. The object of the present invention can be achieved also by supplying the each of the apparatuses with a recording medium that records the program code (executable programs, intermediate code programs, source programs) of control programs, which are software for achieving the aforementioned functions, in each of the apparatuses in a computer-readable manner, and by causing the computer (CPU or MPU (Micro Processing Unit)) to read the program code recorded in the recording medium.

The recording medium may be, for example, tape, such as magnetic tape or cassette tape, disks including a magnetic disk, such as floppy (R) disk/hard disk, and an optical disk, such as CD-ROM (Compact Disc Read-Only Memory)/MO (Magneto-Optical)/MD (Mini Disc)/DVD (Digital Versatile Disk)/CD-R (CD Recordable), cards, such as an IC card (including a memory card)/optical card, semiconductor memories, such as mask ROM/EPROM (Erasable Programmable Read-only Memory)/EEPROM (R) (Electrically Erasable and Programmable Read-only Memory)/flash ROM, or logic circuits including PLD (Programmable Logic Apparatus) or FPGA (Field Programmable Gate Array).

Each of the apparatuses may be configured to be connectable to a communication network, and supply the program code via the communication network. The communication network is any element that can transmit the program code. The element is not specifically limited. For example, the Internet, an intranet, an extranet, LAN (Local Area Network), ISDN (Integrated Services Digital Network), VAN (Value-Added Network), CATV (Community Antenna Television) communication network, Virtual Private Network, telephone network, mobile communication network, satellite communication network and the like can be used. The transmission medium constituting the communication network may be any medium that can transmit the program code. The medium is not limited to a specific configuration or type. For example, any of wired elements, such as IEEE (Institute of Electrical and Electronic Engineers) 1394, USB, power-line carrier, cable TV line, telephone line, ADSL (Asymmetric Digital Subscriber Line) circuit, or any of wireless elements that include an infrared element, such as IrDA (infrared Data Association) or a remote control, Bluetooth (R), IEEE802.11 wireless, HDR (High Data Rate), NFC (Near Field Communication), DLNA (Digital Living Network Alliance), mobile phone network, satellite circuit, or terrestrial digital network can be used. The present invention may be achieved in a form of a computer data signal embedded in carrier waves embodied through electronic transmission of the program code.

CONCLUSION

The present invention includes at least image decoding apparatuses described in aspects 1 to 7 and image coding apparatuses described in aspects 8 to 12.

A hierarchical image decoding apparatus according to the aspect 1 of the present invention is an image decoding apparatus that decodes hierarchical image coded data, including: layer set information decoding means for decoding layer set information including at least one layer set; output layer set information decoding means for decoding output layer set information including at least one output layer set represented by a combination of the layer set and an output layer flag; output layer set selecting means for selecting one of output layer sets included in the output layer set information; picture decoding means for generating decoded pictures on layers included in a layer set associated with the selected output layer set; and buffer means for holding the decoded pictures on the layers. The buffer means outputs, as an output picture, the decoded picture corresponding to at least one layer among the held decoded pictures on the layers with respect to this layer.

The image decoding apparatus according to the aspect 2 of the present invention is the apparatus according to the aspect 1, wherein the total sum of the output layer flags in the output layer set is at least one.

The image decoding apparatus according to the aspect 3 of the present invention is the apparatus according to the aspect 1 or 2, wherein the layer set associated with the output layer set includes a base layer.

The image decoding apparatus according to the aspect 4 of the present invention is the apparatus according to the aspect 1 or 2, wherein as to the output layer sets, when at least two output layer sets are associated with the same layer set and the numbers of output layers are the same, the values of the output layer flags pertaining to at least one identical layer are different from each other in the two or more output layer sets.

The image decoding apparatus according to the aspect 5 of the present invention is the apparatus according to the aspect 1 or 2, further including PTL information decoding means for decoding PTL information corresponding to the output layer set, wherein as to the output layer sets, when at least two output layer sets are associated with the same layer set and the numbers of output layers are the same, the pieces of PTL information are different from each other, or the values of the output layer flags of at least one identical layer are different from each other in the two or more output layer sets.

The image decoding apparatus according to the aspect 6 of the present invention is the apparatus according to the aspect 1 or 2, wherein when the number of layer sets equals to one, the output layer set information decoding means estimates the number of additional output layer sets as zero without decoding from the coded data, and when the number of layer sets is larger than one, the number of additional output layer sets is decoded from the coded data, and the number of output layer sets is derived as the sum of the number of layer sets and the number of additional output layer sets.

The image decoding apparatus according to the aspect 7 of the present invention is the apparatus according to the aspect 1 or 2, wherein when the number of layer sets is larger than one, the output layer set information decoding means decodes the coded data to obtain default output layer information for designating a process of deriving the output layer flag, and when the number of layer sets equals to one, the means does not decode the coded data to obtain the default output layer information.

An image coding apparatus according to the aspect 8 of the present invention is an image coding apparatus that generates hierarchical coded data, including: layer set information coding means for coding layer set information including at least one layer set; output layer set information coding means for coding output layer set information including at least one output layer set represented by a combination of the layer set information and the output layer flag; and picture coding means for coding a picture on each layer included in the layer set corresponding to the output layer set, wherein the output layer set includes at least one output layer.

The image coding apparatus according to the aspect 9 of the present invention is the apparatus according to the aspect 8, wherein as to the output layer sets, when two or more output layer sets are associated with the same layer set and the numbers of output layers are the same, the values of the output layer flags pertaining to at least one identical layer are different from each other in the two or more output layer sets.

The image coding apparatus according to the aspect 10 of the present invention is the apparatus according to the aspect 8, further including PTL information coding means for coding PTL information corresponding to the output layer set, wherein as to the output layer set, when two or more output layer sets are associated with the same layer set and the numbers of output layers are the same, the pieces of PTL information are different from each other, or the values of the output layer flags on at least one identical layer are different from each other in the two or more output layer sets.

The image coding apparatus according to the aspect 11 of the present invention is the apparatus according to the aspect 8, wherein when the number of layer sets equals to one, the output layer set information coding means does not code the number of additional output layer sets that indicates the difference between the number of output layer sets and the number of layer sets, and when the number of layer sets is larger than one, the means codes the number of additional output layer sets.

The image coding apparatus according to the aspect 12 of the present invention is the apparatus according to the aspect 8, wherein when the number of layer sets is larger than one, the output layer set information coding means codes default output layer information, and when the number of layer sets equals to one, the means does not code the default output layer information.

The present invention is not limited to each embodiment described above. Various changes can be made in a range represented in the claims. Any embodiment obtained by combining types of technical measures disclosed in various embodiments are also included in the technical scope of the present invention.

INDUSTRIAL APPLICABILITY

Embodiments of the present invention are suitably applicable to a hierarchical video decoding apparatus that decodes coded data where image data is hierarchically coded, and a hierarchical video coding apparatus that generates the coded data where image data is hierarchically coded. Embodiments of the present invention are also suitably applicable to the data structure of hierarchically coded data generated by the hierarchical video coding apparatus and referred to by the hierarchical video decoding apparatus.

DESCRIPTION OF SYMBOLS

1 . . . Hierarchical video decoding apparatus
2 . . . Hierarchical video coding apparatus
10 . . . Target set picture decoding unit
11 . . . NAL demultiplexing unit (NAL unit decoding means, layer identifier decoding means)
12 . . . Non-VCL decoding unit (parameter set decoding means, layer set information decoding means, output layer set information decoding means, PTL information decoding means)
13 . . . Parameter memory
14 . . . Picture decoding unit (VCL decoding means)
141 . . . Slice header decoding unit
144 . . . CTU decoding unit
1421 . . . Predictive residue reconstituting unit
1422 . . . Predictive image generating unit
1423 . . . CTU decoded image generating unit
15 . . . Decoded picture managing unit
16 . . . Output controlling unit (output layer set selecting means)
17 . . . Bit stream extracting means (image-coded data extracting means)
20 . . . Target set picture encoding unit
21 . . . NAL multiplexing unit (NAL unit encoding means)

22 ... Non-VCL encoding unit (parameter set coding means, layer set information coding means, output layer set information coding means, PTL information coding means)
24 ... Picture encoding unit (VCL coding means)
26 ... Coded parameter determining unit
241 ... Slice header encoding unit
242 ... CTU encoding unit
2421 ... Predictive residue encoding unit
2422 ... Predictive image encoding unit
2423 ... CTU decoded image generating unit

What is claimed is:

1. A non-Video Coding Layer (VCL) decoder comprising:
a processing circuitry configured to:
(a) decode layer set information describing a layer configuration of a layer set,
(b) decode a layer set identifier for identifying the layer set and an output layer flag for designating whether a layer included in the layer set is an output layer, and
(c) derive output layer set information describing an output layer set that includes at least one output layer,
wherein a total sum of values of output layer flags of layers included in the output layer set is at least one; and
the processing circuitry is further configured to store the output layer set information,
wherein the layer set includes one or more layers, and wherein the output layer set includes at least one output layer.

2. The non-VCL decoder according to claim 1, wherein the processing circuitry is further configured to assume, as one, a value of the output layer flag pertaining to a base layer of the output layer set where the layer set identifier has a value of zero.

3. The non-VCL decoder according to claim 1, wherein upon the number of layer sets included in image coded data being larger than one, the processing circuitry is further configured to decode the number of additional output layer sets from the image coded data, and upon a syntax pertaining to the number of additional output layer sets being not in the image coded data, the processing circuitry is further configured to assume the number of additional output layer sets as zero.

4. The non-VCL decoder according to claim 1, wherein the output layer set information is stored in a parameter memory; and wherein a picture of the output layer included in the output layer set is decoded based on the output layer set information obtained from the parameter memory.

5. A method applied to a non-Video Coding Layer (VCL) decoder, the method comprising:
decoding layer set information describing a layer configuration of a layer set;
decoding a layer set identifier for identifying the layer set and an output layer flag for designating whether a layer included in the layer set is an output layer;
deriving output layer set information describing an output layer set that includes at least one output layer, wherein a total sum of values of the output layer flags of the layers included in the output layer set is at least one; and
storing the output layer set information, wherein the layer set includes one or more layers, and wherein the output layer set includes at least one output layer.

6. The method according to claim 5, wherein a value of the output layer flag is assumed as one, wherein the output layer flag pertains to a base layer of the output layer set where the layer set identifier has a value of zero.

7. The method according to claim 5, wherein the number of additional output layer sets is decoded from image coded data upon the number of layer sets included in the image coded data being larger than one, and the number of additional output layer sets is assumed as zero upon a syntax pertaining to the number of additional output layer sets being not in the image coded data.

8. The method according to claim 5, wherein the output layer set information is stored in a parameter memory; and
wherein a picture of the output layer included in the output layer set is decoded based on the output layer set information obtained from the parameter memory.

9. A non-transitory computer-readable medium storing computer instructions that when executed by one or more processors, cause the one or more processors to perform the following:
decoding layer set information describing a layer configuration of a layer set;
decoding a layer set identifier for identifying the layer set and an output layer flag for designating whether a layer included in the layer set is an output layer;
deriving output layer set information describing an output layer set that includes at least one output layer, wherein a total sum of values of the output layer flags of the layers included in the output layer set is at least one; and
storing the output layer set information, wherein the layer set includes one or more layers, and wherein the output layer set includes at least one output layer.

10. The non-transitory computer-readable medium according to claim 9, wherein a value of the output layer flag is assumed as one, wherein the output layer flag pertains to a base layer of the output layer set where the layer set identifier has a value of zero.

11. The non-transitory computer-readable medium according to claim 9, wherein the number of additional output layer sets is decoded from image coded data upon the number of layer sets included in the image coded data being larger than one, and the number of additional output layer sets is assumed as zero upon a syntax pertaining to the number of additional output layer sets being not in the image coded data.

12. The non-transitory computer-readable medium according to claim 9, wherein the output layer set information is stored in a parameter memory and a picture of the output layer included in the output layer set is decoded based on the output layer set information obtained from the parameter memory.

* * * * *